US012170865B2

(12) United States Patent
Liu et al.

(10) Patent No.: US 12,170,865 B2
(45) Date of Patent: Dec. 17, 2024

(54) SPEAKER SYSTEM FOR BATH AND SHOWER ENVIRONMENTS

(71) Applicant: Kohler Co., Kohler, WI (US)

(72) Inventors: Zhiyu Liu, Sheboygan, WI (US); Rafael Rexach, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 591 days.

(21) Appl. No.: 17/124,738

(22) Filed: Dec. 17, 2020

(65) Prior Publication Data

US 2021/0211792 A1 Jul. 8, 2021

Related U.S. Application Data

(60) Provisional application No. 62/956,481, filed on Jan. 2, 2020.

(51) Int. Cl.
*B05B 1/18* (2006.01)
*H04R 1/02* (2006.01)

(52) U.S. Cl.
CPC ............. *H04R 1/028* (2013.01); *B05B 1/185* (2013.01); *H04R 2420/07* (2013.01)

(58) Field of Classification Search
CPC ...... H04R 1/028; H04R 2420/07; B05B 1/185
See application file for complete search history.

(56) References Cited

U.S. PATENT DOCUMENTS 804,611 A 11/1905 Low, Jr.
1,947,407 A 2/1934 Cornell, Jr.
2,281,499 A 4/1942 Herzbrun et al.
4,121,741 A 10/1978 Adamson
4,468,321 A 8/1984 St. John
4,478,367 A 10/1984 Petursson
4,964,181 A 10/1990 Alpert
D326,854 S 6/1992 Terk et al.
5,140,254 A 8/1992 Katzman
D329,233 S 9/1992 Miura
5,228,625 A 7/1993 Grassberger
5,329,650 A 7/1994 Zaccai et al.
(Continued)

FOREIGN PATENT DOCUMENTS

CN 101366606 A 2/2009
CN 201470506 * 6/2009
(Continued)

OTHER PUBLICATIONS

First Chinese Office Action on CN Appl. Ser. No. 202011619636.6 dated Feb. 28, 2022 (18 pages).
(Continued)

*Primary Examiner* — Qingzhang Zhou
(74) *Attorney, Agent, or Firm* — FOLEY & LARDNER LLP

(57) ABSTRACT

A showerhead assembly includes a waterway assembly and a wireless speaker configured to be removably coupled to the waterway assembly. The waterway assembly includes a back plate and a face plate coupled to the back plate. The back plate includes an inlet. The face plate is coupled to the back plate and defines a plurality of outlets. The face plate also defines a through-hole that extends through the waterway assembly. The wireless speaker is configured to be disposed within the through-hole when coupled to the waterway assembly.

20 Claims, 45 Drawing Sheets

(56) References Cited

U.S. PATENT DOCUMENTS 5,647,007 A 7/1997 Wooderson et al.
5,664,015 A 9/1997 Ford et al.
5,868,439 A 2/1999 Schmidt
6,021,960 A * 2/2000 Kehat ..................... B05B 15/00 239/18
6,061,457 A 5/2000 Stockhamer
6,135,408 A 10/2000 Richter
6,182,910 B1 2/2001 Huen
D440,277 S 4/2001 Slothower
D440,278 S 4/2001 Slothower
6,446,278 B1 9/2002 Lin
6,473,979 B2 11/2002 Lu
6,594,832 B2 7/2003 Yang
D495,776 S 9/2004 Blomstrom
6,823,536 B2 11/2004 Yip
D500,839 S 1/2005 Blomstrom
6,879,818 B2 4/2005 Wageneck
6,892,952 B2 5/2005 Chang et al.
D507,820 S 7/2005 Blomstrom
D511,810 S 11/2005 Hanna
D524,412 S 7/2006 Blomstrom
D526,308 S 8/2006 Kasden
D530,308 S 10/2006 Topping
7,269,862 B2 9/2007 Rooke et al.
D559,357 S 1/2008 Wang
D560,273 S 1/2008 Hanna
7,412,206 B1 8/2008 Hutchings et al.
7,611,073 B2 11/2009 Crutcher
7,711,316 B2 5/2010 Bae
D618,303 S 6/2010 Zhang
D619,202 S 7/2010 Zhang
D619,218 S 7/2010 Lee
7,753,079 B2 7/2010 Nelson
7,761,937 B2 7/2010 Foutz et al.
D633,078 S 2/2011 Lewis
D634,810 S 3/2011 Yoo et al.
7,909,061 B2 3/2011 Nelson
D652,106 S 1/2012 Yoo
8,205,846 B2 6/2012 Glunk
D678,468 S 3/2013 Hanna
D697,046 S 1/2014 Hanna
8,627,850 B1 1/2014 Booker
8,702,018 B1 4/2014 Rivera
D707,329 S 6/2014 Hanna et al.
D707,794 S 6/2014 Hanna
D727,464 S 4/2015 Hanna et al.
9,095,862 B2 8/2015 Hanna et al.
D745,948 S 12/2015 Hanna
D762,815 S 8/2016 Hanna et al.
D762,816 S 8/2016 Hanna et al.
9,438,977 B2 9/2016 Wang et al.
9,828,752 B2 11/2017 Genord et al.
D804,611 S 12/2017 Hanna
9,919,331 B2 3/2018 Scheffer et al.
10,003,873 B2 6/2018 Hanna et al.
10,017,923 B2 7/2018 Genord et al.
10,171,900 B2 1/2019 Hanna et al.
D857,159 S 8/2019 Hanna
10,787,799 B2 9/2020 Hanna et al.
2003/0041372 A1 3/2003 Yang
2003/0125842 A1 7/2003 Chang et al.
2003/0211838 A1 11/2003 Wageneck
2004/0078891 A1* 4/2004 Yip ......................... H04R 5/023 4/615
2004/0255377 A1 12/2004 Mueller et al.
2006/0283511 A1 12/2006 Nelson
2007/0022528 A1 2/2007 Gilbert
2009/0007330 A1 1/2009 Genord et al.
2009/0031492 A1 2/2009 Foutz et al.
2009/0041267 A1 2/2009 Lee et al.
2009/0052721 A1 2/2009 Dabrowski
2009/0156249 A1 6/2009 Ruckart
2009/0245567 A1 10/2009 Egyud et al.
2009/0323761 A1 12/2009 Tsai
2010/0043135 A1 2/2010 Patterson et al.
2010/0102182 A1 4/2010 Lin
2010/0170588 A1 7/2010 Nelson
2010/0213278 A1 8/2010 Zan
2010/0237166 A1 9/2010 Nelson
2011/0031331 A1 2/2011 Klicpera
2011/0067815 A1 3/2011 Iizuka et al.
2011/0162743 A1 7/2011 Nelson
2011/0210188 A1 9/2011 Yao et al.
2011/0244973 A1 10/2011 Brown et al.
2012/0042973 A1 2/2012 Ko
2013/0062437 A1* 3/2013 Hanna ...................... E03C 1/055 239/289
2013/0279724 A1 10/2013 Stafford et al.
2013/0320116 A1 12/2013 Jonte et al.
2014/0183279 A1 7/2014 Hanna et al.
2014/0314265 A1 10/2014 Freund
2015/0053790 A1 2/2015 Hanna et al.
2017/0014849 A1 1/2017 Gao et al.
2018/0193851 A1 7/2018 L'Henaff et al.
2018/0291601 A1 10/2018 Genord et al.
2019/0083991 A1 3/2019 Lin et al.
2019/0141425 A1 5/2019 Hanna et al.

FOREIGN PATENT DOCUMENTS

CN 101601557 A 12/2009
CN 102873000 A 1/2013
CN 103464314 A 12/2013
CN 103533870 A 1/2014
CN 203470251 U 3/2014
CN 203695252 U 7/2014
CN 104074246 10/2014
CN 203953463 U 11/2014
CN 204703237 U 10/2015
CN 205625743 U 10/2016
CN 108471891 A 8/2018
CN 110198789 A 9/2019
DE 10 2017 113 545 A1 12/2018
EP 2 218 512 A 8/2010
WO WO2007/051367 * 2/2006
WO WO2016000455 A1 * 1/2016 ............. B05B 15/00

OTHER PUBLICATIONS

Second Office Action on Chinese Patent App. No. 202011619636.6 dated Aug. 31, 2023, 6 pages (with English summary).

* cited by examiner

SPEAKER SYSTEM FOR BATH AND SHOWER ENVIRONMENTS

CROSS-REFERENCE TO RELATED PATENT APPLICATIONS

The present application claims the benefit of and priority to U.S. Provisional Patent Application No. 62/956,481, filed Jan. 2, 2020, the entire disclosure of which is hereby incorporated by reference herein.

BACKGROUND

The present application relates generally to the field of wireless speakers. More specifically, the present application relates to a wireless speaker and speaker support assembly for use in bath and shower environments.

Wireless speakers may be connected to a variety of different control devices, including phones, tablets, computers, smart hubs, and other wirelessly connected devices. Wireless speakers often provide a higher quality sound (e.g., audio) than the control device to which the wireless speaker is connected. Among other benefits, the wireless speaker may be sized for portability, such that the wireless speaker may be carried by the user with minimal effort to different locations.

It may be desirable to utilize a wireless speaker in a bathroom or shower to entertain the user while bathing. However, producing quality sound in these environments is difficult. For example, the sound produced by the speaker may be drowned out by the sound of running water in a bath or shower. Additionally, the speaker may be positioned outside of the bath or shower enclosure to prevent water damage to the speaker, and therefore may need to project through any enclosures between the user and the speaker (e.g., a door to a shower, etc.) while the user is bathing. Moreover, certain users may not wish to have a cluttered appearance in their bathroom or shower, where real estate is often required for various cleaning products (e.g., soaps, shampoos, washcloths, etc.).

It would be advantageous to provide an improved wireless speaker system that provides high quality audio within a bath or shower environment while maintaining the desired aesthetic of the space.

SUMMARY

One exemplary embodiment of the present disclosure relates to a showerhead assembly. The showerhead assembly includes a waterway assembly and a wireless speaker configured to be removably coupled to the waterway assembly. The waterway assembly includes a back plate and a face plate coupled to the back plate. The back plate includes an inlet. The face plate is coupled to the back plate and defines a plurality of outlets. The face plate also defines a through-hole that extends through the waterway assembly. The wireless speaker is configured to be disposed within the through-hole when coupled to the waterway assembly.

Another exemplary embodiment of the present disclosure relates to a waterway assembly. The waterway assembly includes a back plate, an inlet connector, and a face plate. The inlet connector is coupled to the back plate and is configured to fluidly couple the back plate to a water supply line. The face plate is coupled to the back plate and defines a plurality of outlets. The face plate also defines a through-hole that extends through the waterway assembly. The through-hole is configured to receive a wireless speaker therein.

Another exemplary embodiment of the present disclosure relates to a handshower assembly. The handshower assembly includes a docking ring, a hand sprayer, and a flexible conduit. The docking ring defines a first through-hole. The hand sprayer is configured to be removably coupled to the docking ring. The hand sprayer defines a second through-hole that is aligned with the first through-hole when the hand sprayer is coupled to the docking ring. The flexible conduit is configured to fluidly couple the docking ring to the hand sprayer.

One exemplary embodiment of the present disclosure relates to a showerhead assembly. The showerhead assembly includes a waterway assembly including an inlet, a flow distribution cavity fluidly connected to the inlet, and a spray face. The spray face includes a plurality of outlets fluidly connected to the flow distribution channel. The waterway assembly defines a through-hole opening configured to receive a wireless speaker therein.

In some embodiments, an inner sidewall of the flow distribution cavity defines the through-hole opening. The showerhead assembly may further include a magnet disposed proximate to the sidewall. In other embodiments, the showerhead assembly may further include a plurality of magnets.

In some embodiments, the through-hole opening is generally circular and the plurality of outlets are arranged to circumferentially surround the through-hole opening.

In some embodiments, the showerhead assembly further includes the wireless speaker. A length of the wireless speaker is greater than a length of the waterway assembly such that the wireless speaker protrudes beyond the ends of the waterway assembly when the wireless speaker is fully inserted into the through-hole opening. In some implementations, a cross-sectional shape of the wireless speaker where the wireless speaker engages with the waterway assembly is non-circular (e.g., a rectangular cross-sectional shape, etc.).

In some embodiments, the showerhead further includes a fluid connecting member pivotably coupled to the waterway assembly proximate to a perimeter of the waterway assembly.

Another exemplary embodiment of the present disclosure relates to a handshower assembly. The handshower assembly includes a docking ring and a hand sprayer removably coupled to a lower end of the docking ring. The docking ring defines a first through-hole opening configured to receive a wireless speaker therein. The hand sprayer defines a second through-hole opening that is aligned with the first through-hole opening when the hand sprayer is engaged with the docking ring.

In some embodiments, the docking ring includes a waterway assembly including an inlet and a cavity fluidly coupled to the inlet. The hand sprayer may be fluidly coupled to the cavity.

In some embodiments, the docking ring includes an extension that protrudes from a lower surface of the docking ring along a perimeter of the first through-hole opening. The second through-hole opening of the hand sprayer may at least partially receive the extension therein when the hand sprayer is engaged with the docking ring.

Another exemplary embodiment of the present disclosure is a support assembly. The support assembly includes a docking ring and an extension. The docking ring defines an opening configured to receive a wireless speaker therein. The extension is coupled to an outer surface of the docking ring and extends outwardly from the docking ring in substantially perpendicular orientation relative to a central axis of the opening. The support assembly further includes a clamp device coupled to the extension.

Another exemplary embodiment of the present disclosure is a shelf assembly. The shelf assembly includes shelf and a support configured to couple the shelf to a wall. The support is coupled to the shelf along a first edge of the shelf. The support defines a receptacle configured to receive a wireless speaker therein.

In some embodiments, the support is a first support and the shelf assembly further includes a second support spaced apart from the first support along the first edge. In some implementations, the second support is configured to support a second wireless speaker. The first wireless speaker and the second wireless speaker may be configured to interact wirelessly to produce stereo sound.

Another exemplary embodiment of the present disclosure is an expanded sound dock. The sound dock includes a docking enclosure and a speaker disposed substantially within the docking enclosure. The docking enclosure defines a through-hole opening configured to receive a wireless speaker therein. The docking enclosure also includes a controller configured to communicably couple the speaker with the wireless speaker.

Another exemplary embodiment of the present disclosure is a floating sound dock. The floating sound dock includes a body defining an enclosed hollow cavity. The body further defines a through-hole opening that is configured to receive a wireless speaker therein. The floating sound dock is configured to support the wireless speaker such that a face of the wireless speaker faces toward a dry end of the floating sound dock.

DETAILED DESCRIPTION

Figure 1:
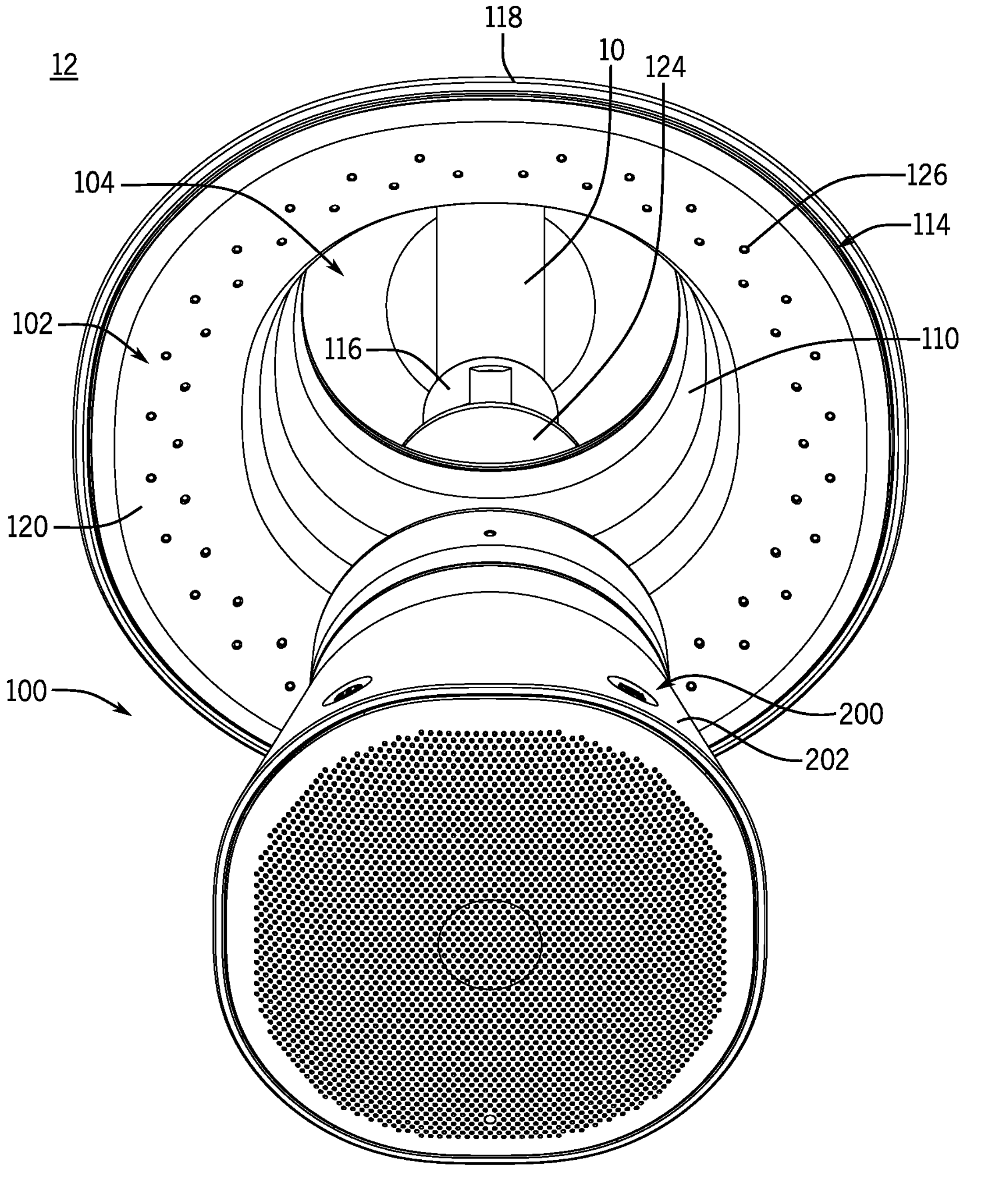
FIG. 1 is a front perspective view of a partially disassembled showerhead assembly, according to an exemplary embodiment.

Referring generally to the figures, a wireless speaker and speaker support assembly are shown for use in bath and shower environments, according to various exemplary embodiments. The wireless speaker is configured to wirelessly communicate with a control device such as a smart phone, a tablet, a laptop, a smart hub, or another type of wireless control device. In some embodiments, the wireless speaker is a standalone smart hub (e.g., artificial intelligence assistant, virtual assistant, etc.) that can be controlled based on user voice commands. The wireless speaker is tuned to provide improved acoustic performance within a bath or shower environment as compared to conventional speakers. Moreover, the speaker support assembly integrates the wireless speaker directly within a bath or shower enclosure without impacting the amount of storage space for shampoos, soaps, and other bathing accessories.

According to one exemplary embodiment, the speaker support assembly is a showerhead assembly. The showerhead assembly is configured to receive and support the wireless speaker in position above an occupant of the shower. The wireless speaker is positioned to project sound toward the occupant from a central position along a spray face of the showerhead assembly (a spray face from which water is delivered from the showerhead assembly toward the user/occupant). The showerhead assembly includes a through-hole opening into which the wireless speaker is received. The wireless speaker is configured to couple magnetically to the showerhead assembly so that an occupant may remove the wireless speaker and use it in other areas and/or environments separate from the showerhead assembly. In addition to the magnetic coupling, the showerhead assembly may be configured to "grip" onto the wireless speaker when engaged with the through-hole opening. In some embodiments, the showerhead assembly may be pivotably coupled to a water inlet line within the shower enclosure to allow a user to reposition the height of the showerhead and also to change the distance between the user and the wireless speaker.

According to another exemplary embodiment, the speaker support assembly is a handshower assembly. The handshower assembly includes a docking ring and a hand sprayer that is removably coupled to the docking ring. When engaged with the docking ring, the hand sprayer provides a flow of water to an occupant from a fixed position within the shower enclosure (e.g., the handshower assembly functions similar to a showerhead assembly). When removed (e.g., separated) from the docking ring, the hand sprayer can be repositioned to direct flow to different parts of the shower enclosure. In other embodiments, the handshower assembly is mounted on a rail within the shower enclosure and may be repositioned along the rail. The hand sprayer fits over the wireless speaker when engaged with the docking ring such that the hand sprayer substantially surrounds the wireless speaker when engaged with the docking ring. The docking ring is configured to receive and support the wireless speaker in a position within the shower enclosure that is independent from the position of the hand sprayer.

According to another exemplary embodiment, the speaker support assembly is a clamp assembly configured to secure the wireless speaker to a pole or rod (e.g., a curtain rod, a slide bar, etc.). The clamp assembly is repositionable along the pole or rod and includes a clamping device to accommodate different pole/rod sizes.

According to another exemplary embodiment, the speaker support assembly is a shelf assembly. The shelf assembly includes a shelf and at least one support configured to connect the shelf to a wall. The support is further configured to support the wireless speaker in position along the shelf. In some embodiments, the shelf assembly includes multiple supports to allow multiple wireless speakers to be placed upon the shelf. The wireless speakers may be configured to interact with one another to produce stereo sound rather than replicating the same sound signal that is received from the control device.

According to another exemplary embodiment, the support assembly is an expanded sound dock configured to pair with the wireless speaker to boost, widen, or otherwise augment the sound produced by the wireless speaker. For example, in some embodiments, the expanded sound dock includes a housing that contains a speaker therein. The expanded sound dock may also include a controller configured to facilitate communication between the speaker and the wireless speaker, and/or between the speaker and a control device. The housing may include an opening configured to receive the wireless speaker therein to secure the wireless speaker in position relative to other parts of the expanded sound dock (e.g., the speaker). In some embodiments, the expanded sound dock may be configured to power the wireless speaker (e.g., to recharge the wireless speaker, etc.). These and other advantageous features will become apparent to those reviewing the present disclosure and figures.

Showerhead Assembly

Figure 2:
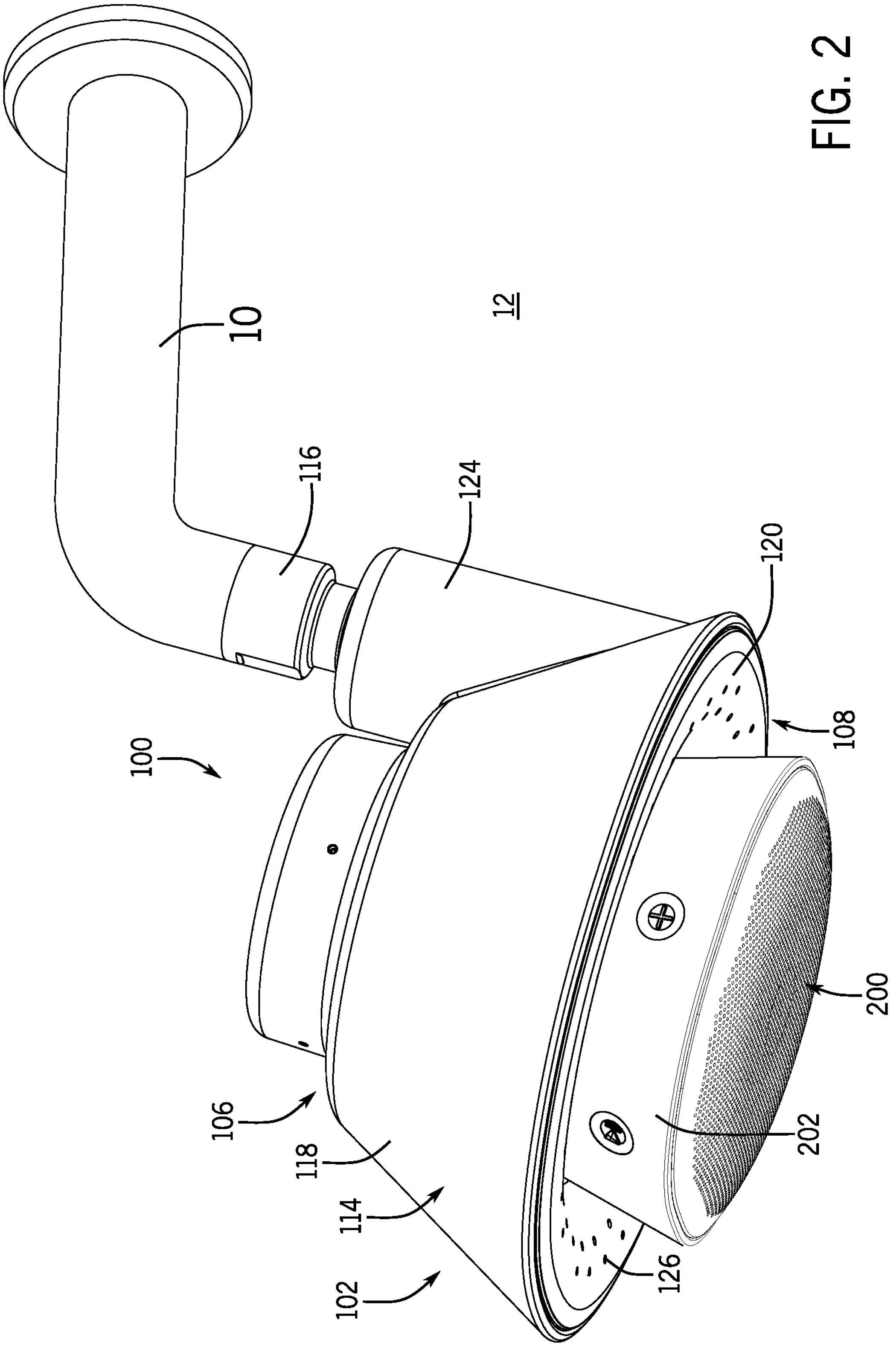
FIG. 2 is a side perspective view of the showerhead assembly of FIG. 1.
Figure 3:
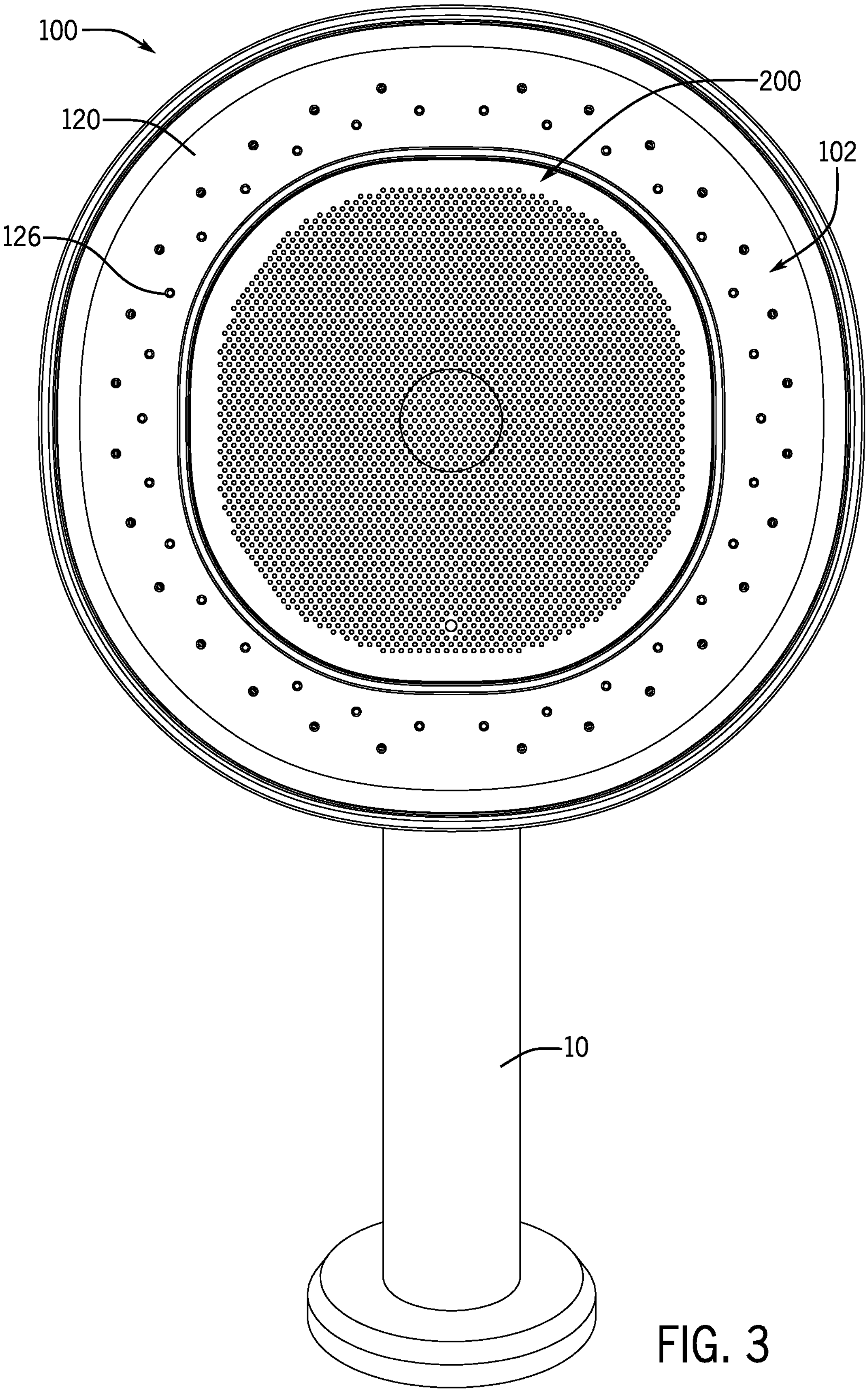
FIG. 3 is a front view of the showerhead assembly of FIG. 1.
Figure 4:
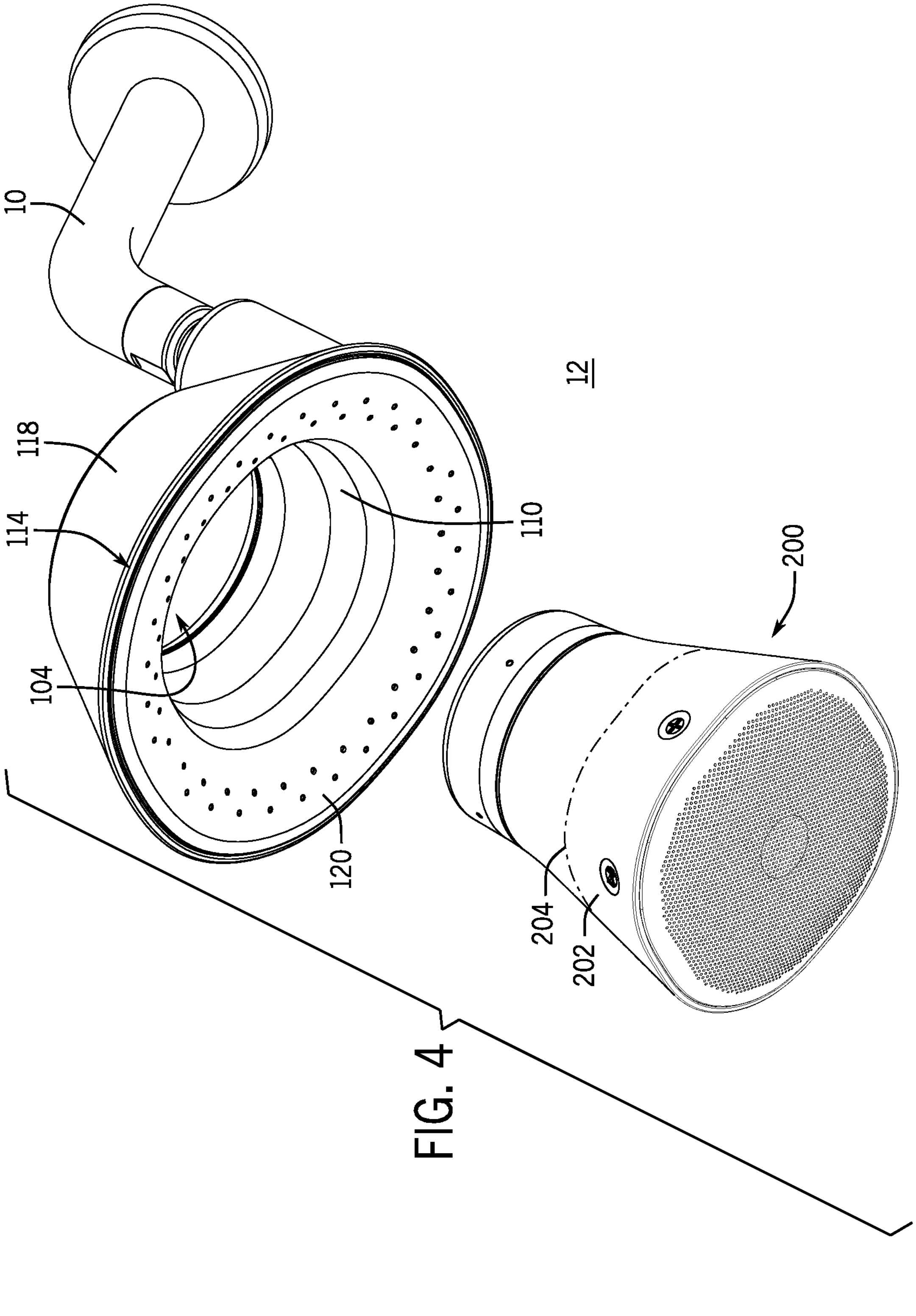
FIG. 4 is a side perspective view of the partially disassembled showerhead assembly of FIG. 1.
Figure 5:
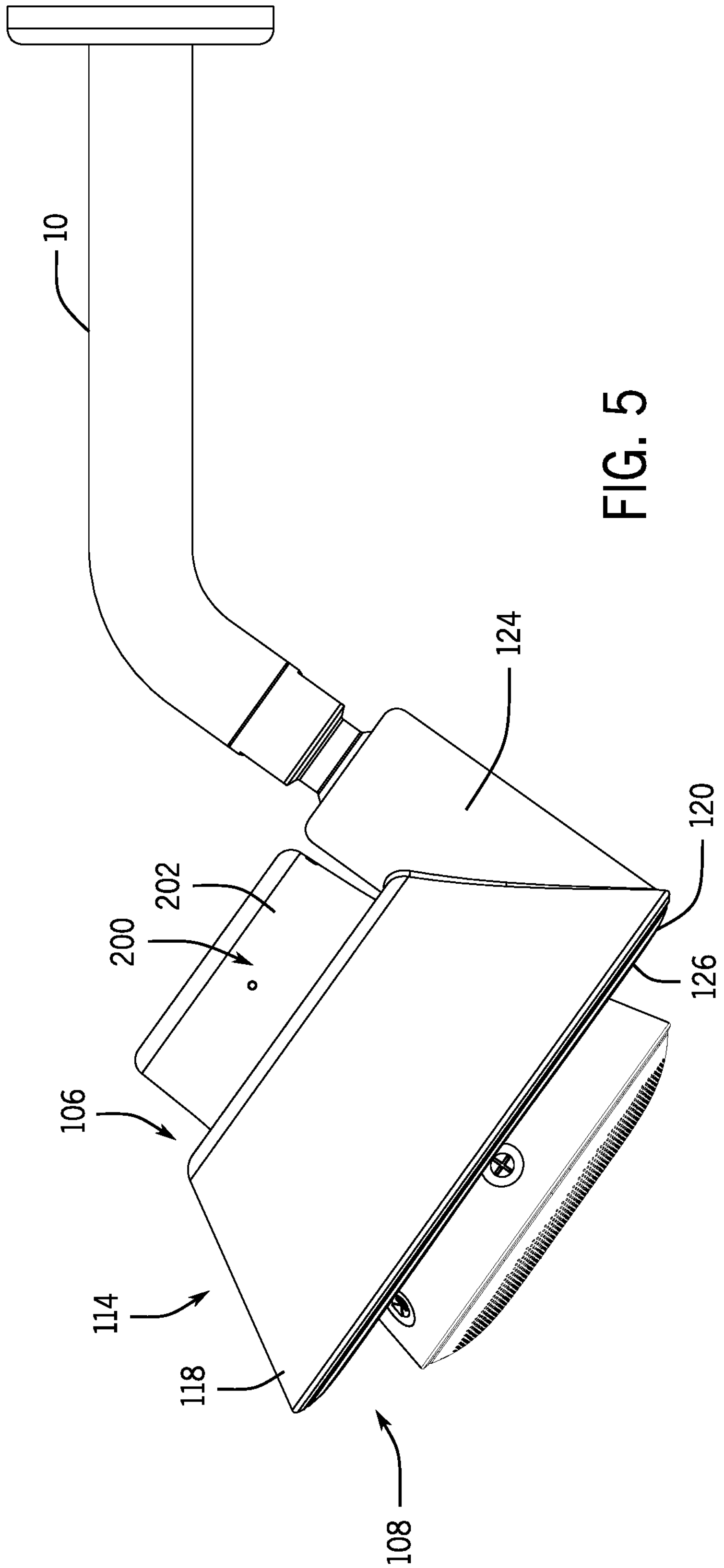
FIG. 5 is a side view of the showerhead assembly of FIG. 1.
Figure 6:
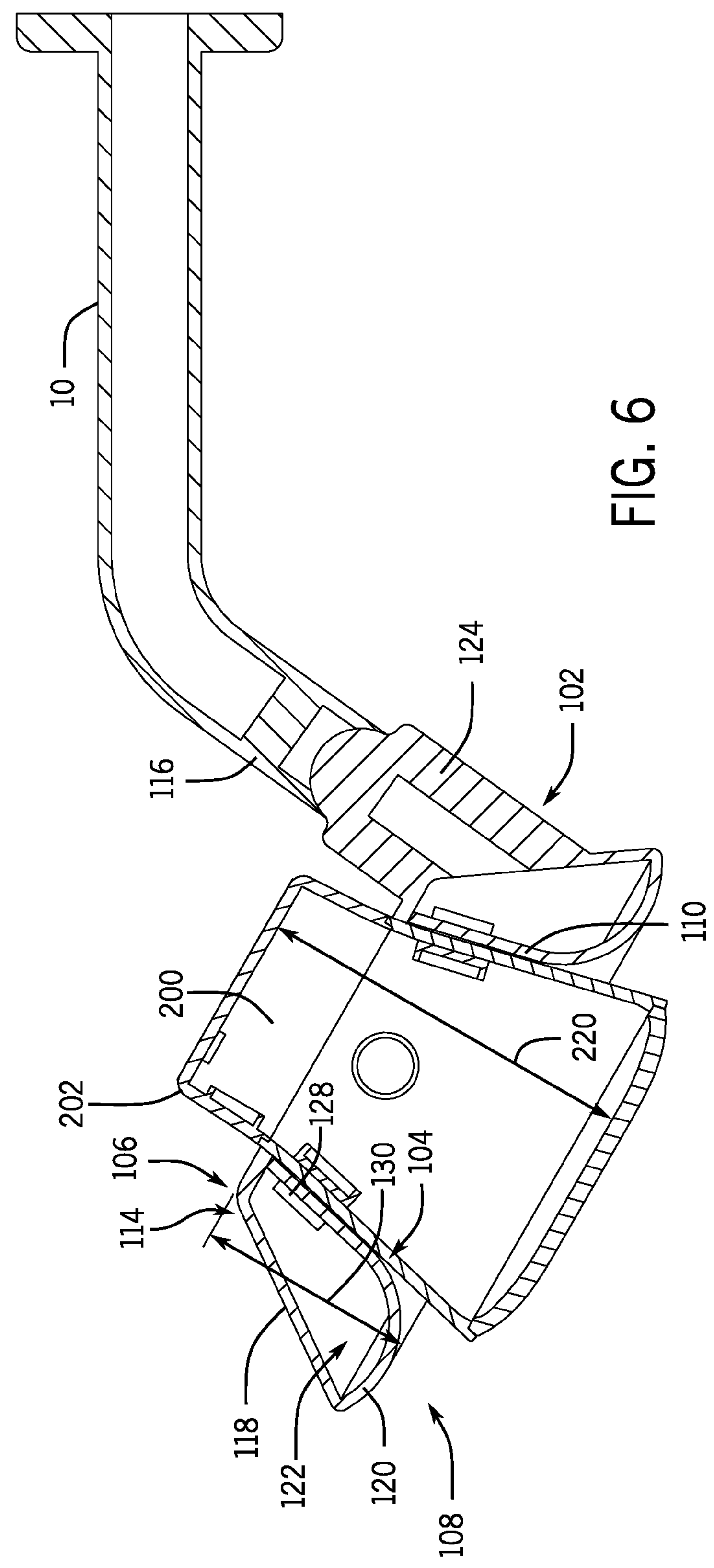
FIG. 6 is a side cross-sectional view of the showerhead assembly of FIG. 1.
Figure 7:
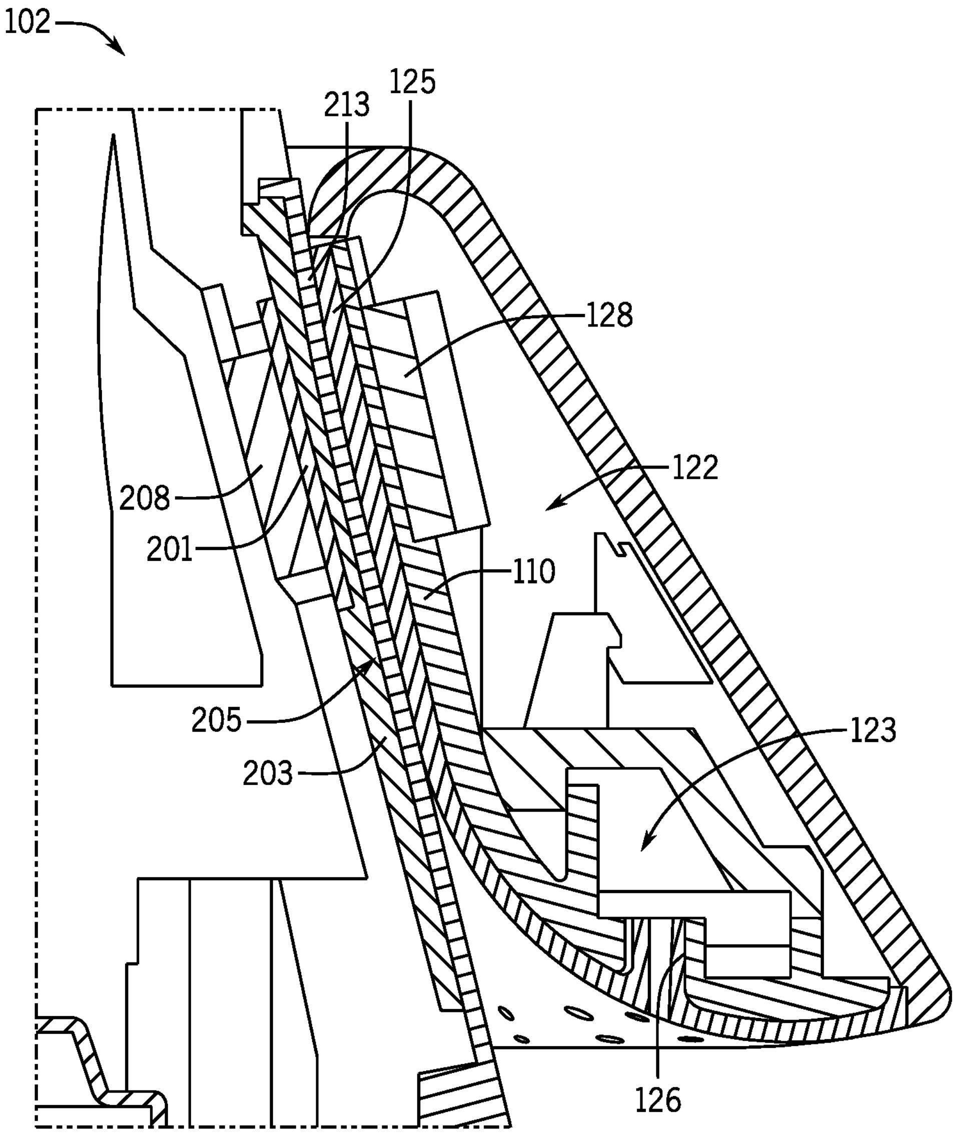
FIG. 7 is a side cross-sectional view of a portion of the showerhead assembly of FIG. 1.

Referring to FIGS. 1-7, a showerhead assembly 100 is shown according to an exemplary embodiment. The showerhead assembly 100 includes a waterway assembly 102 and a wireless speaker 200 removably (e.g., detachably, etc.) coupled thereto. The wireless speaker 200 is fixed in position relative to the waterway assembly 102 when engaged with the waterway assembly 102. More specifically, the wireless speaker 200 is magnetically coupled to the waterway assembly 102. As shown in FIGS. 4-5, the wireless speaker 200 is received within a through-hole opening 104 formed by the waterway assembly 102. The through-hole opening 104 extends through an entirety of the waterway assembly 102 between an upper end 106 and a lower end 108 of the waterway assembly 102. The through-hole opening 104 is an unobstructed aperture through the waterway assembly 102 that provided an unimpeded view through the waterway assembly 102 (e.g., to a wall/ceiling of a shower enclosure, etc.), which simplifies cleaning and improves the overall aesthetic of the waterway assembly 102. The wireless speaker 200 is sized and shaped to extend through the full length of the waterway assembly 102. As shown in FIGS. 5-7, the wireless speaker 200 protrudes beyond both the upper end 106 and the lower end 108 of the waterway assembly 102 when fully engaged with the waterway assembly 102. In other words, an axial length 220 of the wireless speaker 200 is greater than an axial length 130 of the waterway assembly 102 (e.g., an overall axial length of the waterway assembly 102 from a rear surface of the waterway assembly 102 to a front surface of the face plate 120 as shown in FIG. 6). In another embodiment, the axial length 220 of the wireless speaker 200 is substantially equal to the axial length 130 of the waterway assembly 102. In yet another embodiment, the axial length 220 of the wireless speaker 200 is less than the axial length 130 of the waterway assembly 102. Among other benefits, increasing the axial length 220 of the wireless speaker 200 facilitates manual manipulation of the wireless speaker 200 and removal from the waterway assembly 102.

As shown in FIG. 3, the waterway assembly 102 completely surrounds the wireless speaker 200 when the wireless speaker 200 is secured to the waterway assembly 102. The wireless speaker is arranged with respect to the waterway assembly 102 so that sound produced by the wireless speaker 200 is projected downwardly (e.g., toward a user) in generally the same direction that water is dispensed from the waterway assembly 102. Among other benefits, the arrangement of the wireless speaker 200 with respect to the waterway assembly 102 reduces the amount of water that the sound needs to penetrate to reach the user/occupant.

To secure the wireless speaker 200 to the waterway assembly 102, a user positions (e.g., orients) the wireless speaker 200 so that the speaker grill (e.g., face) faces away from the through-hole opening 104 (e.g., such that the speaker grill faces the user). Next, the user aligns the wireless speaker 200 with the through-hole opening 104 so that a central axis of the wireless speaker 200 is approximately parallel to a central axis of the through-hole opening 104. The user then presses or otherwise inserts the wireless speaker 200 into the through-hole opening 104 to engage a first plurality of magnets (e.g., permanent magnets, an element formed from a ferromagnetic material, etc.) in the waterway assembly 102 with a second plurality of magnets in the wireless speaker 200 (a second plurality of magnets and the first plurality of magnets oriented such that opposite poles face each other and attract).

In some exemplary embodiments, the outer wall 202 of the wireless speaker 200 has a non-circular cross-sectional shape where it engages with the waterway assembly 102. As shown in FIG. 4, the cross-sectional shape 204 of the outer wall 202 is approximately rectangular (e.g., rectangular with rounded corners). Among other benefits, the shape of the outer wall 202 facilitates removal of the wireless speaker 200 from the waterway assembly 102. For example, the magnetic force between the first plurality of magnets in the waterway assembly 102 and the second plurality of magnets in the wireless speaker 200 may be large compared to the force that a user can apply in an axial direction (e.g., parallel to a central axis of the through-hole opening 104, etc.). A large magnetic force reduces the risk of the wireless speaker 200 becoming dislodged from the waterway assembly 102 during regular use. To reduce the magnetic force, a user may twist the wireless speaker 200 relative to the waterway assembly 102 to rotate the second plurality of magnets in the wireless speaker 200 out of alignment with the first plurality of magnets in the waterway assembly 102. Rotating the wireless speaker 200 relative to the waterway assembly 102 may also "cam" the inner sidewall 110 of the waterway assembly 102 outwardly and away from the outer wall 202 of the wireless speaker 200 due to misalignment between the shape of the outer wall 202 and the shape of the through-hole opening 104. The "camming" motion may further increase the distance between the first plurality of magnets and the second plurality of magnets, and the resulting attractive force between the first plurality of magnets and the second plurality of magnets. Additionally, the rectangular cross-sectional shape of the outer wall 202 helps support the wireless speaker 200 in position when placed onto a horizontal surface (e.g., a table, countertop, etc.) and prevents the wireless speaker 200 from rolling across the horizontal surface.

In some embodiments, the inner sidewall 110 may be made from a material that facilitates the relative rotational movement (e.g., slipping) between the wireless speaker 200 and the waterway assembly 102 such as hard plastic, silicone, etc. The materials used for the face plate 120 and/or back plate 118 may also enhance the sound output of the wireless speaker 200.

The waterway assembly 102 is configured to couple to a water supply line 10 within a shower enclosure 12 and to dispense water over a distributed area within the shower enclosure 12. In the exemplary embodiments of FIGS. 1-6, the water supply line 10 is a pipe and/or conduit of a water supply (e.g., household/residential, commercial, etc.) that extends inwardly from a wall of the shower enclosure 12. As shown in FIG. 2, the waterway assembly 102 includes a housing 114 and an inlet connector 116. The inlet connector 116 forms an inlet for the waterway assembly 102 into which water is received from the water supply line 10. The inlet connector 116 is threadably coupled to the water supply line 10. In other embodiments, the inlet connector 116 may include quick-connect fittings, or any other suitable fastener that provides a water-tight seal along the flow path between the water supply line 10 and the waterway assembly 102.

The housing 114 is configured to receive water from the inlet connector 116 and to distribute water within the shower enclosure 12. The housing 114 includes a back plate 118 and a face plate 120 coupled to the back plate 118 along both an inner perimeter of the back plate 118 and an outer perimeter of the back plate 118. Together, the back plate 118 and the face plate 120 form a hollow ring-like structure (e.g., a doughnut shaped cavity, etc.), shown as flow distribution cavity 122. The back plate 118 defines an upper wall and an outer sidewall of the flow distribution cavity 122. As shown in FIGS. 5-6, the back plate 118 is tapered inwardly between the lower end 108 and the upper end 106 of the waterway assembly 102 (e.g., the housing 114), such that the diameter of the waterway assembly 102 is reduced near the upper end 106. In other exemplary embodiments, the cross-sectional shape of the distribution cavity 122 may be different.

The face plate 120 forms a lower wall and the inner sidewall 110 of the flow distribution cavity 122 and adjoins the through-hole opening 104. More specifically, the face plate 120 includes a first portion that extends radially inwardly from an outer perimeter of the back plate 118 and a second portion that extends toward the inner perimeter of the back plate 118 in substantially perpendicular orientation relative to the first portion (e.g., substantially parallel to the central axis of the through-hole opening 104). The first portion forms a spray face for the waterway assembly 102 through which water is ejected from the flow distribution cavity 122. As shown in FIG. 6, the second portion (e.g., the inner sidewall 110) is tapered inwardly between the lower end 108 and the upper end 106 of the waterway assembly 102 to match the shape of the outer wall 202 of the wireless speaker 200.

As shown in FIGS. 5-6, the housing 114 further includes an inlet extension 124 disposed proximate to an outer perimeter of the waterway assembly 102, at a fixed circumferential position along the outer perimeter. The inlet extension 124 extends upwardly from the housing 114 in substantially parallel orientation relative to the central axis of the through-hole opening 104. The inlet connector 116 is radially offset from a central axis 105 of the through-hole opening 104 (e.g., the connection point between the waterway assembly 102 and the water supply line is located radially outwardly from the through-hole opening 104, between an inner and outer edge of the face plate 120). In the exemplary embodiment of FIGS. 1-6, the inlet extension 124 is pivotably coupled to the inlet connector 116 such that the waterway assembly 102 may rotate and/or pivot about a connection point between the inlet connector 116 and the inlet extension 124. In some embodiments, one of the inlet extension 124 and the inlet connector 116 includes a ball joint configured to facilitate repositioning of the waterway assembly 102 within the shower enclosure 12 (relative to the water supply line 10). In other embodiments, movement of the waterway assembly 102 is limited to rotation about the inlet connector 116 (e.g., rotation about a central axis of the inlet connector 116). Because the wireless speaker 200 is fixed in position relative to the waterway assembly 102, the user may reposition the wireless speaker 200 (e.g., adjust a height of the wireless speaker 200 relative to the user) by rotating and/or pivoting the waterway assembly 102.

As shown in FIG. 3, the waterway assembly 102 includes a plurality of openings 126 or nozzles disposed on the first portion of the face plate 120 and circumferentially surrounding the through-hole opening 104. The openings 126 are fluidly coupled to the flow distribution cavity 122 and are configured to deliver water from the flow distribution cavity 122 in streams over a distributed area within the shower enclosure 12. In some embodiments, at least some of the openings 126 may be angled (e.g., a cylindrical cut through the face plate 120 that defines the opening 126 may be angled relative to the central axis of the through-hole opening 104) to provide more uniform water coverage across the lower end 108 of the waterway assembly 102 (e.g., across a projected area forward of the through-hole opening 104). For example, at least some of the openings 126 may be angled inwardly toward the central axis of the through-hole opening 104 to provide water over an area that is in-line with the wireless speaker 200. In the exemplary showerhead assembly 100 of FIGS. 1-6, the openings 126 are arranged to provide approximately uniform water coverage at a distance of approximately 18 inches from the spray face (i.e., 18 inches from the lower end 108) in a direction parallel to the central axis of the through-hole opening 104. In other embodiments, the pattern of outlet openings 126 (e.g., spacing, number, size, etc.) may be different. In some embodiments, the outlet openings 126 may be replaced with nozzles that provide different flow characteristics or with multiple sets of openings and/or nozzles that provide a user with the ability to vary the spray profile (e.g., intensity, spray pattern, etc.) provided by the showerhead assembly 100.

As shown in FIG. 6, the waterway assembly 102 includes a first plurality of magnets, shown as first magnets 128, coupled to the inner sidewall 110 of the housing 114, proximate the upper end 106 of the waterway assembly 102. The first magnets 128 are spaced equally along the perimeter of the inner sidewall 110. In the exemplary embodiment of FIG. 6, the first magnets 128 are disposed in the vicinity of (e.g., proximate to) the flow distribution cavity 122. In some embodiments, the first magnets 128 are secured to the inner sidewall 110 using an adhesive product such as glue, epoxy, or the like. In other embodiments, the first magnets 128 are positioned within pockets that are molded, or otherwise formed, into the face plate 120. FIG. 7 shows a side cross-sectional view through a portion of the waterway assembly 102. The flow distribution cavity 122 includes a distribution waterway 123 that extends circumferentially through the flow distribution cavity 122 and is configured to deliver water to the outlet openings 126. As shown in FIG. 7, the distribution waterway 123 isolates the water from the first magnets 128 and therefore prevents corrosion of the first magnets 128. The distribution waterway 123 may be an insert that is welded, clipped, or otherwise fastened to the waterway assembly 102 such that the distribution waterway 123 is sealingly engaged with the waterway assembly 102. A total of four first magnets 128 are included with the waterway assembly 102 of FIGS. 1-7, although the number and/or positioning of the first magnets 128 may differ in various exemplary embodiments.

Referring to FIGS. 8-11, the wireless speaker 200 of FIGS. 1-7 is shown according to an exemplary embodiment. The wireless speaker 200 includes an enclosure, shown as speaker housing 205, a face 206, internal speaker components (not shown), a second plurality of magnets 208, and at least one rear magnet 210. To maximize the magnetic force, the second plurality of magnets 208 and the first plurality of magnets 128 are positioned as close to one another as possible when the wireless speaker 200 is engaged with the waterway assembly 102. As shown in FIG. 7, the second plurality of magnets 208 are positioned adjacent to the outer wall of the housing 205 and the first magnets 128 are positioned adjacent to the inner sidewall 110 of the waterway assembly 102. As shown in FIG. 7, the arrangement of materials starting from one of the second plurality of magnets 208 in a direction extending radially outward from the centerline of the wireless speaker 200 (e.g., left to right as shown in FIG. 7) is as follows: (1) second magnet 208; (2) foam support 201 that is "sandwiched" or otherwise disposed between the second magnet 208 and the outer wall of the housing 205; (3) rigid shell 203 (e.g., outer wall); (4) soft shell 213 over the rigid shell 203; (5) soft showerhead overmold 125; (6) sidewall 110 (e.g., rigid showerhead inner sidewall); and (7) first magnet 128. The materials used for different parts of the waterway assembly 102 and wireless speaker 200 may differ in various exemplary embodiments. In an exemplary embodiment, the rigid shell 203 and the sidewall 110 are made from a stiff material such as plastic, stainless steel, etc., while the soft shell 213 and showerhead overmold 125 are made from a soft, flexible plastic or rubber.

Figure 11:
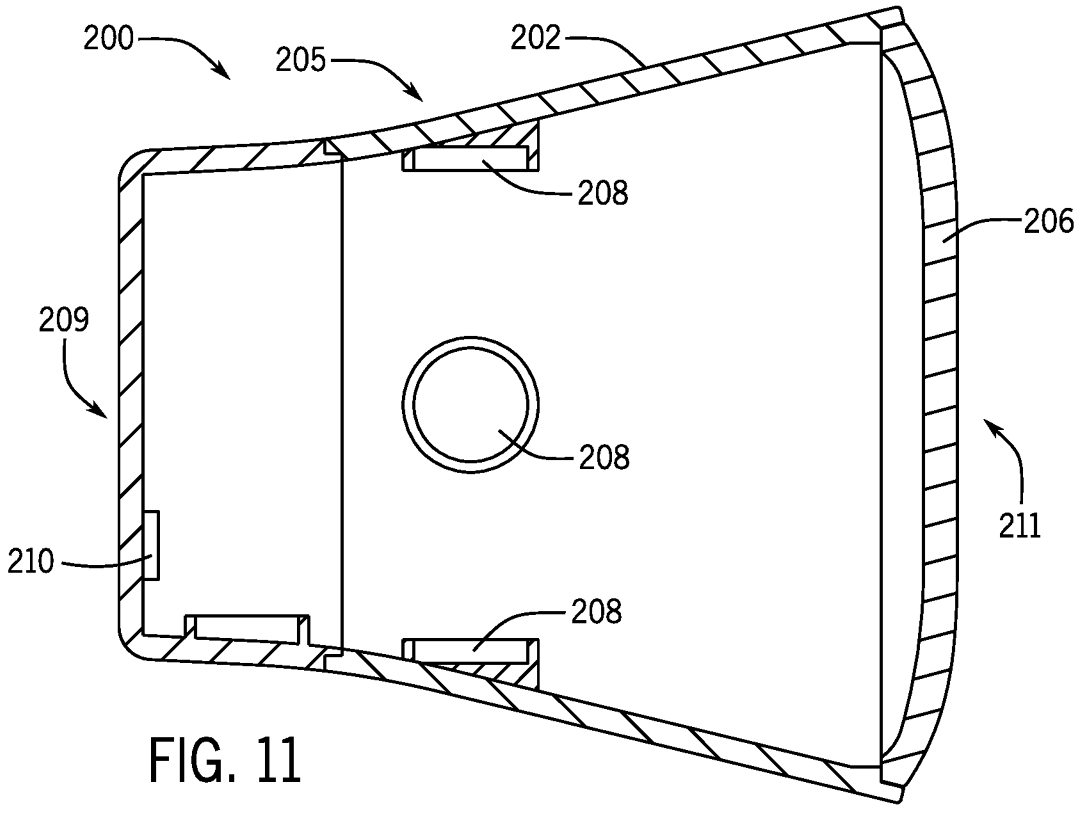
FIG. 11 is a side cross-sectional view of the wireless speaker of FIG. 8.

As shown in FIG. 11, the wireless speaker 200 includes a second plurality of magnets 208 and at least one rear magnet 210. The second plurality of magnets 208 are configured to facilitate the magnetic connection between the wireless speaker 200 and the waterway assembly 102 (see also FIGS. 1-7). More specifically, the second plurality of magnets 208 are configured to engage with the first plurality of magnets 128 in the housing 114 of the waterway assembly 102. As shown in FIG. 11, each of the second plurality of magnets 208 are coupled to an interior surface of the outer wall 202, between the forward end 211 and the rear end 209 of the speaker housing 205. The second plurality of magnets 208 may be secured to the inner surface using an adhesive product, and/or inserted into pockets or recessed areas molded into (or otherwise formed) on the inner surface. The magnets 208 are spaced equally along a perimeter of the inner surface. In the exemplary embodiment of FIG. 11, the second plurality of magnets 208 include four circular magnets positioned at 90° increments along the perimeter of the inner surface. In other embodiments, the size, shape, and/or position of the second plurality of magnets 208 may be different.

The rear magnet 210 is configured to connect the wireless speaker 200 to a charging station (e.g., a dock, etc.) for the wireless speaker 200. As shown in FIG. 11, the rear magnet 210 is coupled to the inner surface of the outer wall 202 proximate the rear end 209 of the speaker housing 205 (along a back wall portion of the outer wall 202). The rear magnet 210 may be sized and shaped similar or the same as the second plurality of magnets 208 and/or the first plurality of magnets 128 (see also FIG. 6). In the embodiment of FIG. 11, the rear magnet 210 is smaller than each one of the second plurality of magnets 208.

In various exemplary embodiments, at least some of the magnets may be replaced with a magnetically permeable material (e.g., a ferrous material) such as iron or another metal. For example, the first magnets 128 may be replaced with pieces of iron that interact with the second plurality of magnets 208 in the wireless speaker 200. Alternatively, the waterway assembly 102 may include the first magnets 128 and the second plurality of magnets 208 may be replaced with a pieces of iron that interact with the first magnets 128. In some exemplary embodiments, the materials used for one of the housing 205 of the wireless speaker 200 or the inner sidewall 110 of the waterway assembly 102 may be made from iron or another magnetically permeable material. Furthermore, it will be understood that at least one magnet from any pair of interacting magnets disclosed herein may optionally be replaced with a piece of iron or another magnetically permeable material as opposed to using two permanent magnets.

As shown in FIG. 11, the speaker housing 205 defines an outer wall 202 of the wireless speaker 200 that encloses the speaker components. The outer wall 202 defines an opening (e.g., speaker outlet) through which the speaker components may be inserted into the outer wall 202 during manufacturing. The outer wall 202 is shaped to facilitate installation of the wireless speaker 200 into the waterway assembly 102 (see FIG. 4). As shown in FIGS. 8-11, a rear end 209 of the outer wall 202, opposite the opening, has a circular cross-sectional shape. A forward end 211 of the outer wall 202 adjacent to the opening has a rectangular cross-sectional shape with rounded corners. The shape of the outer wall 202 transitions gradually between the rear end 209 and the forward end 211. Additionally, the overall diameter (e.g., size) of the outer wall 202, in a cross-section oriented normal to the central axis of the wireless speaker 200, increases gradually between the rear end 209 and the forward end 211. Among other benefits, the size and shape of the wireless speaker 200 at the rear end 209 simplifies alignment and insertion into the waterway assembly 102 (e.g., the size of the rear end 209 is smaller than the smallest diameter of the through-hole opening 104).

The face 206 is sealably coupled to the speaker housing 205, over the opening of the outer wall 202, to form a watertight seal between the speaker components and the environment surrounding the wireless speaker 200. For example, the face 206 may be secured to the outer wall 202 by welding (e.g., ultrasonically), an adhesive product (e.g., glue, epoxy, etc.) to ensure a water-tight seal along the interface between the face 206 and the outer wall 202. The face 206 may be perforated to allow sound to exit the speaker housing 205 through the opening. In some embodiments, the wireless speaker 200 further includes a water-impermeable screen disposed behind the face 206 and extending across the face 206. The screen may be micro-etched to provide sound permeability/water impermeability. In the exemplary wireless speaker 200 of FIGS. 8-11, the wireless speaker 200 is waterproof and can be submerged within a volume of water up to 1 meter below the surface of the water and for a period of approximately 30 minutes. In other embodiments, the wireless speaker 200 may accommodate shallower/deeper submerged depths and shorter/longer periods underwater. In some embodiments, the face 206 may be made from a different material than the speaker housing 205 (e.g., the face 206 may be a metal grill and the speaker housing 205 may be made from plastic, etc.).

Figure 12:
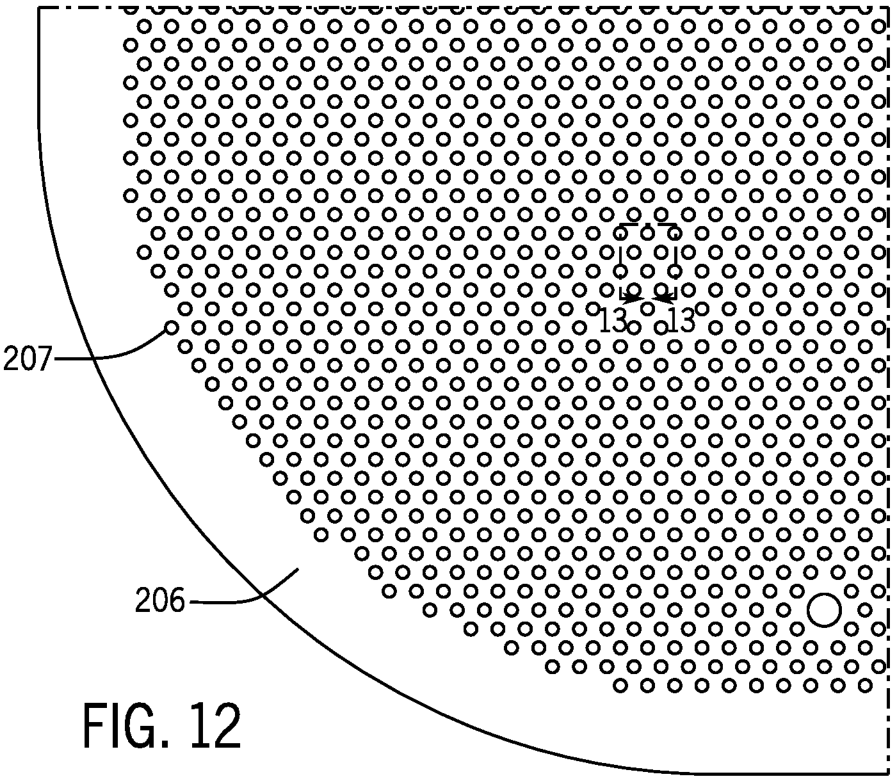
FIG. 12 is a front view of a portion of a face of the wireless speaker of FIG. 8.
Figure 13:
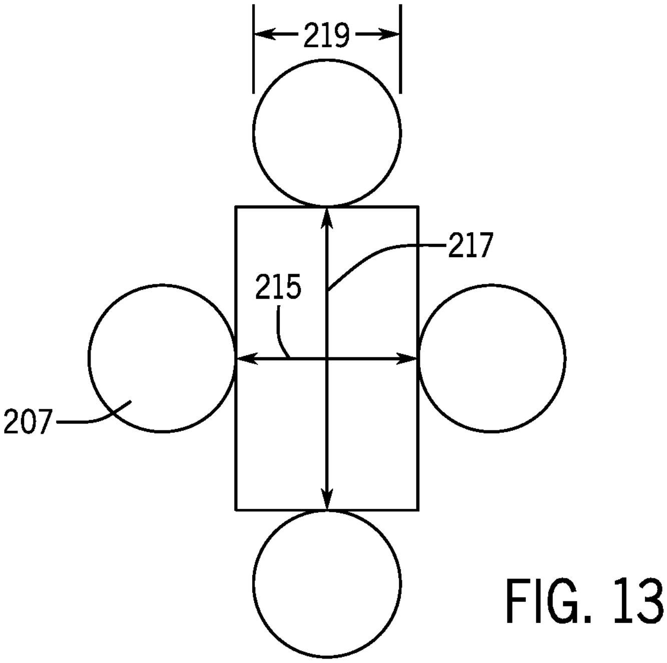
FIG. 13 is a front view of a unit cell arrangement of a plurality of openings across the face of FIG. 12.

FIGS. 12-13 are front views of a portion of the face 206. The face 206 is perforated with a plurality of openings 207 (e.g., circular holes) that allow for the transmission of sound through the face 206. The openings 207 are arranged in a pattern across the face 206 to balance the available surface area with the packing density of the openings 207. FIG. 13 shows a repeating unit cell that is used to create the pattern across the face 206. As shown, the openings 207 are arranged around a rectangular shaped space. The spacing between openings 207 may differ in various exemplary embodiments. In the embodiment of FIG. 13, the outer perimeter of the openings 207 are spaced apart in a horizontal direction by a horizontal spacing 215 of approximately 0.9 mm. A vertical spacing 217 (e.g., distance) between the outer perimeter of the openings 207 normal to the horizontal spacing 215 is approximately 1.5 mm. As shown in FIG. 13, a diameter 219 of the each of the openings 207 is approximately 0.7 mm, but may be different in various exemplary embodiments.

The wireless speaker 200 includes various speaker components, which together are configured to generate sound based on an input signal from a control device. In the exemplary embodiment of FIGS. 8-11, the speaker components include a speaker (e.g., an electroacoustic transducer, a driver, an amplifier, etc.) that generates sound from an electrical audio signal, a communication component for receiving and/or transmitting data between the wireless speaker 200 and other devices, a user interface for controlling the wireless speaker 200, a controller, and a power source for powering the speaker components. In other exemplary embodiments, the wireless speaker 200 may include additional, fewer, and/or different components.

The communication component includes a wireless communication device (e.g., a Bluetooth transceiver, a Bluetooth receiver, a near-field communication (NFC) transceiver, an NFC receiver, a Wi-Fi transceiver, a Wi-Fi receiver or another wireless communications protocol) or other similar device. The communication component is configured to communicably couple the wireless speaker 200 with a control device. The control device may be one of a variety of different mobile devices, including a smartphone, a laptop, a tablet, or another wirelessly connected device. The communication component may provide one- or two-way communication with the control device.

Figure 8:
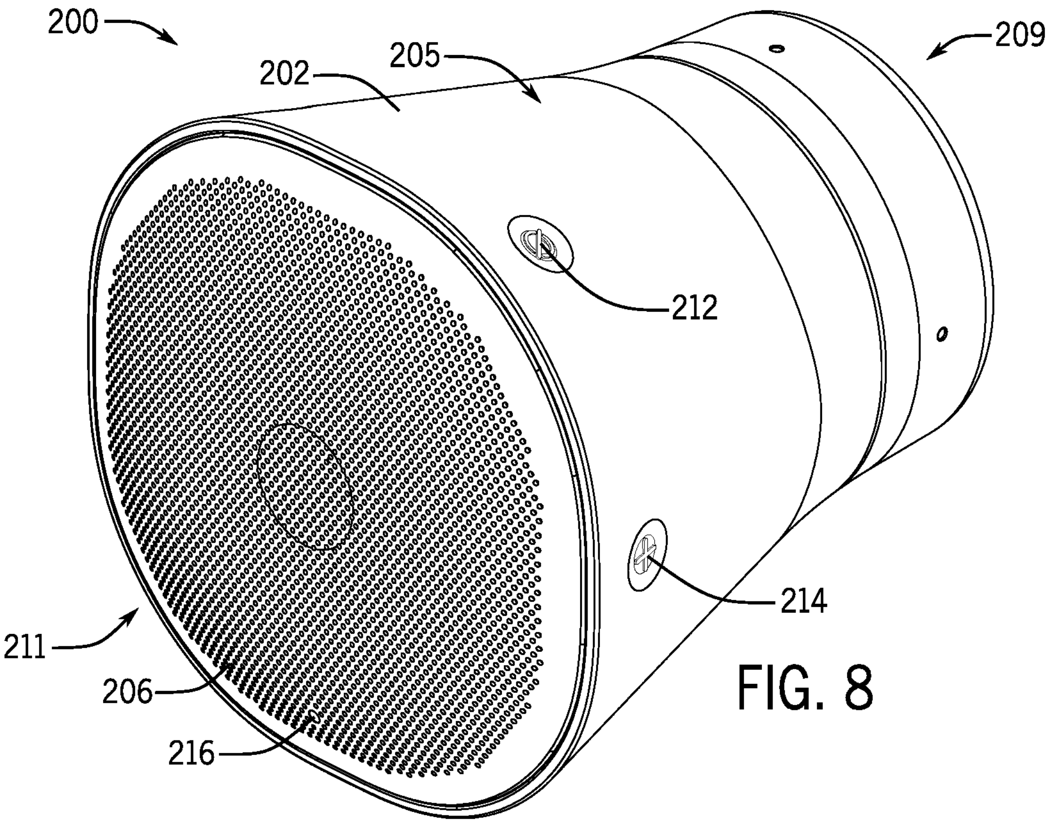
FIG. 8 is a perspective view of a wireless speaker, according to an exemplary embodiment.
Figure 9:
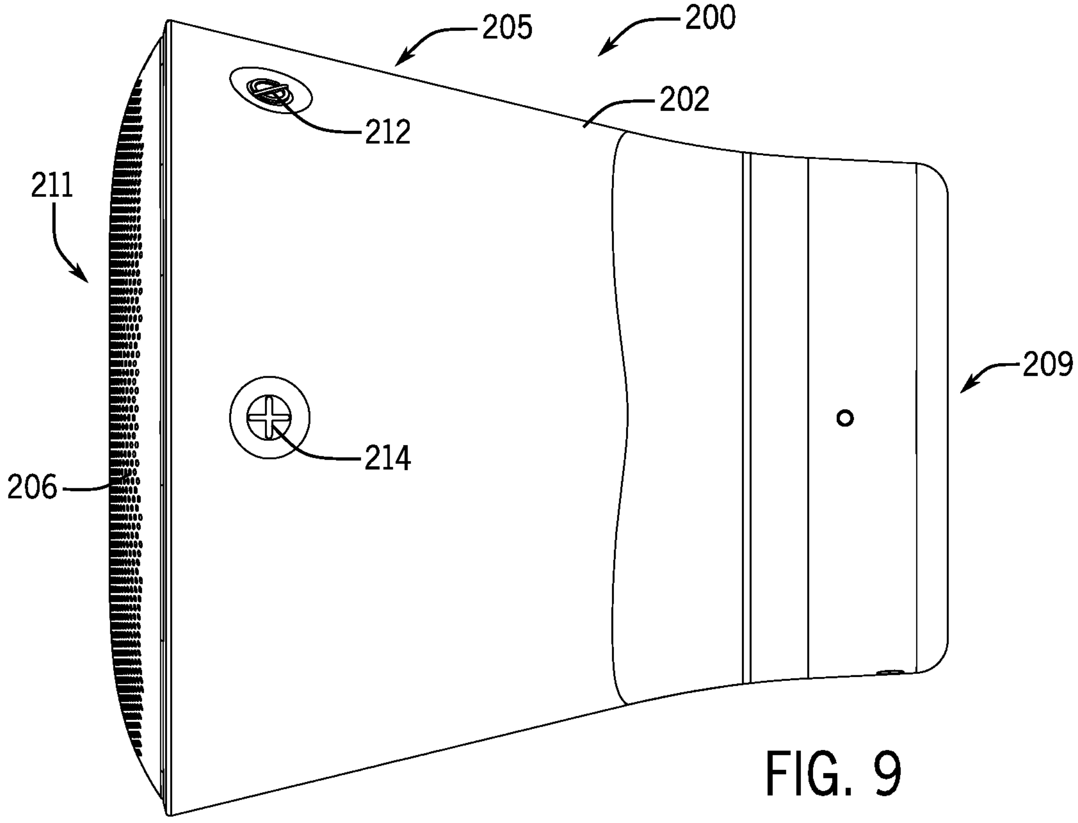
FIG. 9 is a side view of the wireless speaker of FIG. 8.
Figure 10:
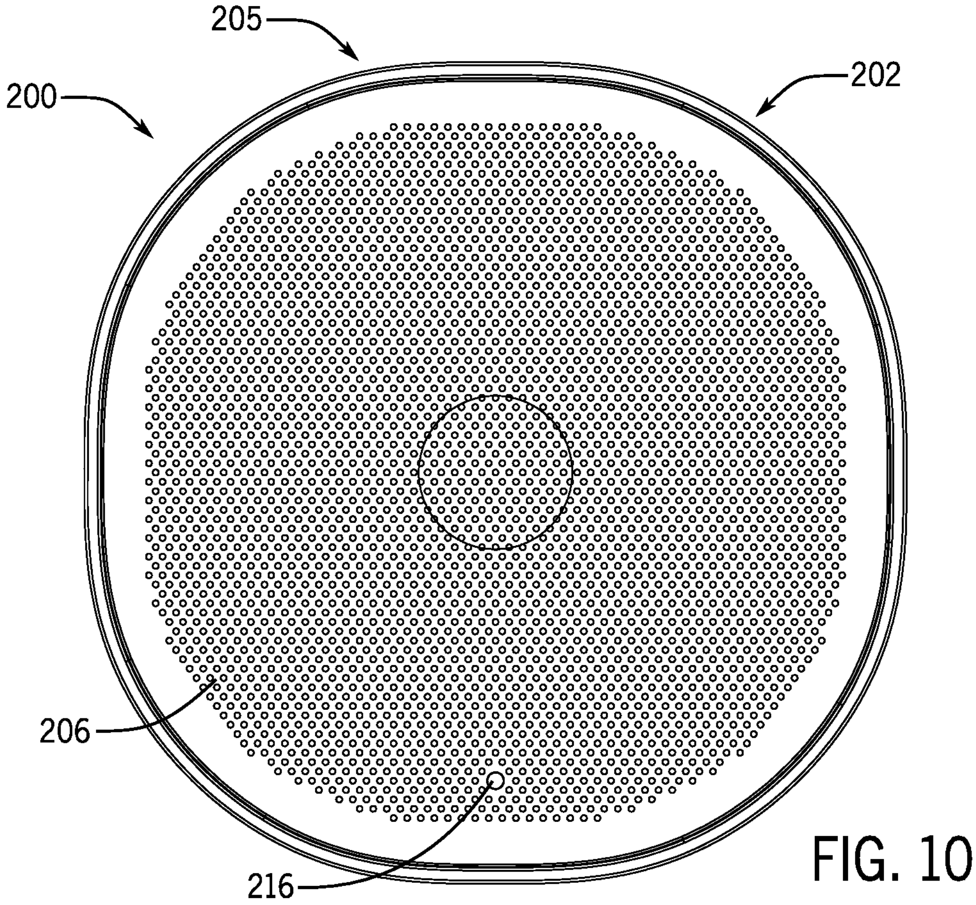
FIG. 10 is a front view of the wireless speaker of FIG. 8.

As shown in FIGS. 8-10, the wireless speaker 200 includes a user interface including a plurality of control buttons to manipulate operating parameters of the wireless speaker 200. In the exemplary embodiment of FIGS. 8-10, the user interface includes a mute button 212 configured to selectively deactivate the speaker (i.e., to enable and/or disable audio), and volume control buttons 214 configured to allow a user to control the volume of sound output from the speaker. In other embodiments, the wireless speaker 200 may include other input buttons such as a key pad, a touch pad, a touch screen, etc. The user interface additionally includes a microphone configured to receive voice commands from a user to facilitate remote control of the wireless speaker 200 by a user and/or to allow the user to interact with an embedded smart hub (e.g., artificial intelligence device, virtual assistant, etc.). The microphone may be tuned to receive and interpret audio above water noise produced by the shower or bath. In some embodiments, the wireless speaker 200 may include multiple microphones (e.g., three far field microphones) to reduce acoustic noise and improve voice recognition within the shower or bath.

Figure 14:
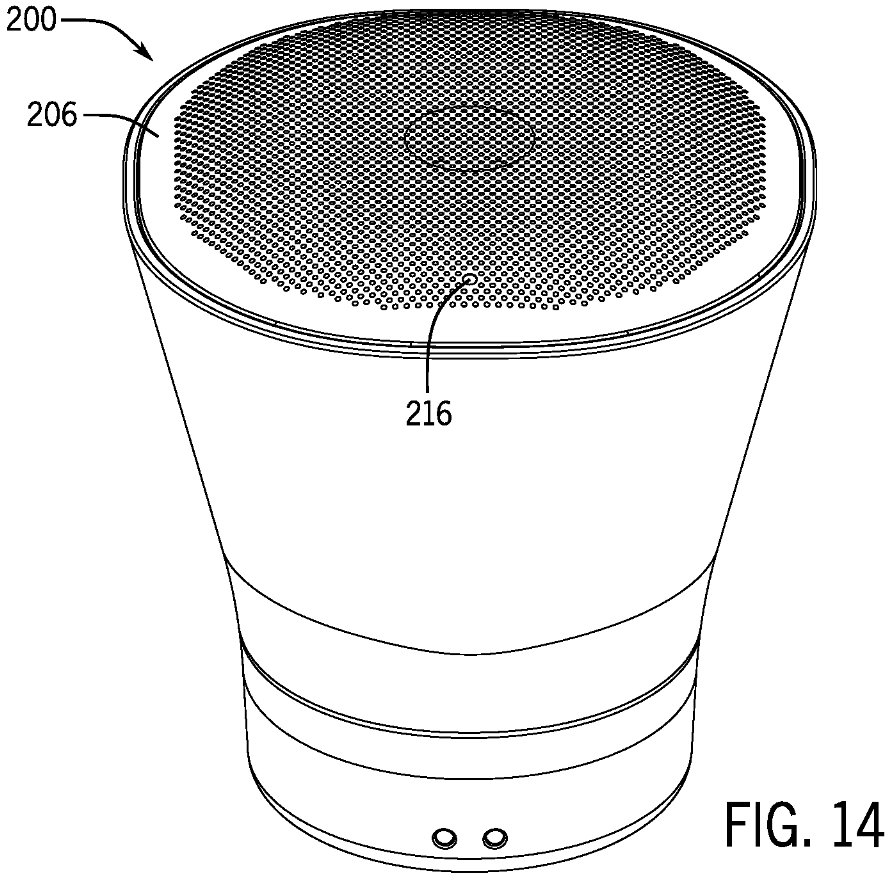
FIG. 14 is a bottom perspective view of the wireless speaker of FIG. 8.
Figure 15:
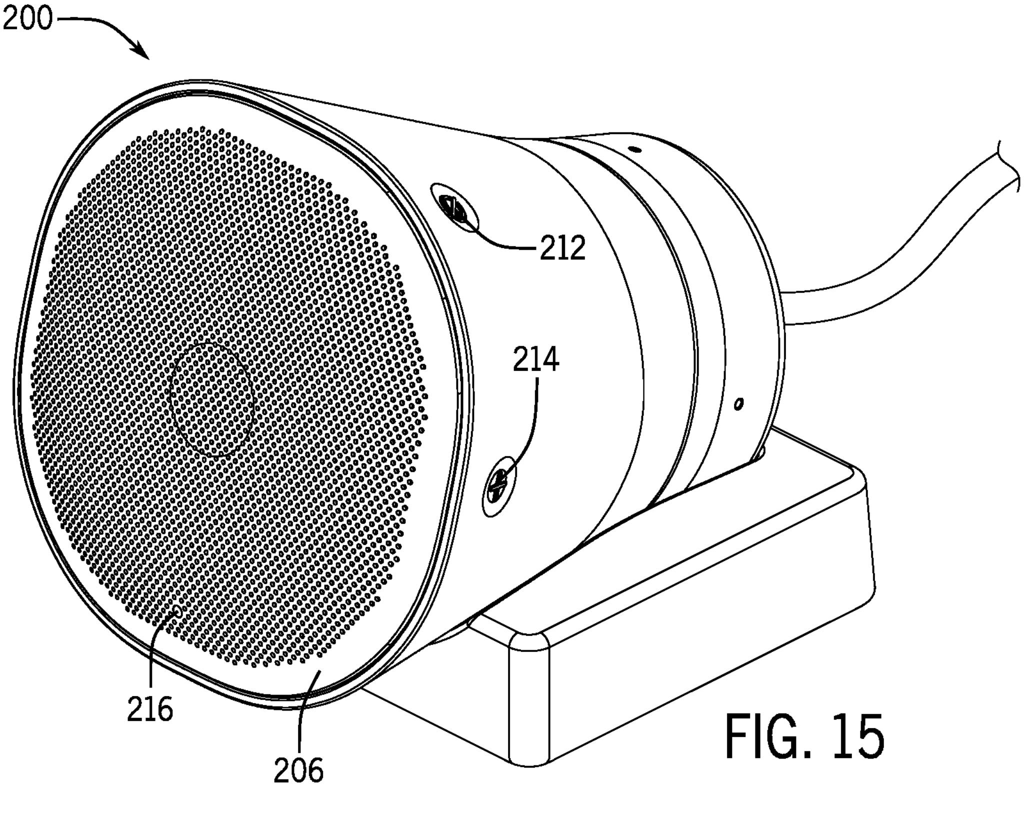
FIG. 15 is a side perspective view of the wireless speaker of FIG. 8 and a docking station for the wireless speaker, according to an exemplary embodiment.

As shown in FIGS. 14-15, the user interface further includes an indicator 216 configured to provide status information regarding the wireless speaker 200 to a user. The indicator 216 is a light (e.g., a light emitting diode (LED), etc.) disposed on the face 206 of the wireless speaker 200, proximate to a perimeter of the wireless speaker 200. In other embodiments, the light may be positioned at different areas along the face 206 and/or outer wall 202. In some embodiments, the indicator 216 may include multiple lights. Among other functions, the light can vary in color and/or intensity based on the status information being reported. For example, the light may be used to provide a visual indication of the pairing status between the wireless speaker 200 and the control device (e.g., a red light to indicate that pairing is unsuccessful, a green light to indicate that pairing is successful). Additionally, the light may be used to indicate a charging state of the wireless speaker 200 (e.g., a blinking light to indicate that the wireless speaker 200 is charging, a steady light to indicate that a battery within the wireless speaker 200 is fully charged, etc.). The light may also convey information to a user regarding interaction with the embedded smart hub (e.g., whether a verbal command has been received by the microphone, controller, etc.). In the exemplary embodiment of FIGS. 14-15, the light provides a nightlight function to illuminate an area within a building at night when a user gets up to go to the bathroom, to get a drink, etc. The control parameters for the light may be adjusted via buttons on the wireless speaker 200 or wirelessly (e.g., remotely) from the control device (e.g., using an application on the control device).

The controller for the wireless speaker is configured to facilitate communication between the various speaker components. The controller may include a processor that is operably coupled to, and configured to coordinate interaction between, the various speaker components. For example, the controller may be configured to receive electrical signals generated by the microphone in response to voice commands and to take action based on the voice commands. In addition to providing wireless audio (e.g., Bluetooth audio) originating from the control device, the controller may also be configured to function as a standalone smart hub (e.g., artificial intelligence (AI), virtual assistance, etc.). For example, the controller may include one of a variety of different AI assistant devices such as Amazon Alexa, Google assistant, Apple Siri, Alibaba assistant, and/or other smart hub formats. Among other benefits, integrating a "smart" device within the wireless speaker 200 centralizes control to a single device within the bathroom area, rather than requiring multiple control devices throughout the building. The wireless speaker 200 may provide the functionality of a traditional "smart" hub or AI assistant to any user or individuals within the area near the wireless speaker 200. For example, the embedded AI assistant may be used to access music, check the news, set alarms, and answer questions from within the shower enclosure 12. Additionally, a user may use the embedded AI assistant to control other components within the building. For example, the user may ask the AI assistant to control the shower (e.g., "turn on the shower," "set my shower to 103° F.," etc.) and/or other components within the building.

The power source includes a battery to power the various speaker components and to allow the wireless speaker 200 to operate remotely. In the exemplary embodiment of FIGS. 8-11, the wireless speaker 200 includes a rechargeable battery (e.g., Lithium Ion (LIB), etc.). In some exemplary embodiments, the wireless speaker 200 is configured for inductive charging by a charging device. In other exemplary embodiments, the power source may further include a pair of terminals to facilitate electrical connection between the battery and an external power source (e.g., a 120 VAC outlet in a building, etc.). The terminals may be disposed on the outer wall 202 of the speaker housing 205. In yet other exemplary embodiments, the battery may be removable for charging and/or replacement. For example, the battery may be part of a battery pack removable from the speaker housing 205 as a unit (e.g., a rear portion of the speaker housing 205 may form the removable battery pack and be separable from a front portion of the speaker housing 205). In other embodiments, the battery pack may be supported in a closable compartment on the speaker housing 205 (e.g., a compartment accessible through the outer wall 202, etc.). In some embodiments, the controller is configured to automatically power down the wireless speaker 200 after a period of non-use (e.g., 10-15 minutes) to conserve battery life.

Figure 17:
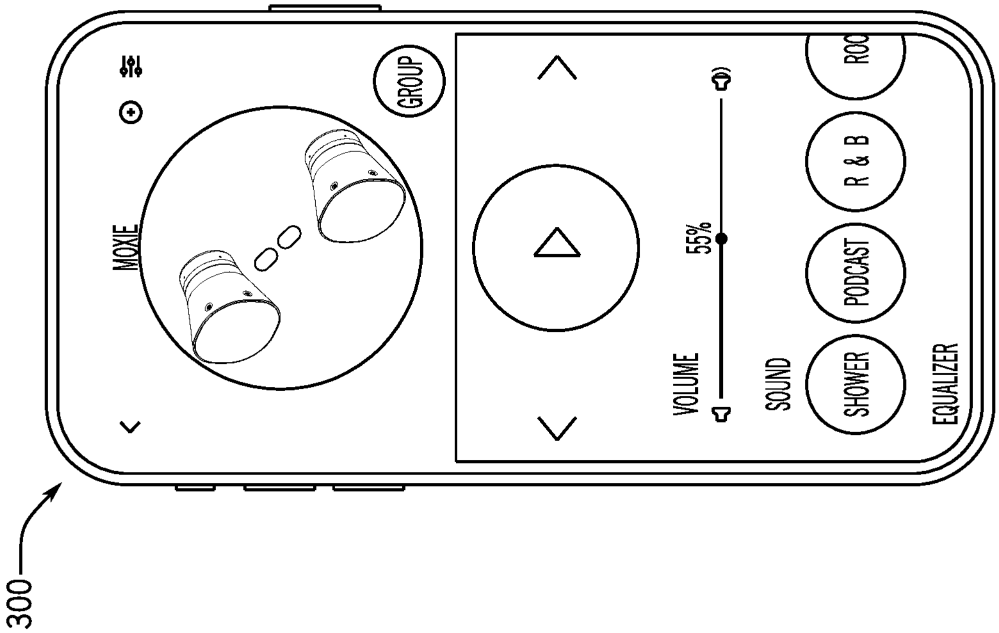
FIG. 17 is a conceptual illustration of a second control screen of a user interface for a wireless speaker, according to an exemplary embodiment.
Figure 16:
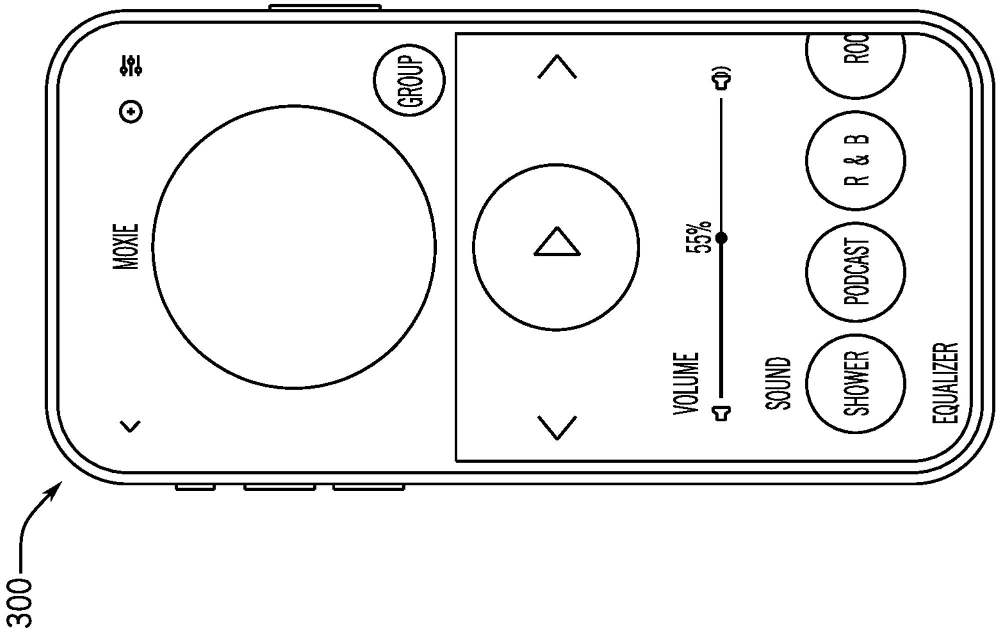
FIG. 16 is a conceptual illustration of a first control screen of a user interface for a wireless speaker, according to an exemplary embodiment.
Figure 18:
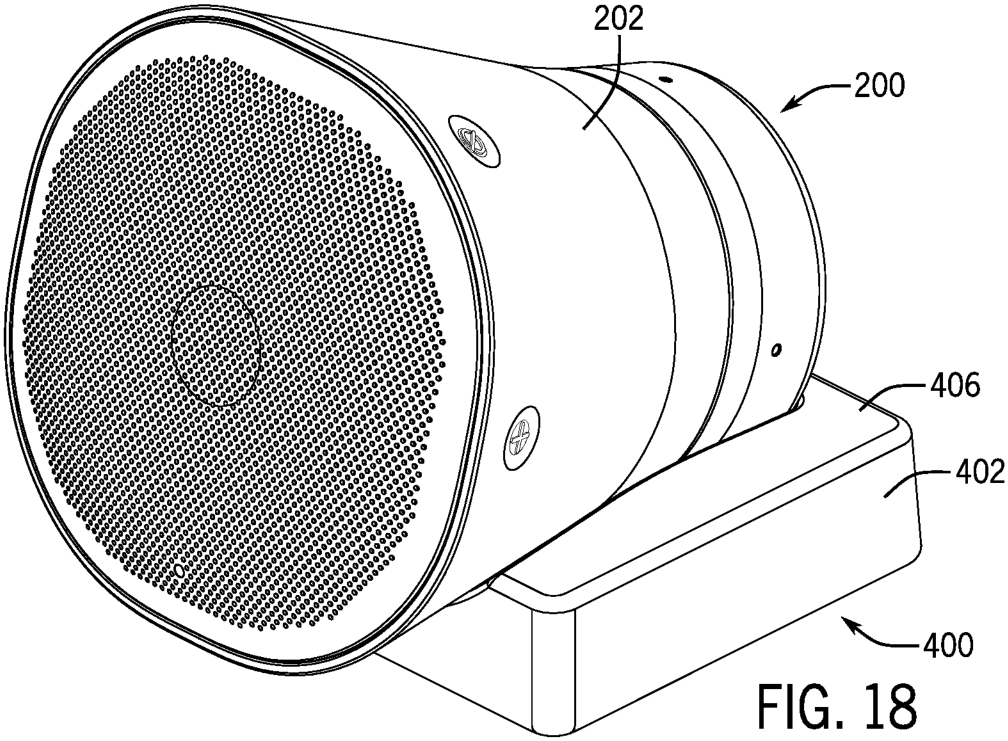
FIG. 18 is another side perspective view of the wireless speaker and docking station of FIG. 15.

The wireless speaker 200 may be connected to a variety of different control devices including smartphones, laptops, tablets, and other wireless communication devices. In some embodiments, the wireless speaker 200 may be controlled through a software application (app) on the control device. Referring to FIGS. 16-17, a control device 300 is shown to include a smartphone. The controls for the wireless speaker 200 are accessed through an app on the smartphone. The app allows a user to wirelessly control the operating parameters of the wireless speaker 200 including volume, sound quality (e.g., equalizer settings), and control settings for the indicator. The app may also be used to facilitate pairing of the wireless speaker 200 to the smartphone. In some embodiments, as shown in FIG. 17, the app may be used to pair (e.g., group) multiple wireless speakers 200 to the smartphone and to coordinate interaction between multiple wireless speakers 200. For example, the app may be used to setup stereo sound by setting one of a pair of wireless speakers 200 as a "right" speaker to process a first audio signal and the remaining wireless speaker 200 as a "left" speaker to process a second audio signal that is different from the first audio signal, rather than playing the same sounds through both wireless speakers 200 simultaneously. In other embodiments, the app may be used to group multiple wireless speakers 200 to create a custom multiroom audio system.

The app may also be used to setup music playlists for the wireless speakers 200 and/or to perform other control functions.

Figure 19:
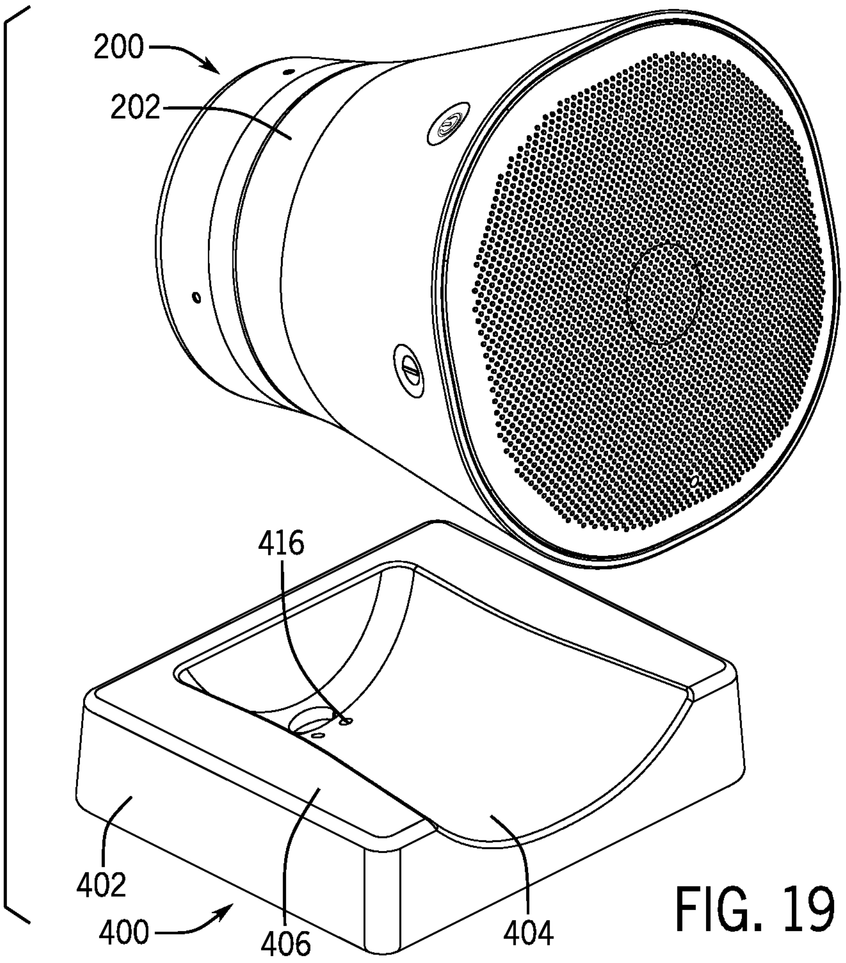
FIG. 19 is a side perspective view of the wireless speaker and docking station of FIG. 15 that shows the speaker separated from the charging station.
Figure 20:
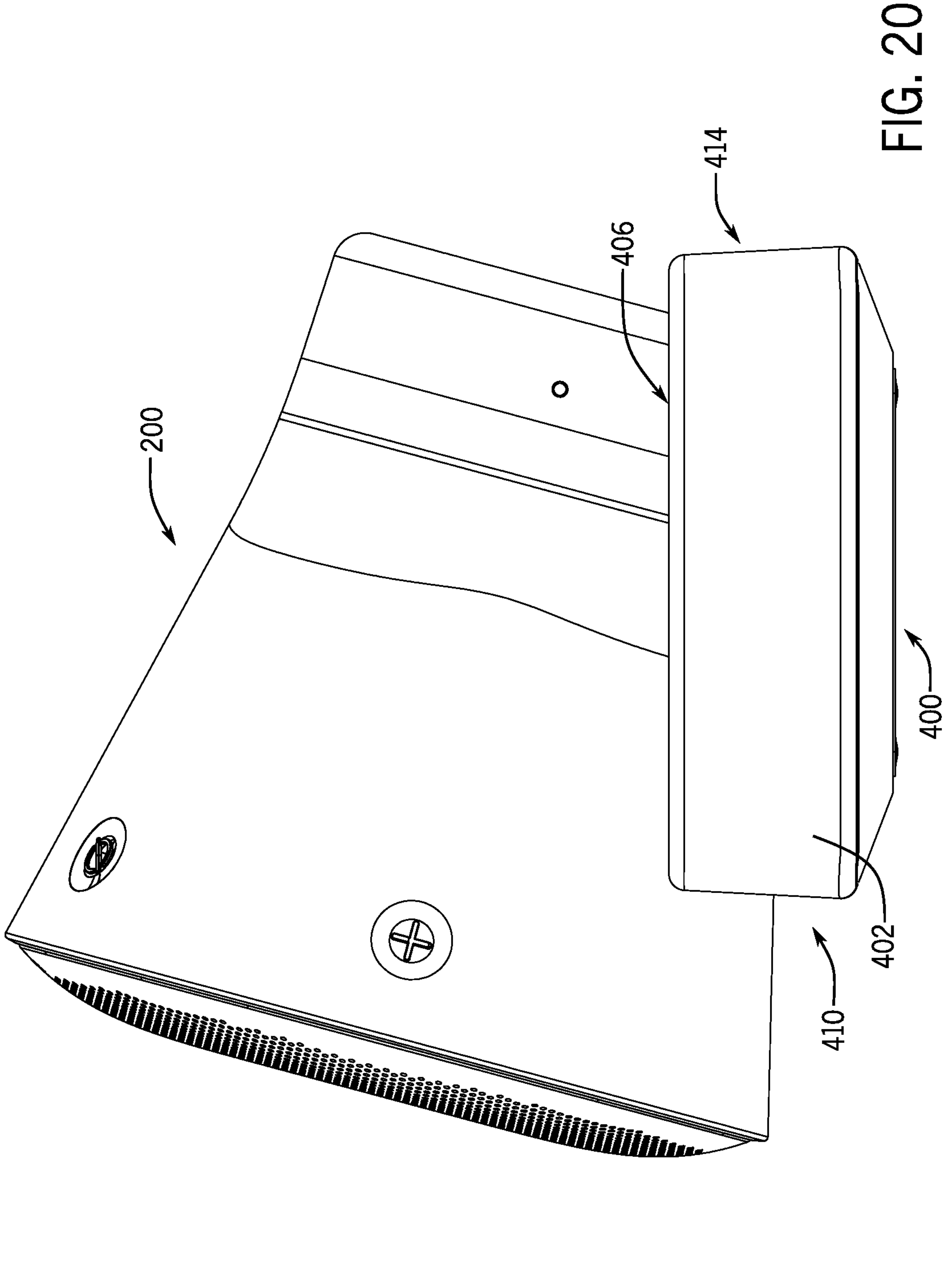
FIG. 20 shows a side view of the wireless speaker and docking station of FIG. 15.
Figure 21:
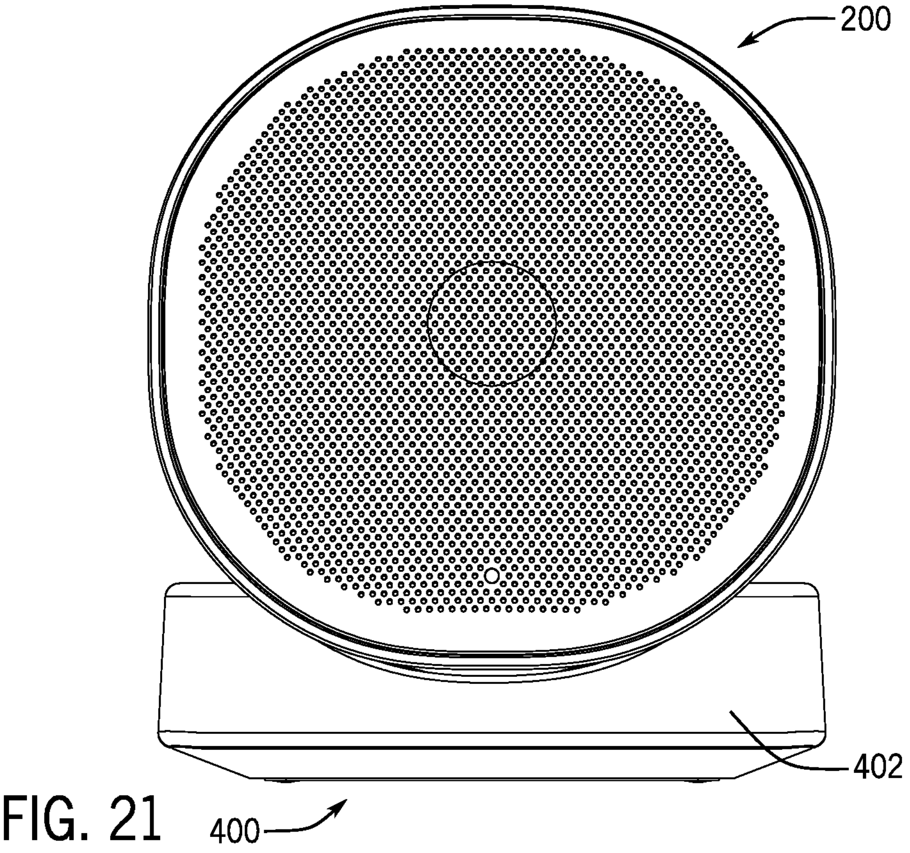
FIG. 21 shows a front view of the wireless speaker and docking station of FIG. 15.
Figure 22:
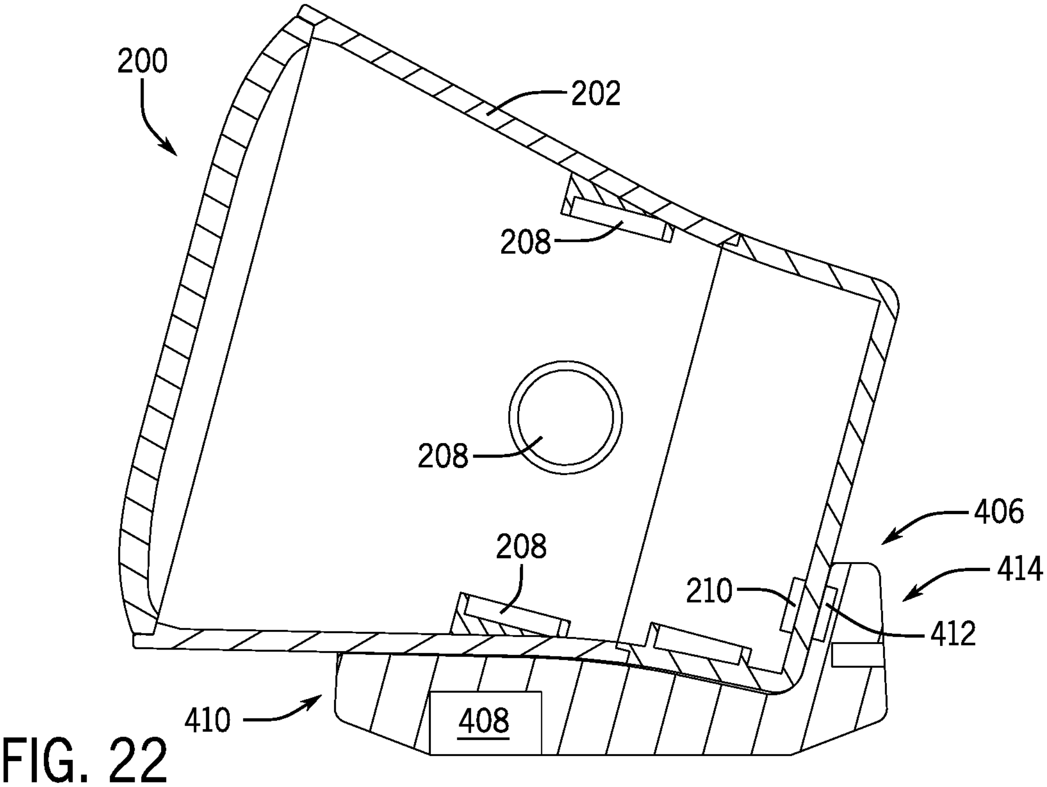
FIG. 22 is a side cross-sectional view of the wireless speaker and docking station of FIG. 15.

Referring to FIGS. 18-22, a charging station 400 (e.g., charging unit, dock, docking station, etc.) for the wireless speaker 200 is shown, according to an exemplary embodiment. The charging station 400 includes a platform 402 having a rectangular cross-section (e.g., the platform 402 is shaped as a rectangular prism). As shown in FIGS. 19 and 22, the platform 402 includes a recessed area 404 (e.g., depression, etc.) formed into an upper surface 406 of the platform 402. The recessed area 404 is sized and shaped to receive (e.g., to cradle) the wireless speaker 200 (e.g., the outer wall 202) and to prevent movement of the wireless speaker 200 once engaged with the platform 402. The platform 402 is also configured to space the wireless speaker 200 a distance above the ground (e.g., a distance above a surface on which the platform 402 is placed). As shown in FIG. 22, the charging station 400 may further include one or more magnets and/or ferrous, magnetically permeable materials to facilitate engagement between the wireless speaker 200 and the platform 402. In the embodiment of FIG. 22, the charging station 400 includes a forward metal block 408 (e.g., a piece of iron, steel, etc.) disposed proximate a forward end 410 of the platform 402 and a rear magnet 412 disposed proximate to a rear end 414 of the platform 402, along an upwardly extending wall portion of the platform 402. The forward metal block 408 is configured to magnetically engage with one of the second plurality of magnets 208, while the rear magnet 412 is configured to magnetically engage with the at least one rear magnet 210 located along the back wall of the speaker housing. In other embodiments, the charging station 400 may include only one of the forward metal block 408 and the rear magnet 412. In yet other exemplary embodiments, the forward metal block 408 is a permanent magnet. In yet another embodiment, the rear magnet 412 may be replaced with another form of retaining member such as a magnetically permeable material (e.g., a ferrous material such as iron, etc.) that is configured to interact with the rear magnet 210 in the wireless speaker 200. In other exemplary embodiments, the charging station 400 may include the rear magnet 210 and the wireless speaker 200 may include a magnetically permeable material in place of the rear magnet 210.

As shown in FIG. 19, according to one particular exemplary embodiment, the charging station 400 includes a pair of terminals 416 (e.g., contacts, electrodes, etc.) disposed in the recessed area 404 proximate to the rear end 414 of the platform 402. The terminals 416 are configured to engage with a corresponding set of terminals on the wireless speaker 200 to electrically couple the power source of the wireless speaker 200 to the platform 402. The charging station 400 further includes a power cord (e.g., connector, plug, etc.) that can be used to electrically connect the terminals (e.g., the charging station 400) to a USB socket to facilitate connections between the charging station 400 and a power adapter, computer, or the like. In another embodiment, the power chord may be another form of electrical plug or adaptor configured to connect the terminals to a power outlet within a building (e.g., a 120 VAC power supply, etc.). In one embodiment, the power chord is connected to the charging station 400 by a mini-USB connector or another suitable chord connector or adaptor. The size and shape of the charging station 400 may be different in various exemplary embodiments and, as mentioned above, the particular charging mechanism (e.g., electrical contacts, inductive charging, etc.) may be used according to various exemplary embodiments.

Figure 23:
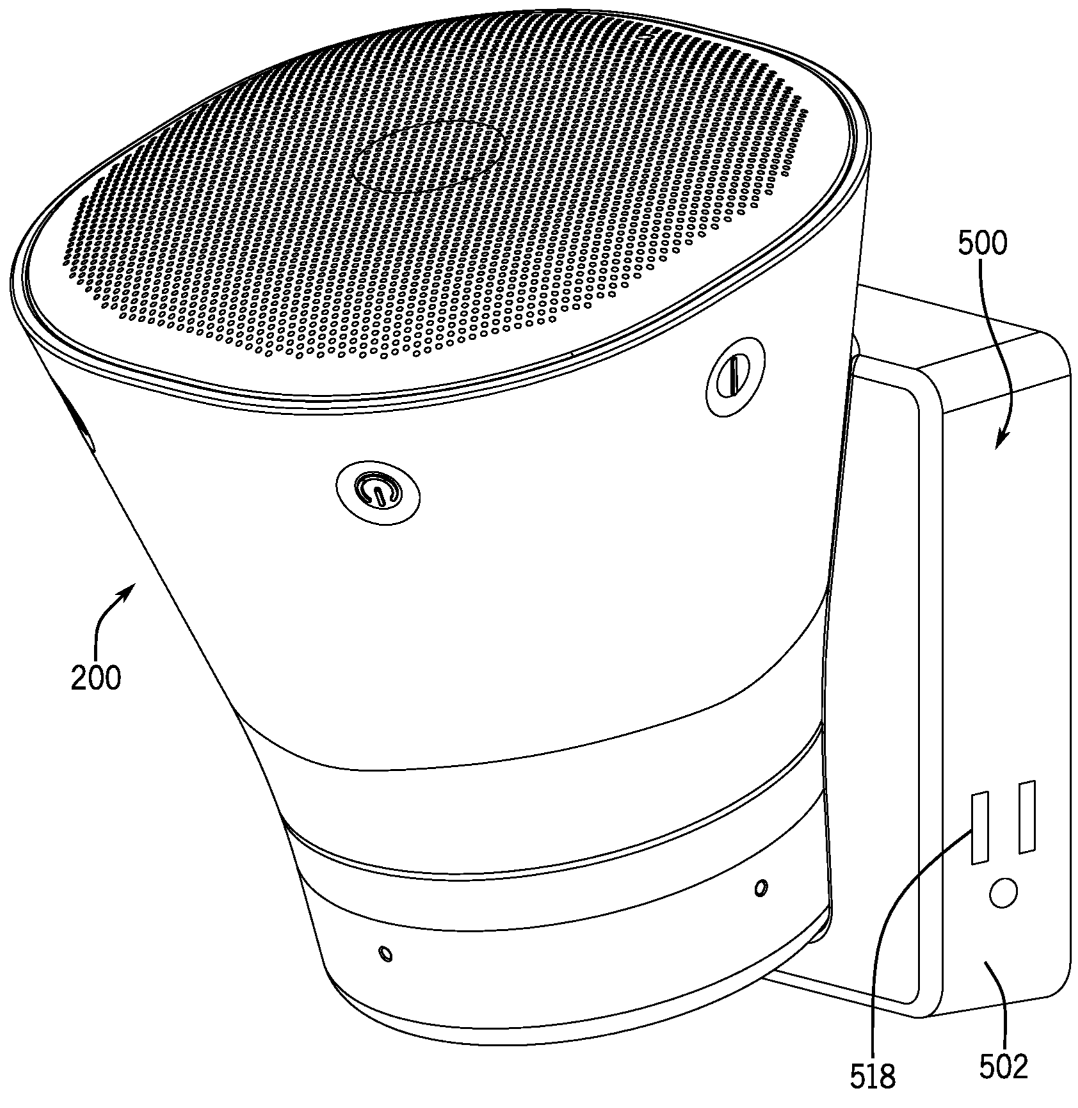
FIG. 23 is a side perspective view of a wireless speaker and outlet docking station, according to an exemplary embodiment.
Figure 24:
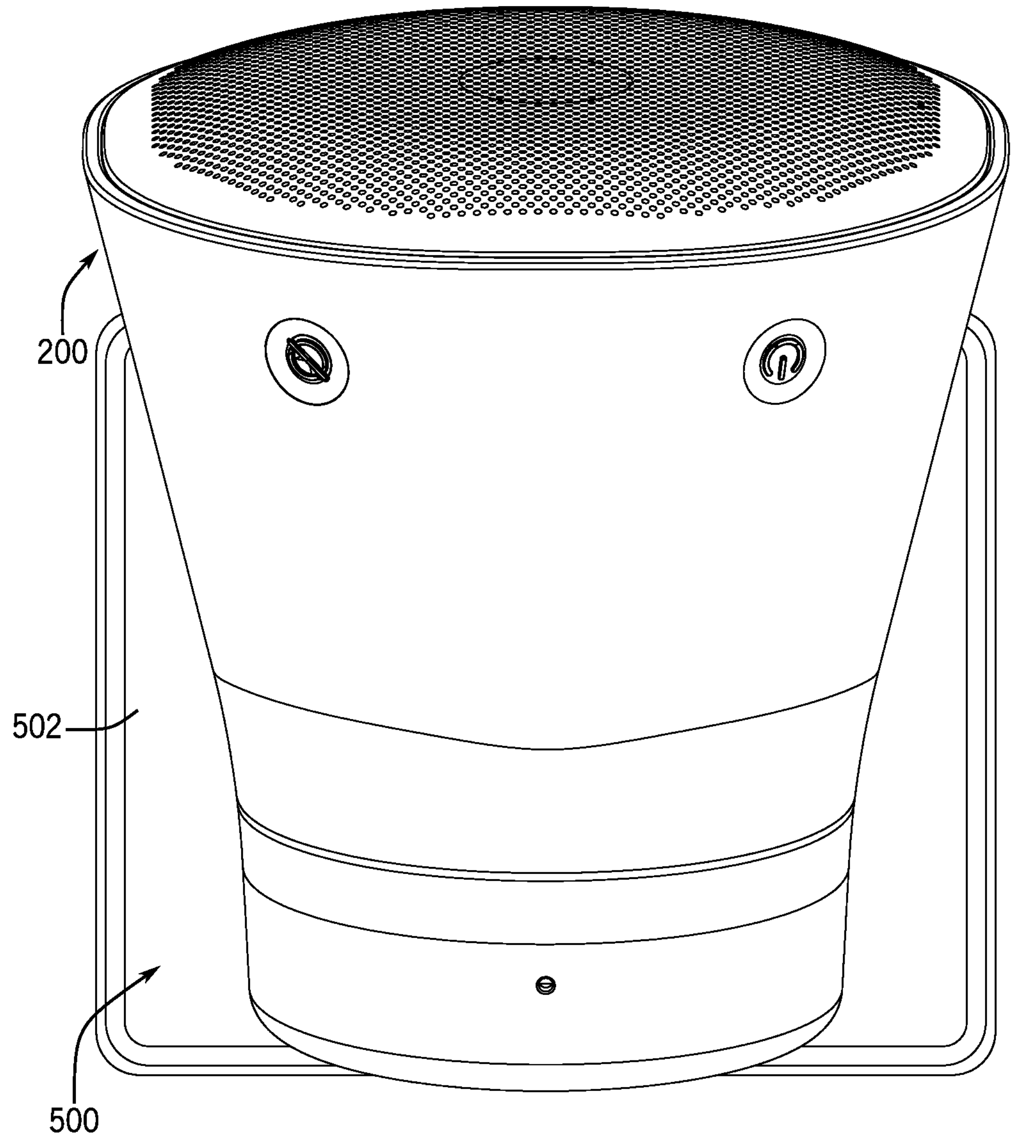
FIG. 24 is a top view of the wireless speaker and outlet docking station of FIG. 23.
Figure 26:
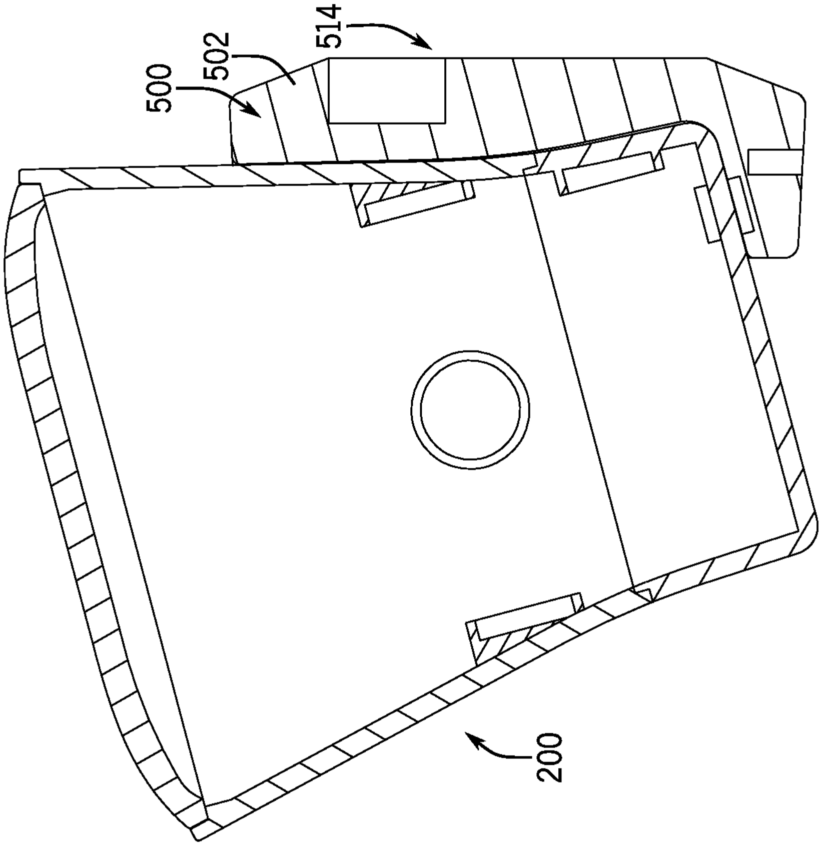
FIG. 26 is a side cross-sectional view of the wireless speaker and outlet docking station of FIG. 23.
Figure 25:
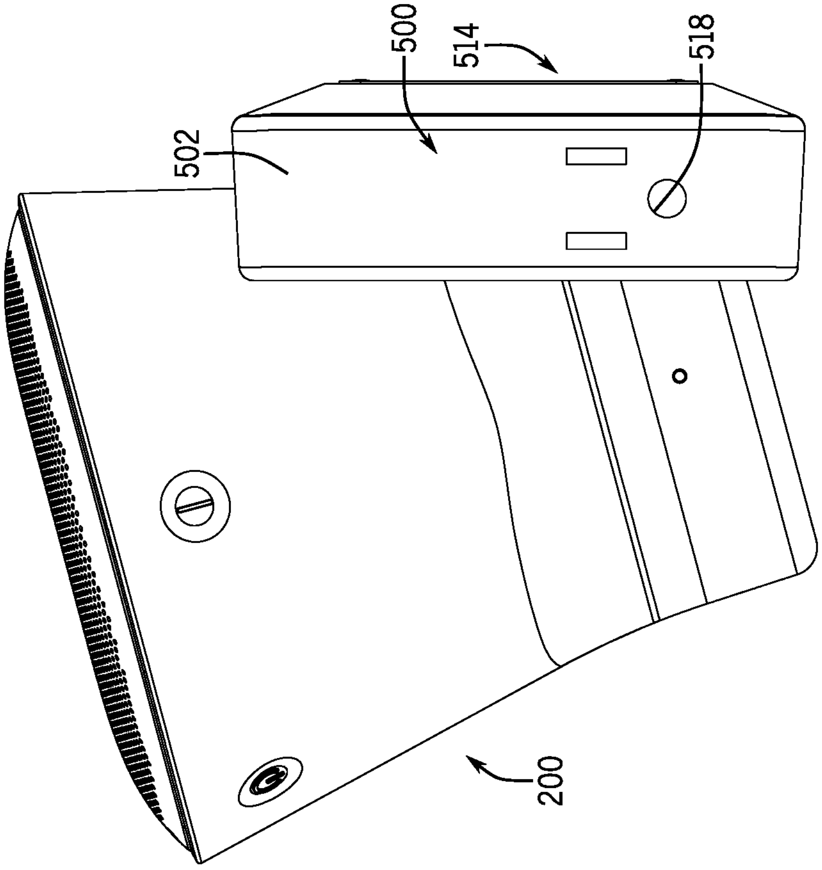
FIG. 25 is a side view of the wireless speaker and outlet docking station of FIG. 23.

Referring to FIGS. 23-26, an outlet charging station 500 for a wireless speaker 200 is shown, according to an exemplary embodiment. The charging station 500 includes a platform 502, which may be shaped the same as or similar to the platform 402 described with reference to FIGS. 18-22. Additionally, the charging station 500 includes a pair of outlet terminals (not shown), or similar connection device (e.g., two-prong, three-prong, U.S. or international connection) structured to electrically connect the charging station 500 to a wall outlet and to secure the platform 502 (and wireless speaker 200) in position relative to the wall outlet. The outlet terminals are disposed on a lower surface of the platform 502 proximate to a rear end 514 of the platform 502 such that the charging station 500 may be "plugged in" to the wall outlet without covering a lower, adjacent wall outlet opening. In some embodiments, the outlet terminals are retractable into the platform 502. As shown in FIGS. 23 and 25, the outlet charging station 500 additionally includes a three prong electrical outlet 518 disposed on a side surface of the platform 502 and configured to allow the user to plug in various additional accessories into the platform 502 for charging/powering. In other embodiments, the size, shape, and number of connectors used for the electrical outlet 518 may be different (e.g., the electrical outlet 518 may include a USB connector, or another connector type). Additionally, as discussed above, the terminals may be omitted in favor of an inductive charging arrangement according to another exemplary embodiment.

Handshower Assembly

Figure 27:
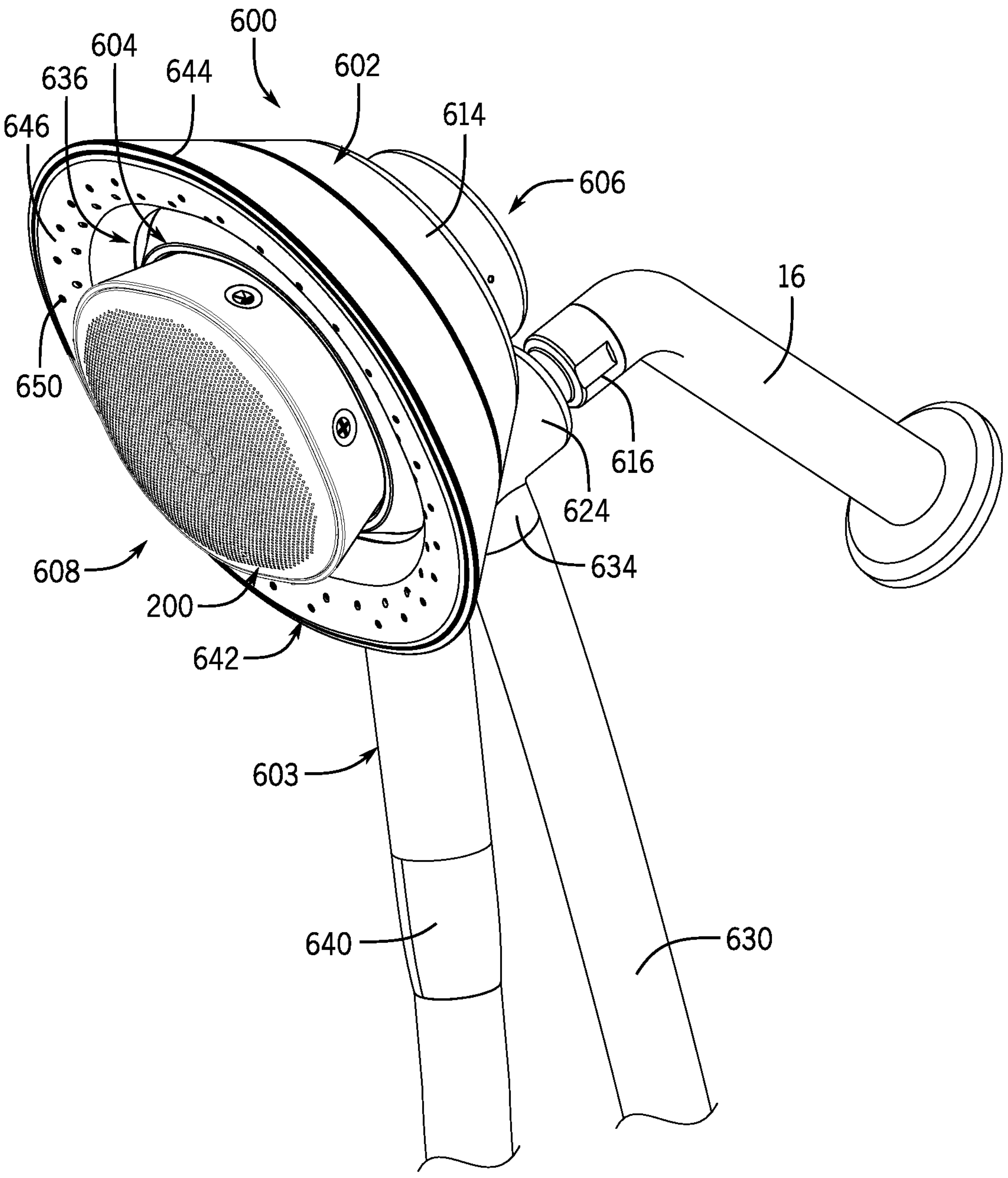
FIG. 27 is a side perspective view of a handshower assembly, according to an exemplary embodiment.
Figure 28:
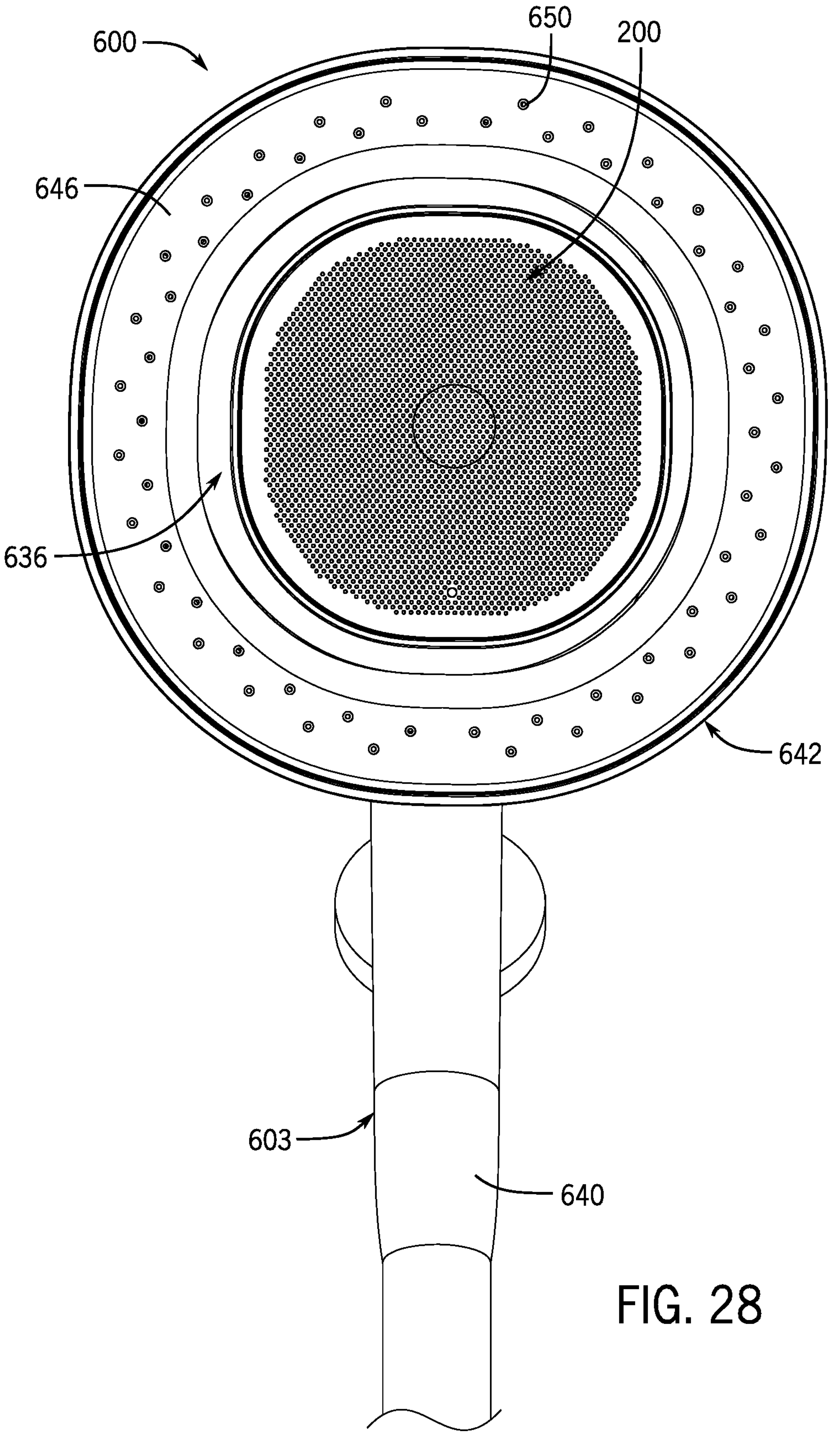
FIG. 28 is a front view of the handshower assembly of FIG. 27.
Figure 29:
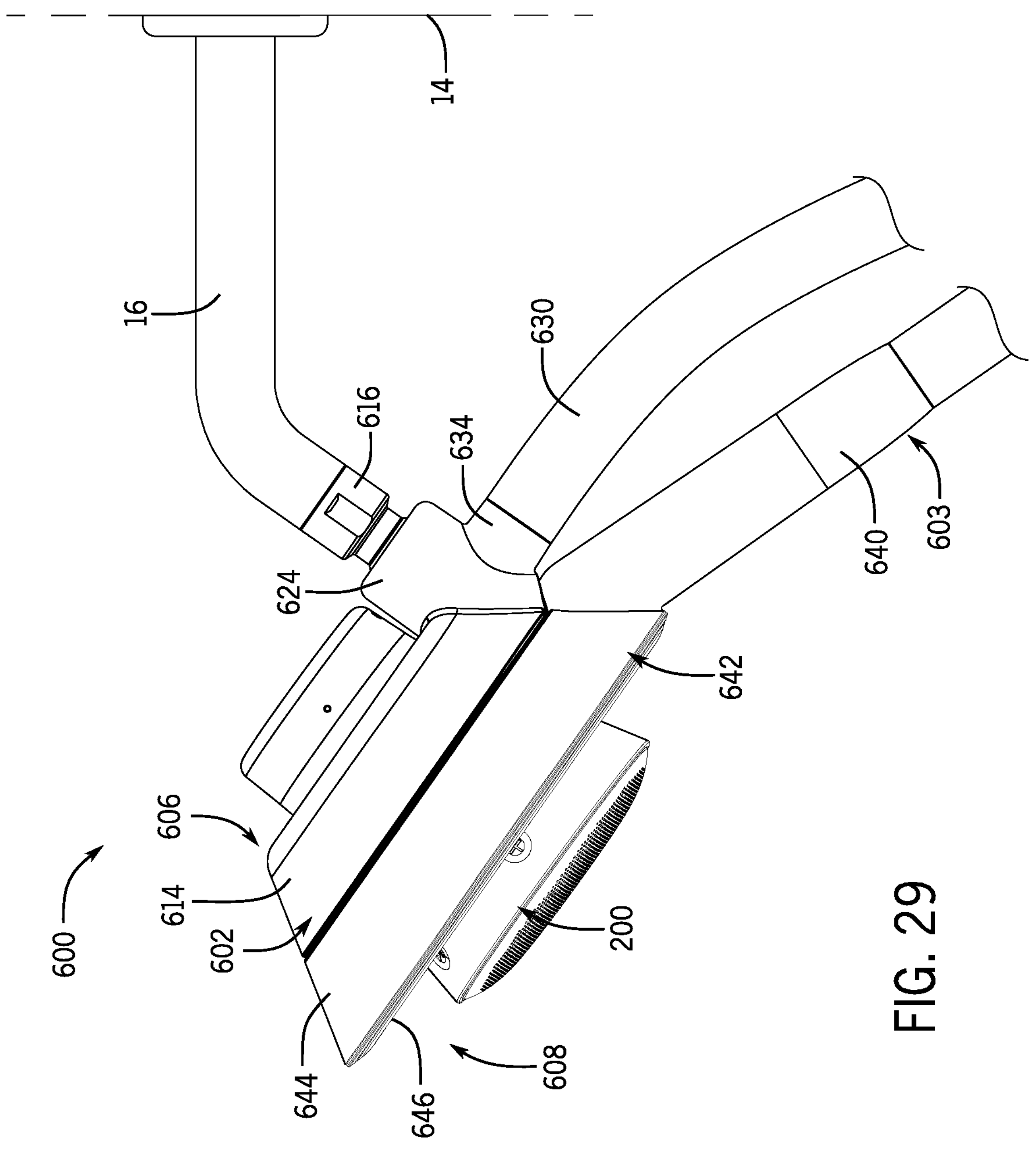
FIG. 29 is a side view of the handshower assembly of FIG. 27.

Referring to FIGS. 27-31, a handshower assembly 600 is shown according to an exemplary embodiment. The handshower assembly 600 includes a docking ring 602 and a hand sprayer 603 removably coupled to a lower end 608 of the docking ring 602. The handshower assembly 600 additionally includes a wireless speaker removably coupled to the docking ring 602. The wireless speaker may be the same as or similar to the wireless speaker 200 described with reference to FIGS. 8-11. As shown in FIGS. 27-29, both the hand sprayer 603 and the wireless speaker 200 are fixed in position relative to the docking ring 602 when engaged with the docking ring 602. More specifically, the hand sprayer 603 and the wireless speaker 200 are magnetically coupled to the docking ring 602. As shown in FIGS. 27-29, the wireless speaker 200 is received within a through-hole opening 604 formed by the docking ring 602. The through-hole opening 604 extends through an entirety of the docking ring 602 between an upper end 606 and a lower end 608 of the docking ring 602. As shown in FIG. 29, the wireless speaker 200 extends through the entirety of the docking ring 602 when coupled to the docking ring 602 such that the wireless speaker 200 protrudes beyond both the upper end 606 and the lower end 608 of the docking ring 602 simultaneously.

Figure 30:
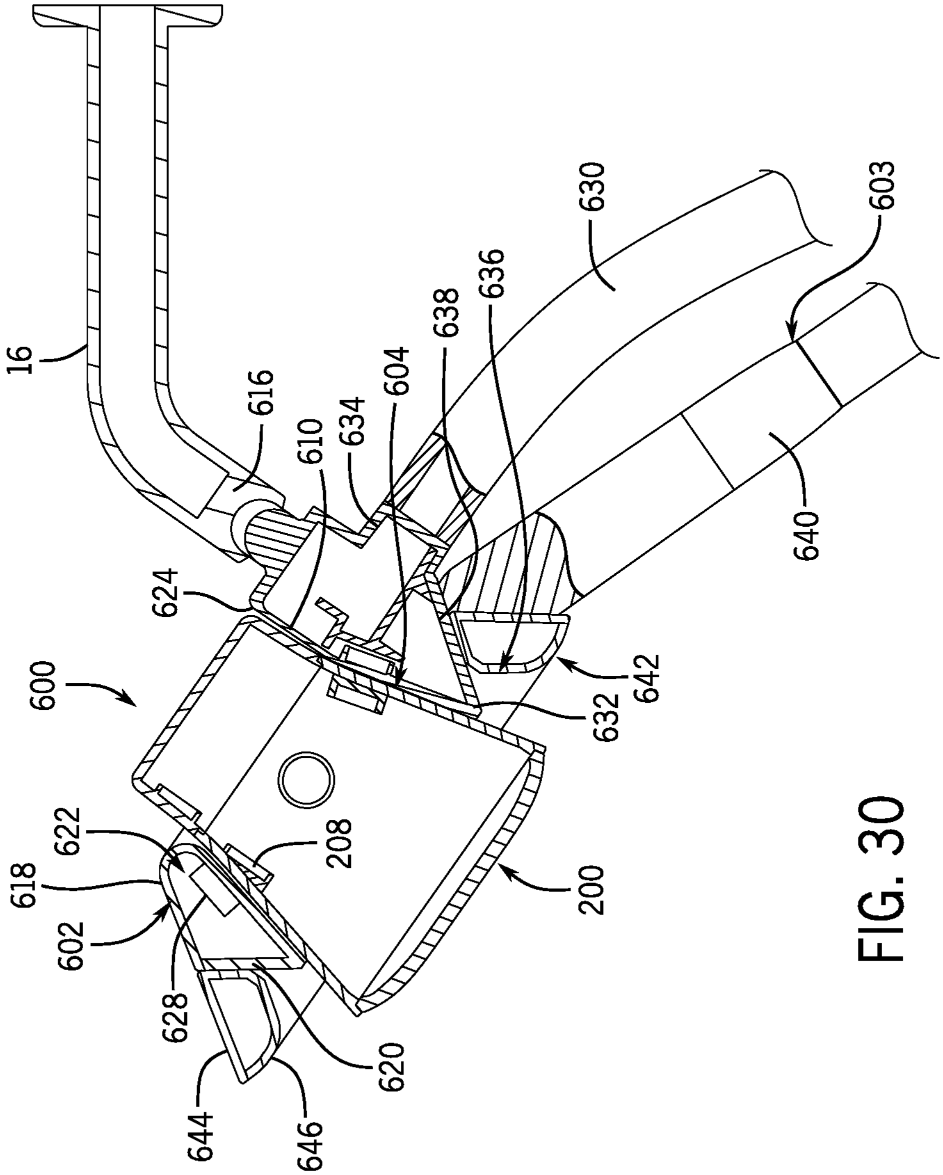
FIG. 30 is a side cross-sectional view of the handshower assembly of FIG. 27.
Figure 31:
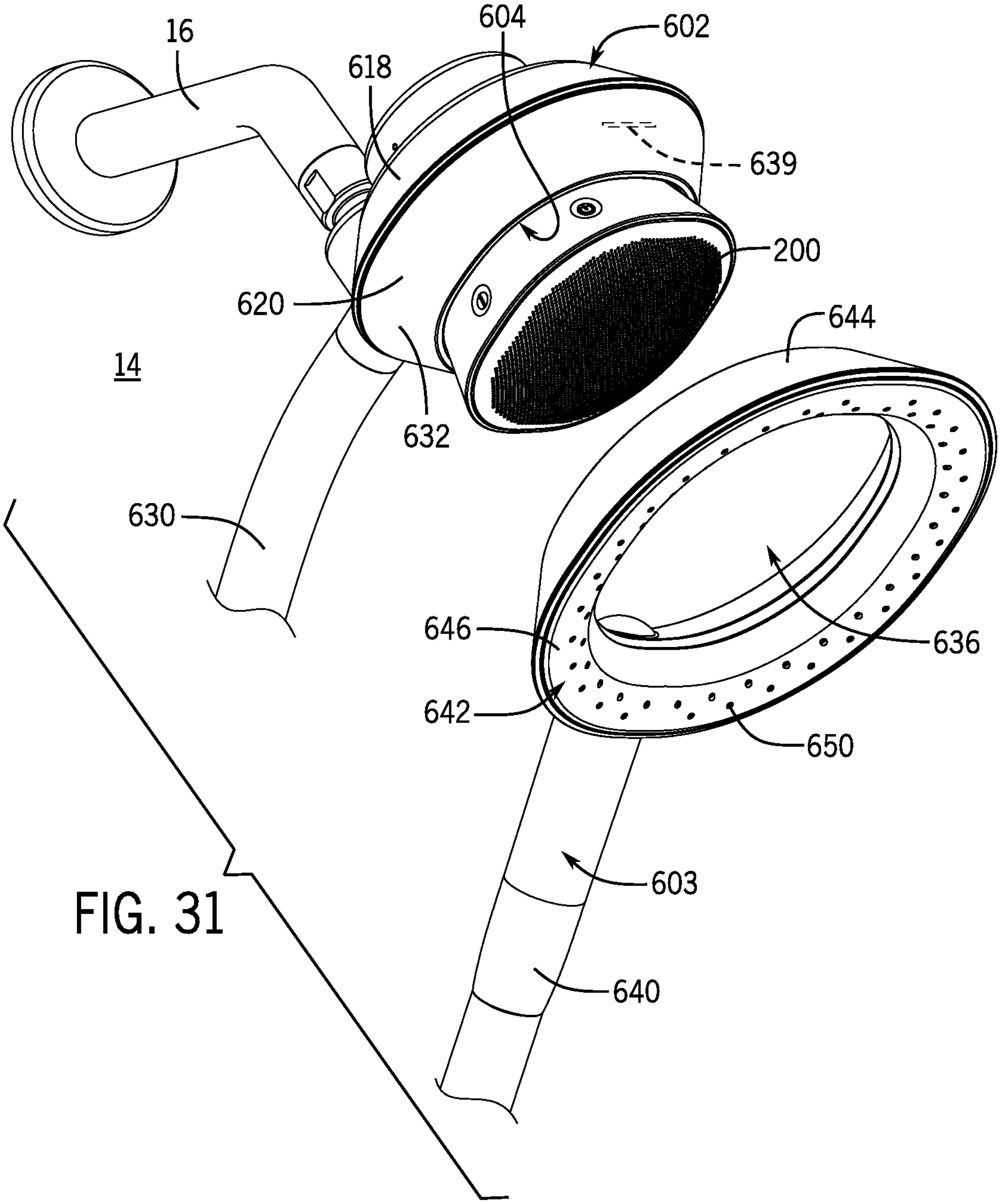
FIG. 31 is a side perspective view of the handshower assembly of FIG. 27 that shows a hand sprayer separated from a docking ring.

As shown in FIG. 31, the hand sprayer 603 is detachably coupled to the lower end 608 of the docking ring 602. The hand sprayer 603 defines a second through-hole opening 636. The second through-hole opening 636 is sized to receive the wireless speaker 200 therein such that the hand sprayer 603 may fit over the wireless speaker 200 when engaged with the docking ring 602 and may be removed therefrom while leaving the speaker behind in the docking ring 602 (i.e., the speaker does not "travel" with the hand sprayer 603 when the hand sprayer is removed and used by a user of the shower). The second through-hole opening 636 aligns with the through-hole opening 604 in the docking ring 602 when the hand sprayer 603 is engaged with the docking ring 602, such that a spray head portion of the hand sprayer 603 is substantially coaxial with the docking ring 602. The spray head portion of the hand sprayer 603 completely surrounds the wireless speaker 200 when engaged with the docking ring 602 (i.e., the spray head portion fits over the wireless speaker 200 when the hand sprayer 603 is engaged with the docking ring 602). In the exemplary embodiment of FIGS. 27-31, the hand sprayer 603 is magnetically coupled to the docking ring 602. Alternatively, or in combination, the docking ring 602 may include snap fit features/elements to facilitate the connection between the hand sprayer 603 and the docking ring 602.

Figure 32:
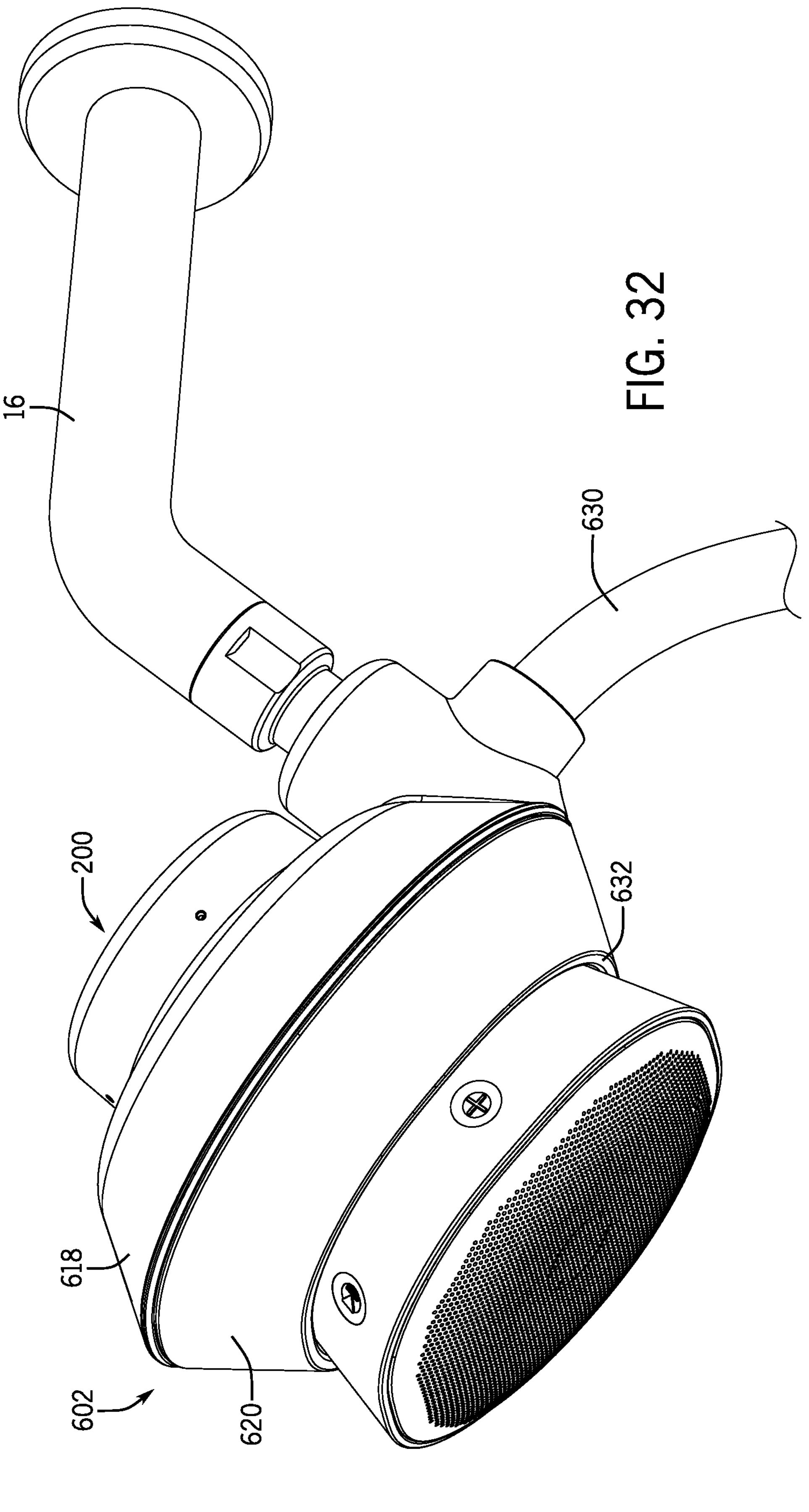
FIG. 32 is a side perspective view of a docking ring and wireless speaker of the handshower assembly of FIG. 27.

As shown in FIGS. 29 and 32, the docking ring 602 is mounted at a fixed position within the shower enclosure 14. The docking ring 602 is fluidly connected to a water supply line 16 (e.g., a pipe and/or conduit of a residential or commercial water supply) extending into the shower enclosure 14 from a wall of the shower enclosure 14. The docking ring 602 includes a housing 614 and an inlet connector 616. The inlet connector 616 forms an inlet for the docking ring 602 into which water is received from the water supply line 16. The inlet connector 616 may be the same or similar as the inlet connector 116 described in detail with reference to FIG. 2. In other embodiments, the docking ring 602 may be mounted to another location within the shower enclosure 14. For example, the docking ring 602 may be mounted on a rail and may be repositionable along the rail (e.g., the docking ring 602 may be slidably coupled to the rail, etc.) to allow a user to readjust the height of the handshower assembly 600.

Figure 33:
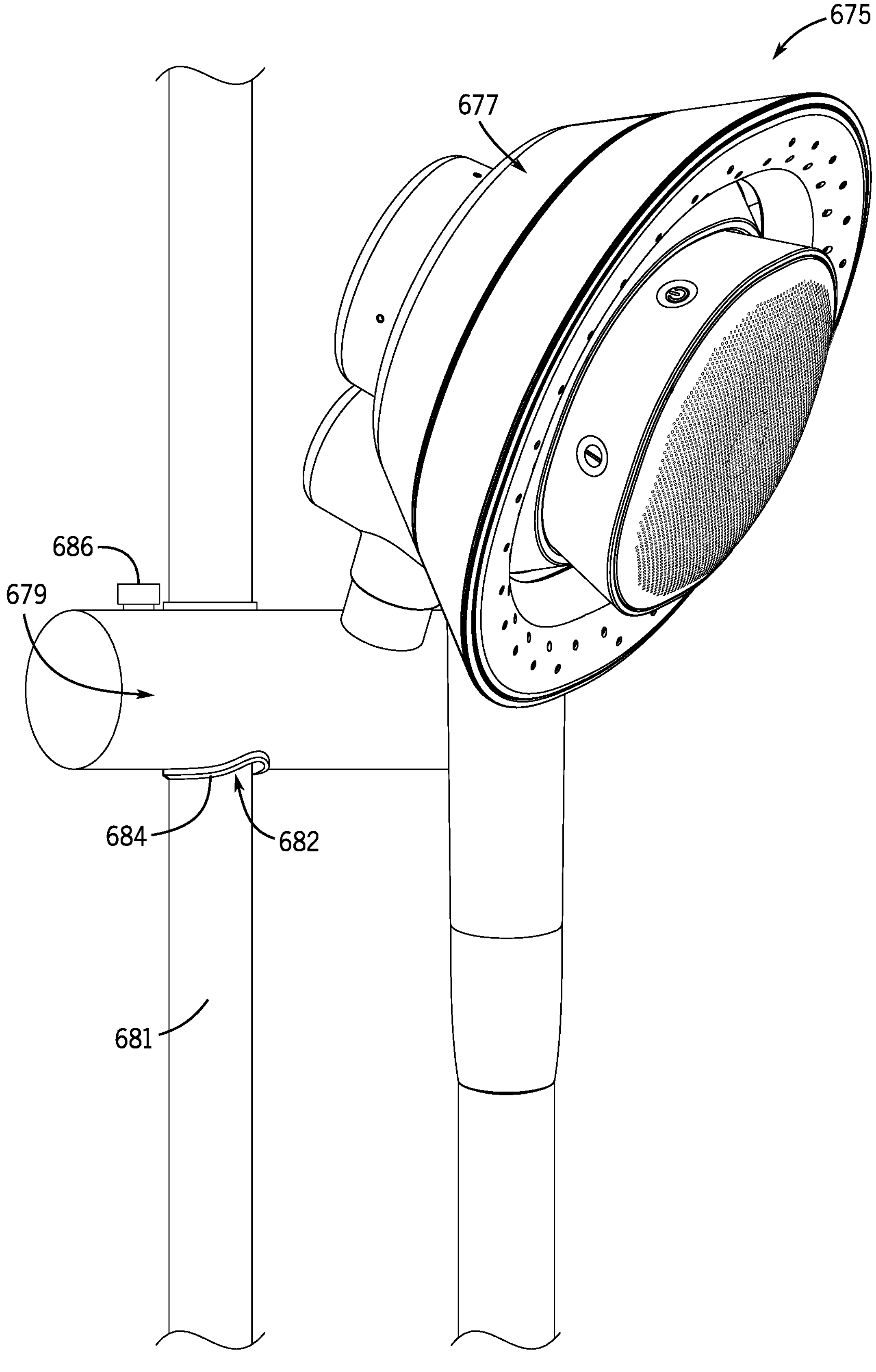
FIG. 33 is a perspective view of a handshower assembly, according to another exemplary embodiment.
Figure 34:
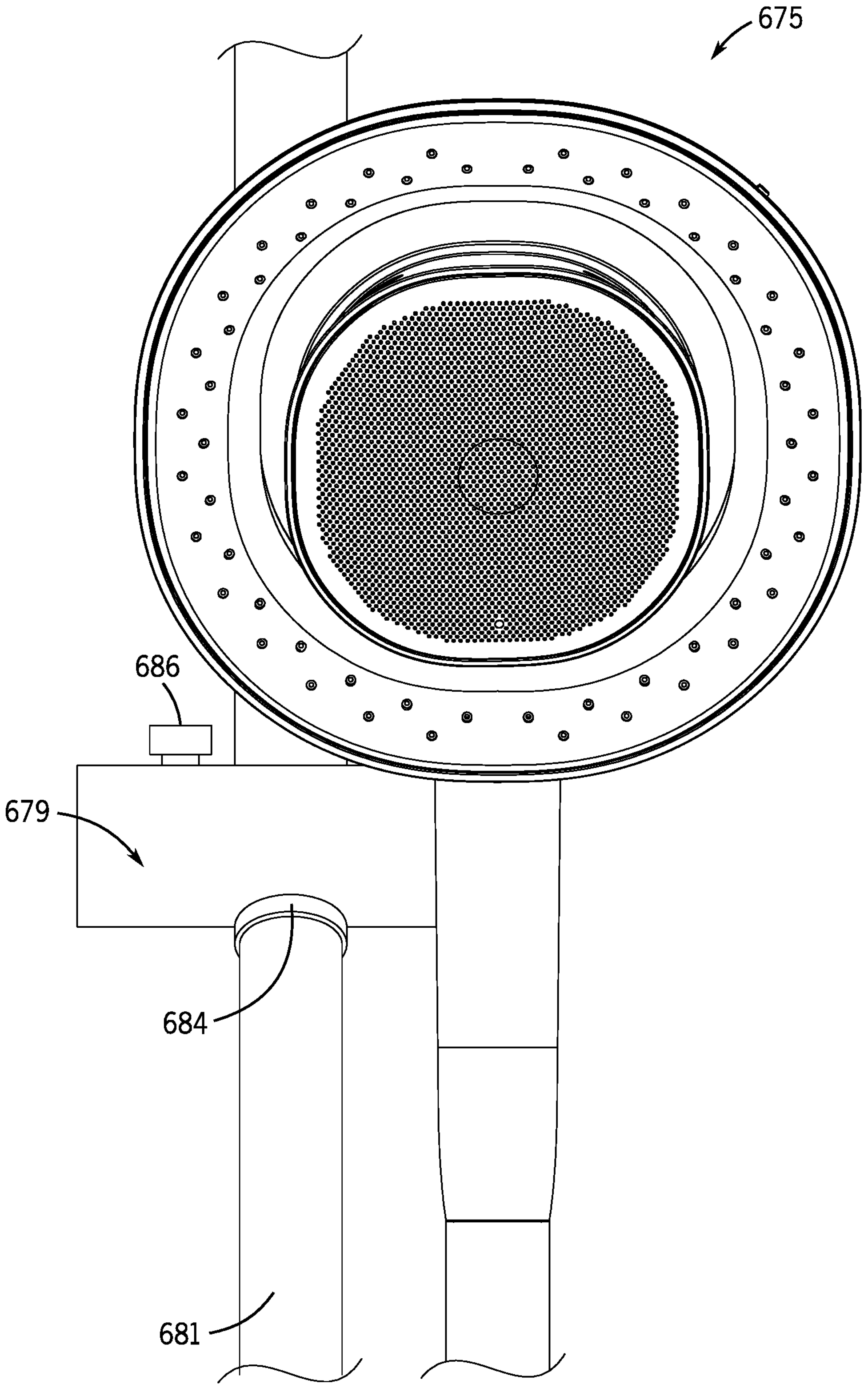
FIG. 34 is a front view of the handshower assembly of FIG. 33.
Figure 35:
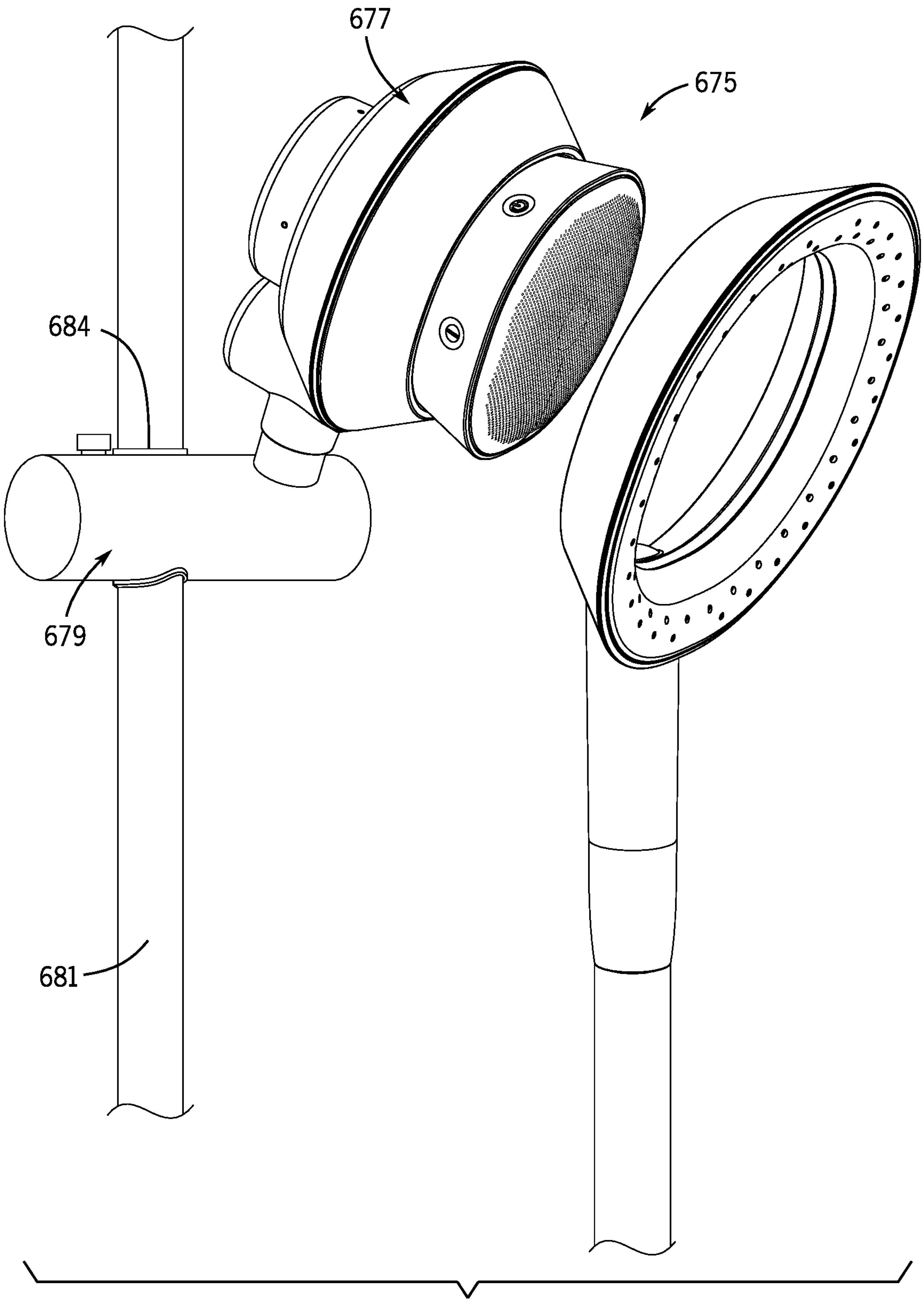
FIG. 35 is another perspective view of the handshower assembly of FIG. 33.

FIGS. 33-35 show a handshower assembly 675 including a height adjustable docking ring 677. The handshower assembly 675 is similar to the handshower assembly 600 of FIGS. 24-28 but also includes a rail adaptor 679 that mechanically connects the docking ring 677 to a shower rail 681. In the embodiment of FIGS. 33-35, the rail adaptor 679 is a cylindrical support member that is slidably engaged with the shower rail. In other embodiments, the shape of the rail adaptor 679 may be different (e.g., rectangular, oval, etc.). As shown in FIG. 33, the rail adaptor 679 includes a through-hole opening 682 disposed at an intermediate position between ends of the rail adaptor 679. The through-hole opening 682 is sized to receive the shower rail therein. The rail adaptor 679 also includes a sleeve 684 that is "sandwiched" or otherwise disposed in a gap between the outer perimeter of the through-hole opening 682 and the shower rail. The rail adaptor 679 also includes an adjustment mechanism 686 configured to adjust the position of the sleeve 684 (e.g., to tighten the sleeve 684 around the shower rail) to prevent movement of the rail adaptor 679 relative to the through-hole opening 682. In operation, a user can reposition the rail adaptor 679 along the shower rail by manually manipulates the adjustment mechanism 686, and sliding the rail adaptor 679 along the length of the shower rail. As shown in FIGS. 33-35, the docking ring 677 is mechanically connected to an end of the rail adaptor 679 (e.g., a horizontal end of the rail adaptor 679, etc.). In other embodiments, the arrangement of the docking ring 677 relative to the rail adaptor 679 may be different Returning to FIG. 29, the housing 614 is configured to receive water from the inlet connector 616 and to distribute water into a flexible conduit 630 that fluidly connects the hand sprayer 603 to the docking ring 602. The housing 614 includes a back plate 618 and a face plate 620. The face plate 620 is coupled to the back plate 618 along both an inner perimeter of the back plate 618 and an outer perimeter of the back plate 618. Together, the back plate 618 and the face plate 620 form a hollow ring-like structure (e.g., a doughnut shaped cavity, etc.), shown as flow distribution cavity 622. As shown in FIG. 30, the back plate 618 defines an upper wall and an outer sidewall of the flow distribution cavity 622. The back plate 618 is tapered inwardly between the lower end 608 and the upper end 606 of the housing 614, such that the diameter of the housing 614 is reduced near the upper end 606. As shown in FIG. 30, the back plate 618 also forms an upper portion of the inner sidewall 610 of the housing 614 (e.g., the flow distribution cavity 622) that adjoins the through-hole opening 604.

The face plate 620 forms a lower wall and a lower portion of the inner sidewall 610 of the flow distribution cavity 622. The face plate 620 of FIG. 30 also forms a closed circumferential extension, shown as extension 632 that facilitates alignment between the docking ring 602 and the hand sprayer 603. In the exemplary embodiment of FIG. 30, the extension 632 protrudes from a lower surface of the docking ring 602 along a perimeter of the through-hole opening 604. As shown in FIGS. 30-32, the extension 632 converges to a point at the lower end 608 of the housing 614 (e.g., a point defining an outer perimeter of the through-hole opening 604 at the lower end 608 of the housing 614). As shown in FIG. 30, the inner sidewall 610 is tapered (e.g., flared) inwardly between the lower end 608 and the upper end 606 of the housing 614 to match the shape of the outer wall 202 of the wireless speaker 200.

Similar to the waterway assembly 102 of FIG. 6, the docking ring 602 of FIG. 30 includes a first plurality of magnets, shown as first magnet 628, coupled to an inner sidewall 610 of the housing 614, approximately half-way between the lower end 608 and the upper end 606. The first magnets 628 are spaced equally along the perimeter of the inner sidewall 610. In the exemplary embodiment of FIG. 30, the first magnets 628 are disposed within the flow distribution cavity 622. In some embodiments, the first magnets 628 are secured to the inner sidewall 610 using an adhesive product such as glue, epoxy, or the like. In other embodiments, the first magnets 628 are positioned within pockets that are molded, or otherwise formed, into the face plate 620. A total of four first magnets 628 are included with the docking ring 602 of FIGS. 27-30, although the number and/or positioning of the first magnets 628 may differ in various exemplary embodiments. In other exemplary embodiments, the inner sidewall 610 of the housing 614 may be made from a ferritic or magnetic material, which eliminates the need for the first magnets 628.

The docking ring 602 additionally includes at least one docking magnet 638 (e.g., a permanent magnet, an element made from a ferromagnetic material, etc.) coupled to the face plate 620 at the extension 632 and configured to interact with the hand sprayer 603 to magnetically couple the hand sprayer 603 to the docking ring 602. As shown in FIG. 30, the docking ring 602 includes a plurality of docking magnets 638 coupled to an upper surface of the extension 632 within the flow distribution cavity 622. Again, the docking magnets 638 may be adhered to the inner surface directly, or inserted into pockets or another retaining member formed onto the inner surface. In other embodiments, the face plate 620 may be made from a ferritic or magnetic material, which eliminates the need for the docking magnets 638.

The magnetic coupling mechanism between the hand sprayer 603 and the docking ring 602, described with respect to the handshower assembly 600 of FIGS. 27-31, should not be considered limiting. Various alternatives are possible without departing from the inventive concepts disclosed herein. For example, in some embodiments, the hand sprayer 603 is mechanically fastened to the docking ring 602. As shown in FIG. 31, the docking ring 602 may additionally include a linear protrusion or ridge 639 disposed on an exterior surface of the face plate 620. The hand sprayer 603 may include a recessed area configured to receive the ridge 639 therein to clip or otherwise secure the hand sprayer 603 to the docking ring 602. In other embodiments, the docking ring 602 may include another form of mechanical clip or fastener. In some exemplary embodiments, at least one of the hand sprayer 603 and the docking ring 602 include pieces of iron or another retaining member made from magnetically permeable materials to interact with the permanent magnet(s). For example, the hand sprayer 603 may include pieces of iron coupled to an inner surface of the spray head portion of the hand sprayer 603 that are configured to interact with the docking magnet(s) 638. Alternatively, the docking ring 602 may include pieces of iron coupled to face plate 620 that are configured to interact with permanent magnets in the hand sprayer 603. In other exemplary embodiments, one of the hand sprayer 603 (e.g., the spray head portion, etc.) or the docking ring 602 (e.g., the face plate 620) are made from a magnetically permeable material (e.g., a ferritic material, iron, etc.). In yet other exemplary embodiments, both the hand sprayer 603 and the docking ring 602 include permanent magnets (e.g., the hand sprayer 603 includes a plurality of permanent magnets to facilitate magnetic coupling between the hand sprayer 603 and the docking ring 602).

Still referring to FIG. 30, the housing 614 additionally includes an inlet extension 624 disposed proximate to an outer perimeter of the docking ring 602, at a fixed circumferential position along the outer perimeter. The inlet extension 624 extends upwardly from the housing 614 in substantially parallel orientation relative to the central axis of the through-hole opening 604. In the exemplary embodiment of FIGS. 27-30, the inlet extension 624 is pivotably coupled to the inlet connector 616 such that the docking ring 602 may rotate and/or pivot about a connection point between the inlet connector 616 and the inlet extension 624. In some embodiments, one of the inlet extension 624 and the inlet connector 616 includes a ball joint configured to facilitate repositioning of the docking ring 602 within the shower enclosure 14 (relative to the water supply line 16). In other embodiments, movement of the docking ring 602 is limited to rotation about the inlet connector 616 (e.g., rotation about a central axis of the inlet connector 616). Because the wireless speaker 200 is fixed in position relative to the docking ring 602, the user may reposition the wireless speaker 200 (e.g., adjust a height of the wireless speaker 200 relative to the user) by rotating and/or pivoting the docking ring 602.

As shown in FIG. 30, the housing 614 includes an outlet extension 634 disposed proximate to the inlet extension 624 and configured to redirect flow from the inlet extension 624 to the flexible conduit 630. The outlet extension 634 extends radially outwardly from a sidewall of the inlet extension 624 and away from the central axis of the through-hole opening 604. In other embodiments, the outlet extension 634 may be positioned on a different area of the housing 614 (e.g., remote from the inlet extension 624, etc.). In the handshower assembly 600 of FIG. 30, both the inlet extension 624 and the outlet extension 634 are integrally formed with the housing 614 as a single unitary body.

The flexible conduit 630 is coupled to the outlet extension 634 and redirects water from the outlet extension 634 to the hand sprayer 603 (e.g., water passing directly from the inlet connector 616/ball joint to the outlet extension 634). The outlet extension may include threaded connectors, quick-connect fittings, or any other suitable fastener to provide a water-tight seal along the flow path between the outlet extension 634 and the flexible conduit 630.

Figure 37:
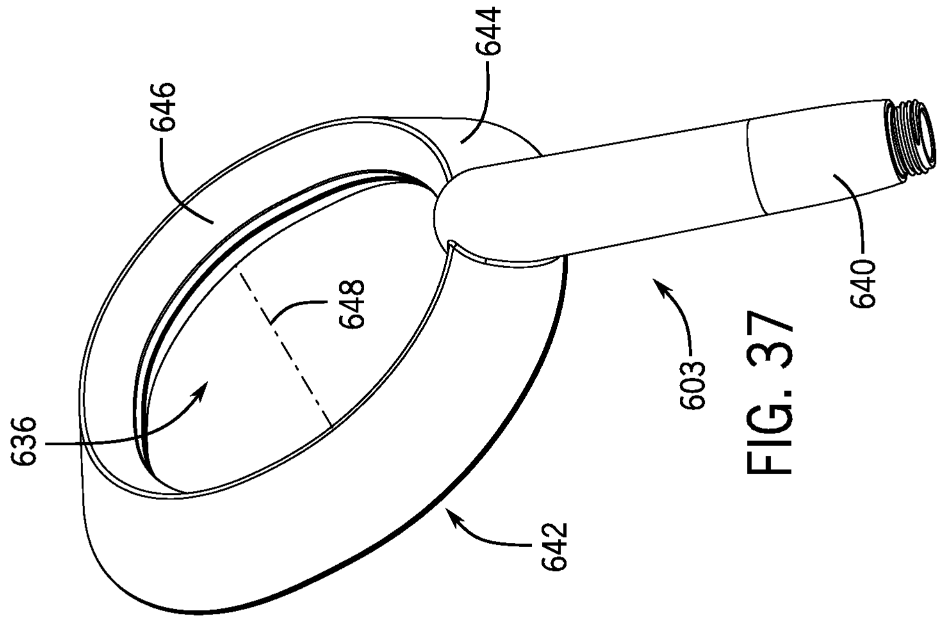
FIG. 37 is another side perspective view of the hand sprayer of FIG. 36.
Figure 36:
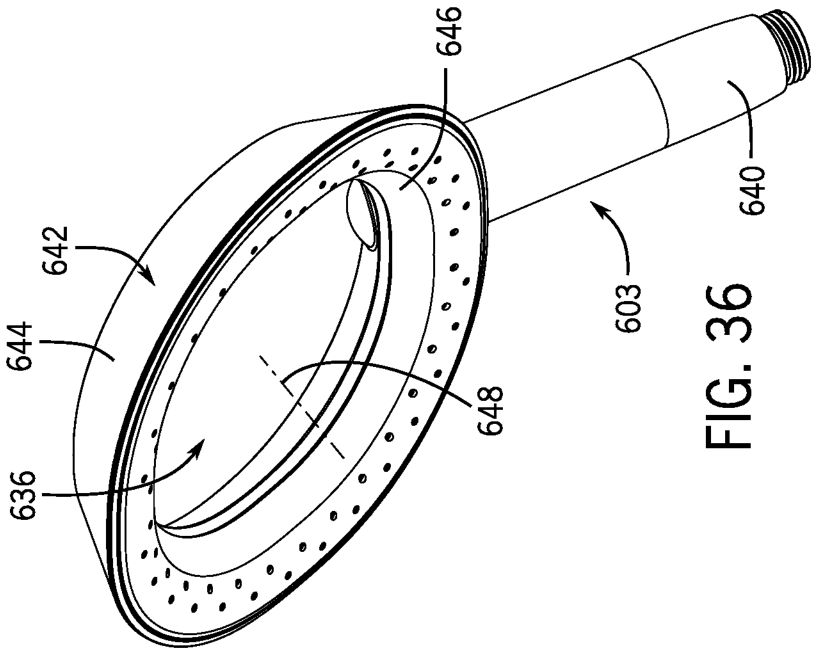
FIG. 36 is a side perspective view of a hand sprayer of the handshower assembly of FIG. 27.

The hand sprayer 603 may be decoupled from the docking ring 602 and manipulated by a user to direct water to different areas within the shower enclosure 14 (see also FIG. 29). Referring to FIGS. 36-37, the hand sprayer 603 is shown to include a handle 640 and a spray head 642 coupled to a first end of the handle 640. In some embodiments, the handle 640 and the spray head 642 may be integrally formed as a single unitary body (e.g., from plastic, stainless steel, ferritic materials, etc.). The flexible conduit 630 is fluidly connected to a second end of the handle 640 opposite the first end. The handle 640 includes a fluid conduit (e.g., a hollow interior portion, a tube, a pipe, etc.) that fluidly connects the flexible conduit 630 to the spray head 642. More specifically, the fluid conduit fluidly connects the flexible conduit 630 to a fluid chamber (not shown) within the spray head 642.

As shown in FIGS. 36-37, the spray head 642 includes a body portion 644 and a face plate 646 coupled to the body portion 644. The face plate 646 is substantially surrounded by the body portion 644 in a radial direction relative to a central axis 648 of the spray head 642. Together, the face plate 646 and the body portion 644 define a hollow ring-like structure (e.g., the fluid chamber). The face plate 646 defines the second through-hole opening 636 (e.g., an inner sidewall that adjoins the second through-hole opening 636).

The spray head 642 additionally includes a plurality of openings 650 or nozzles disposed in the face plate 646 and circumferentially surrounding the second through-hole opening 636 (see also FIG. 31). The openings 650 are fluidly coupled to the fluid chamber and are configured to deliver water from the spray head 642 in streams over a distributed area within the shower enclosure 14. In some embodiments, at least some of the openings 650 may be angled to provide more uniform water coverage across the face of the spray head 642 (e.g., across a projected area forward of the second through-hole opening 636). For example, at least some of the openings 650 may be angled inwardly toward the central axis 648 of the spray head 642. In the exemplary spray head 642 of FIGS. 36-37, the openings 650 are arranged to provide approximately uniform water coverage at a distance of approximately 18 inches from the face plate 646 in a direction that is parallel to the central axis of the spray head 642. In other embodiments, the pattern of outlet openings 650 (e.g., spacing, number, size, etc.) may be different. In some embodiments, the outlet openings 650 may be replaced with nozzles that provide different flow characteristics or with multiple sets of openings and/or nozzles that provide a user with the ability to vary the spray profile (e.g., intensity, spray pattern, etc.) provided by the handshower assembly 600.

The hand sprayer 603 may additionally include at least one second docking magnet (not shown) to magnetically couple the hand sprayer 603 to the docking ring 602. For example, the hand sprayer 603 may include a second docking magnet coupled to an upper wall (e.g., the body portion 644) of the spray head 642. The second docking magnet may be disposed within the fluid chamber, or at another suitable location within the spray head 642. Additionally, the hand sprayer 603 may include embossed/recessed areas structured to interface with mating elements on the docking ring 602 to mechanically couple the hand sprayer 603 to the docking ring 602. In other embodiments, the hand sprayer 603 may include other clips and/or fasteners to detachable couple the hand sprayer 603 to the docking ring 602.

Support Assembly

Figure 38:
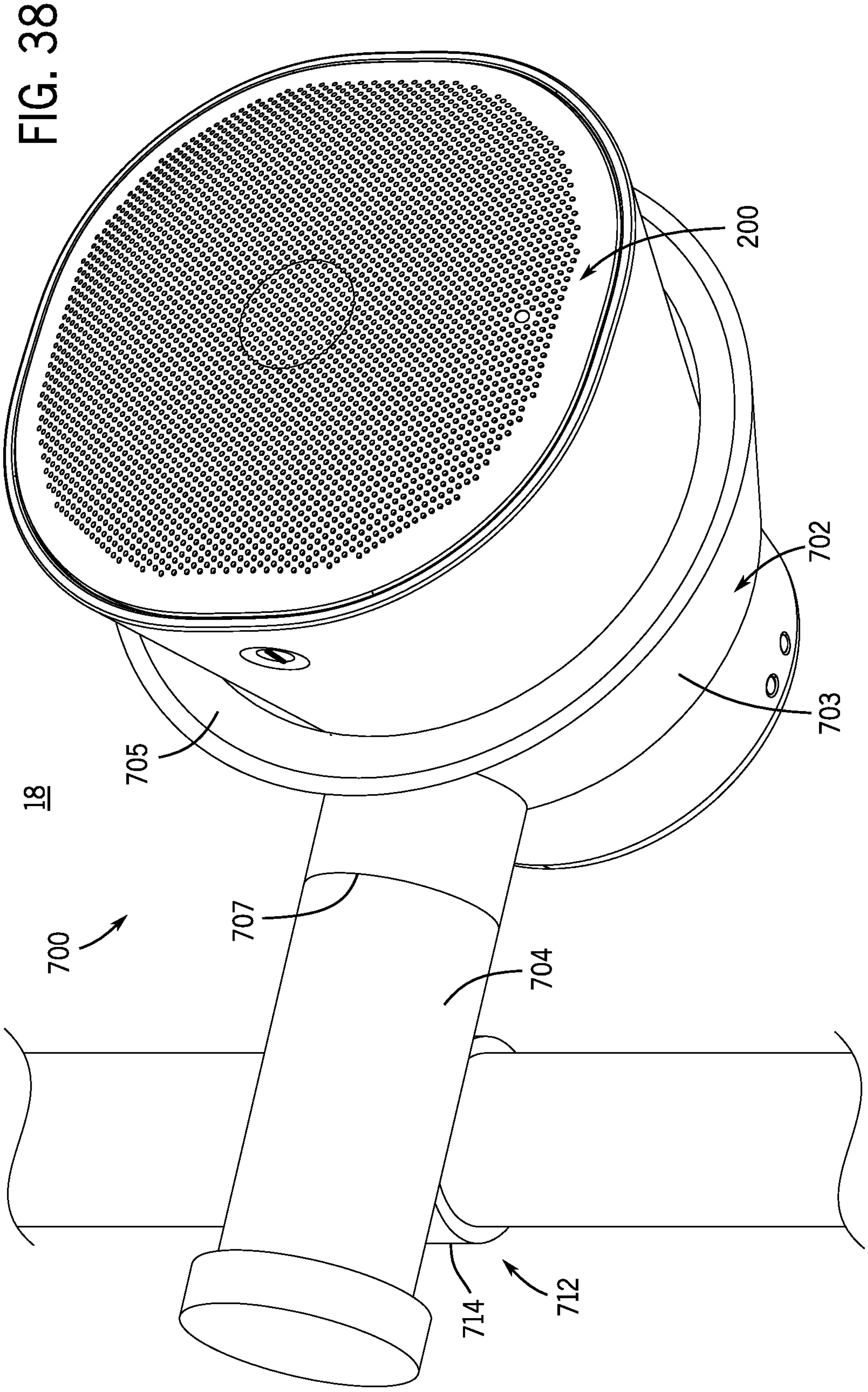
FIG. 38 is a bottom perspective view of a support assembly for a wireless speaker, according to an exemplary embodiment.
Figure 39:
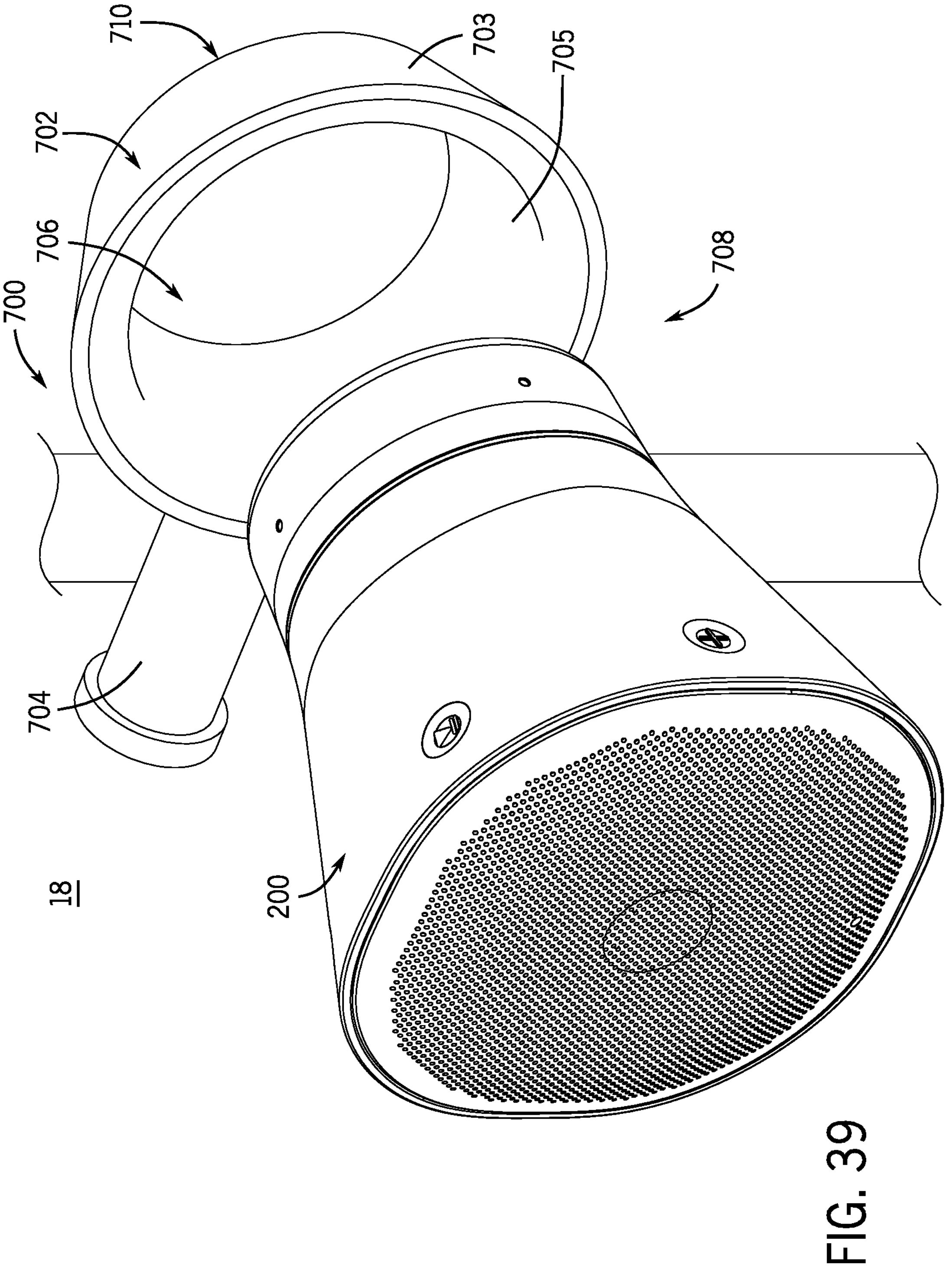
FIG. 39 is a side perspective view of the support assembly of FIG. 38 that is shown with the wireless speaker separated from the support assembly.

Referring to FIGS. 38-39, a support assembly 700 for a wireless speaker is shown according to an exemplary embodiment. The wireless speaker may be the same or similar to the wireless speaker 200 described with reference to FIGS. 8-11. As shown in FIGS. 38-39, the support assembly includes a docking ring 702 and a support extension 704 coupled to the docking ring 702. The support extension 704 is configured to support the docking ring 702 in position relative to a support structure within a shower enclosure 18 such as a curtain rod, a slide bar, a support bar, etc. In the exemplary embodiment of FIGS. 38-39, the support extension 704 positions the docking ring 702 at a lateral position alongside a vertical support bar within the shower enclosure 18. The support extension 704 is coupled to an outer surface of the docking ring 702, and extends outwardly from the docking ring 702 in substantially perpendicular orientation relative to a central axis of the docking ring 702 (e.g., the central axis of a through-hole opening 706 defined by the docking ring 702). As shown in FIG. 38, the support extension 704 is rotatably coupled to the docking ring 702 at a connection point 707 between the docking ring 702 and the support extension 704 such that the docking ring 702 (and wireless speaker 200) may be repositioned (e.g., angled upwardly or downwardly) depending on user preferences. In some embodiments, the support extension 704 includes detents where the docking ring 702 is connected to the support extension 704 to hold the wireless speaker 200 and docking ring 702 at the desired position/angle.

The design of the docking ring 702 may be the same as or similar to the docking ring 602 of the handshower assembly 600 described with reference to FIGS. 27-32. As shown in FIGS. 38-39, the docking ring 702 is substantially circular (e.g., doughnut shaped) and defines a through-hole opening 706 configured to receive the wireless speaker 200 therein. The through-hole opening 706 extends through an entirety of the docking ring 702 between a forward end 708 and a rear end 710 of the docking ring 702. The docking ring 702 is configured to surround the wireless speaker 200 when the speaker 200 is fully engaged/inserted into the through-hole opening 706. As shown in FIGS. 38-39, the wireless speaker 200 is arranged with respect to the docking ring 702 such that the wireless speaker 200 protrudes beyond both the forward end 708 and the rear end 710 of the docking ring 702 simultaneously.

Like the docking ring 602 described with reference to FIGS. 27-32, the docking ring 702 shown in FIG. 39 is formed from a two-piece assembly. In particular, the docking ring 702 includes an outer body portion 703 and an inner body portion 705 coupled to the outer body portion 703. The outer body portion 703 at least partially surrounds the inner body portion 705 and rigidly couples the inner body portion 705 to the support extension 704. Together, the outer body portion 703 and the inner body portion 705 define an enclosed cavity (not shown). In the exemplary embodiment of FIGS. 38-39, the docking ring 702 includes a plurality of magnets (not shown) disposed within the enclosed cavity and configured to interact with the second plurality of magnets 208 to magnetically couple the wireless speaker 200 to the docking ring 702. Additionally, the inner body portion 705 may be structured to grip the outer wall 202 of the wireless speaker 200 to prevent inadvertent removal of the wireless speaker 200 (see also FIG. 39).

Among other benefits, the design of the docking ring 702 (e.g., the through-hole opening 706) allows a user to access the interior surfaces of the docking ring 702 from multiple sides (e.g., from both the forward end 708 and the rear end 710), which, advantageously, facilitates cleaning operations and minimizes the build-up of dirt and soap scum. Moreover, the docking ring 702 may improve the overall aesthetic of the shower enclosure 18 when the wireless speaker 200 is detached from the docking ring 702 (e.g., the through-hole opening 706 in the docking ring 702 reduces visual obstruction between the user and the walls of the shower enclosure 18, etc.).

Figure 40:
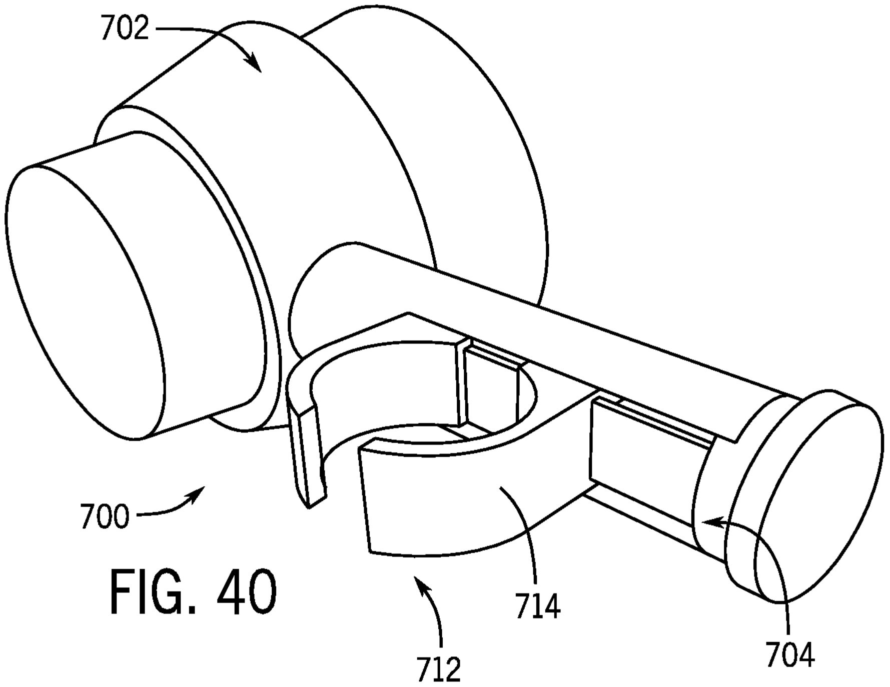
FIG. 40 is a side perspective view of a support assembly for a wireless speaker, according to another exemplary embodiment.
Figure 41:
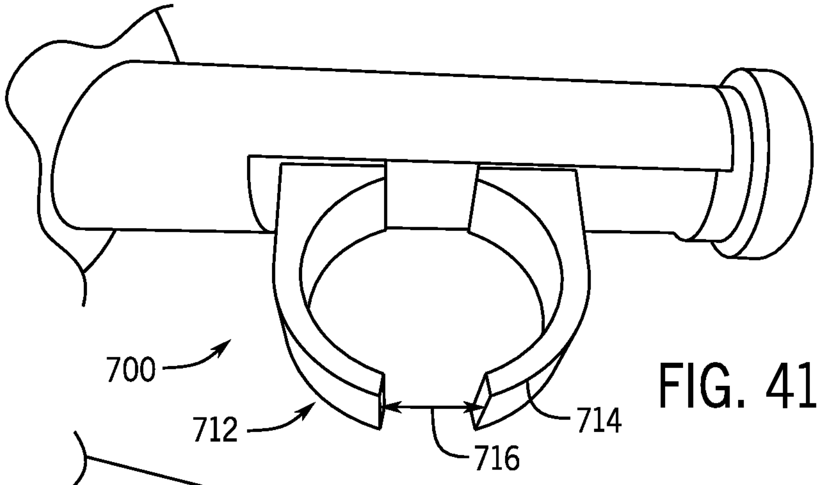
FIG. 41 is a top view of an extension of the support assembly of FIG. 40.
Figure 42:
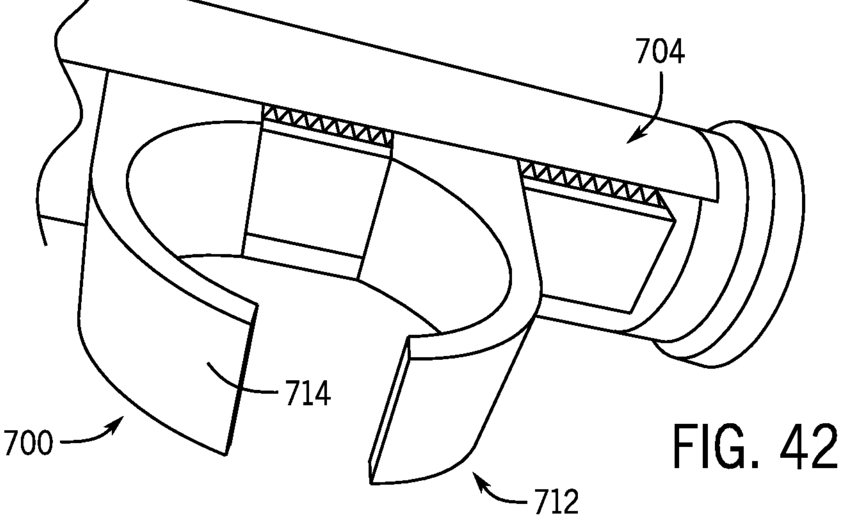
FIG. 42 is a top perspective view of the extension of FIG. 41.

The support assembly 700 additionally includes a clamp member 712 (e.g., device, etc.) configured to detachably couple the support assembly 700 to a support structure within the shower enclosure 18. As shown in FIGS. 40-42, the clamp member 712 is coupled to the support extension 704, between the ends of the support extension 704. The clamp member 712 extends outwardly from the support extension 704 in substantial perpendicular orientation relative to the support extension 704 and away from the rear end 710. In the exemplary embodiment of FIGS. 40-42, the clamp member 712 includes two retaining elements 714 that are spaced apart from one another along the length of the support extension 704 (e.g., in a direction parallel to a central axis of the support extension 704). A distance 716 between the retaining elements 714 may be adjusted manually to connect the support assembly 700 to the support structure and/or to reposition the support assembly 700. In some embodiments, the position of each of the retaining elements 714 may be adjusted to set a distance between the docking ring 702 and the support structure (e.g., to adjust the spacing between the wireless speaker 200 and the support structure). The position of at least one of the retaining elements 714 may be adjusted using a screw (not shown) that is positioned along an interior surface of the docking ring 702. The position of the screw may be different in various exemplary embodiments. In some embodiments, the screw may be replaced with a button and/or lever which releases at least one of the retaining elements 714 to allow a user to manually reposition the retaining element 714 to clamp the support assembly 700 onto the support structure.

Figure 43:
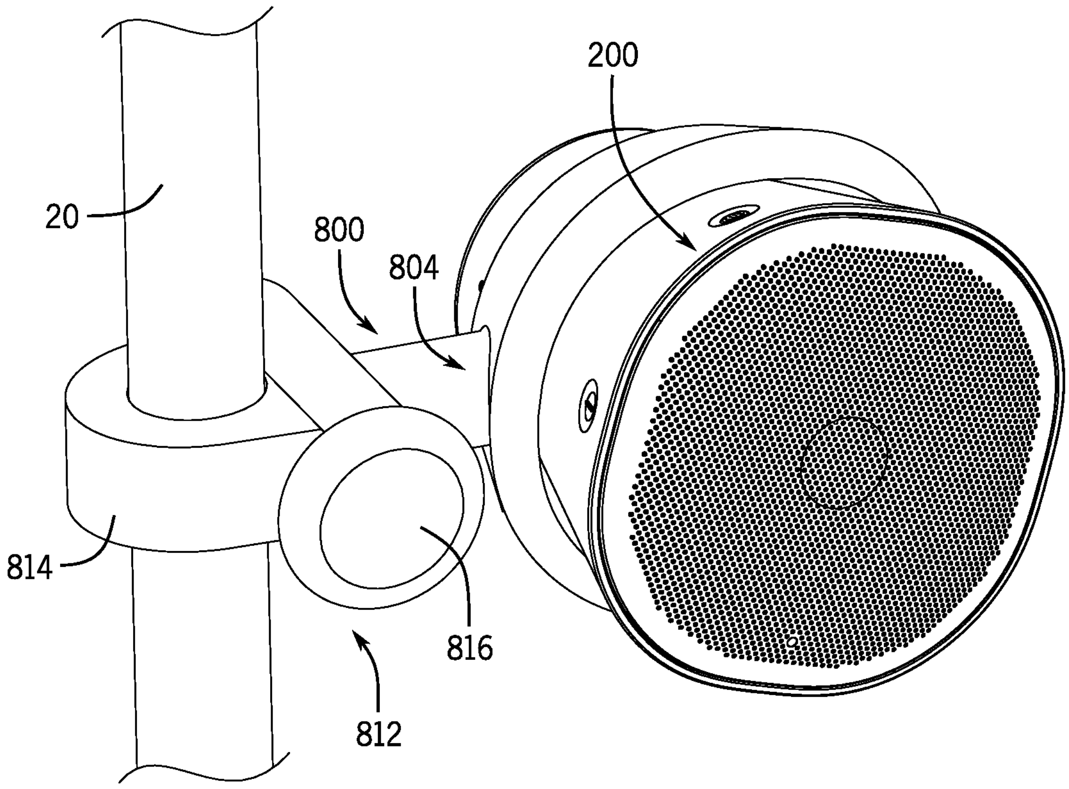
FIG. 43 is a top perspective view of a support assembly for a wireless speaker, according to another exemplary embodiment.
Figure 44:
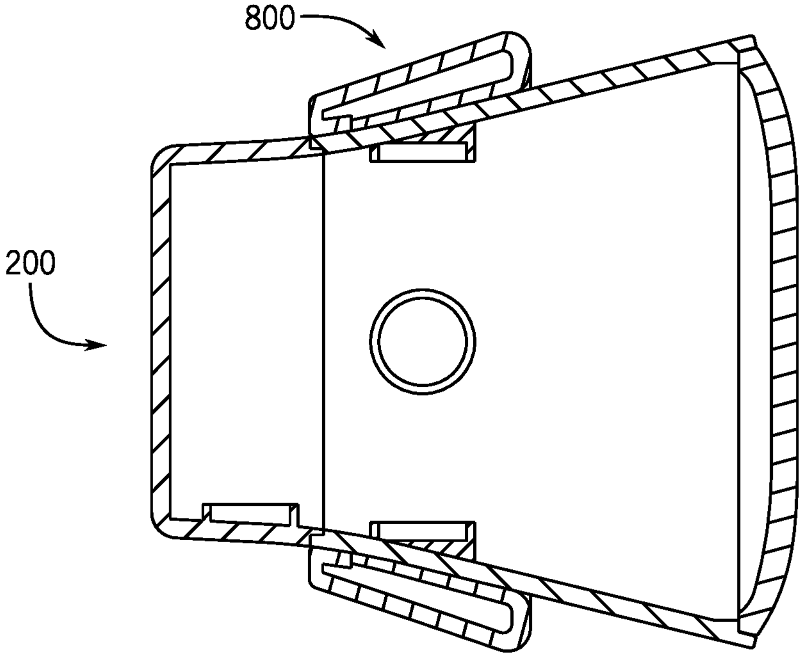
FIG. 44 is a side cross-sectional view of the support assembly of FIG. 43.
Figure 45:
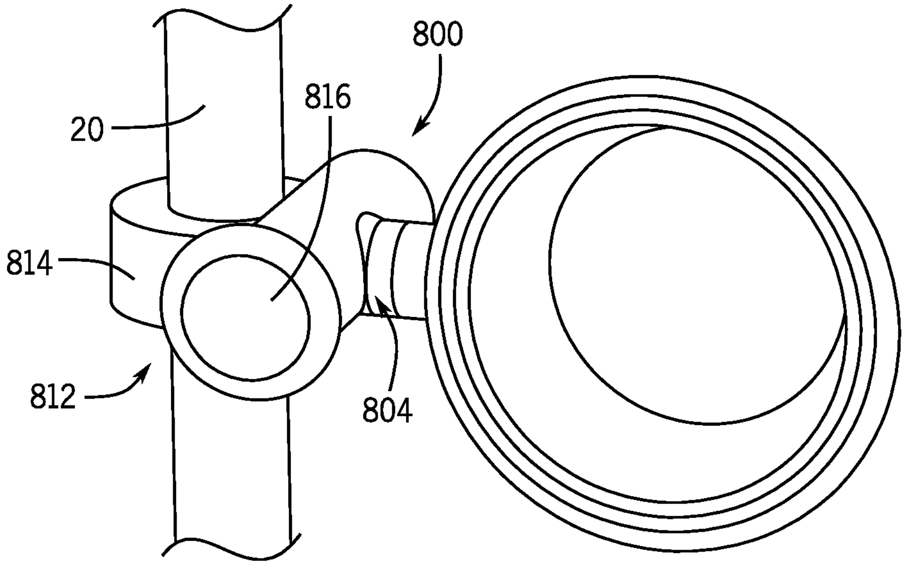
FIG. 45 is a front perspective view of the support assembly of FIG. 43 that is shown with the wireless speaker separated from the support assembly.

The design and arrangement of features described with reference to the clamp member 712 of FIGS. 40-42 should not be considered limiting. Many alternatives are possible without departing from the inventive concepts disclosed herein. For example, FIGS. 43-45 show a support assembly 800 that includes a clamp member 812 coupled to an end of the support extension 804. The clamp member 812 includes a U-shaped retainer 814 and a connecting element 816. The support structure 20 is "sandwiched" or otherwise disposed between the U-shaped retainer 814 and the connecting element 816. The U-shaped retainer 814 may be screwed into the connecting element 816 at a desired position along the support structure 20. In other embodiments, the U-shaped retainer 814 may be clipped into the connecting element 816 or otherwise secured in position with respect to the connecting element 816.

Figure 46:
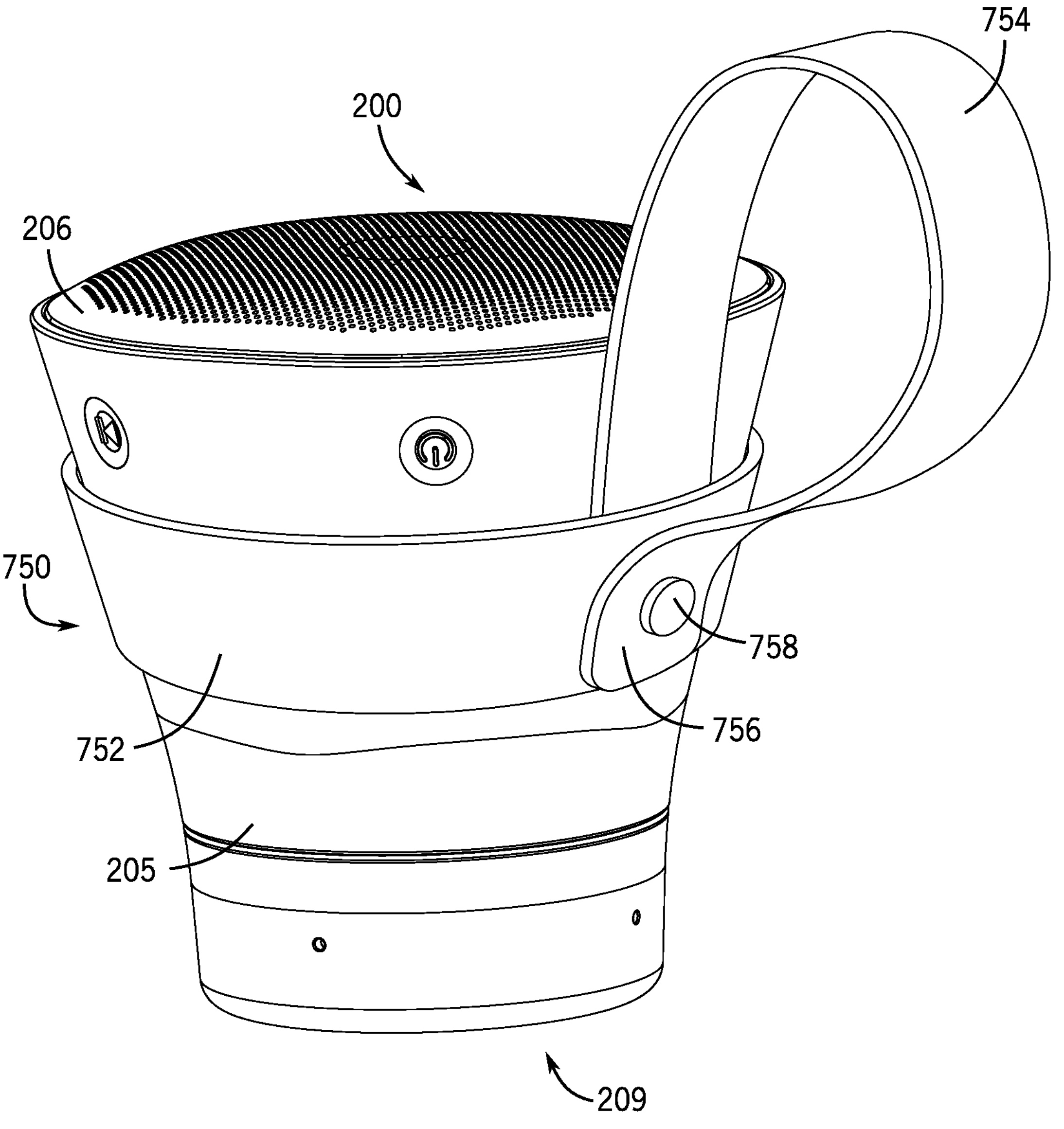
FIG. 46 is a perspective view of a support assembly for a wireless speaker, according to another exemplary embodiment.
Figure 47:
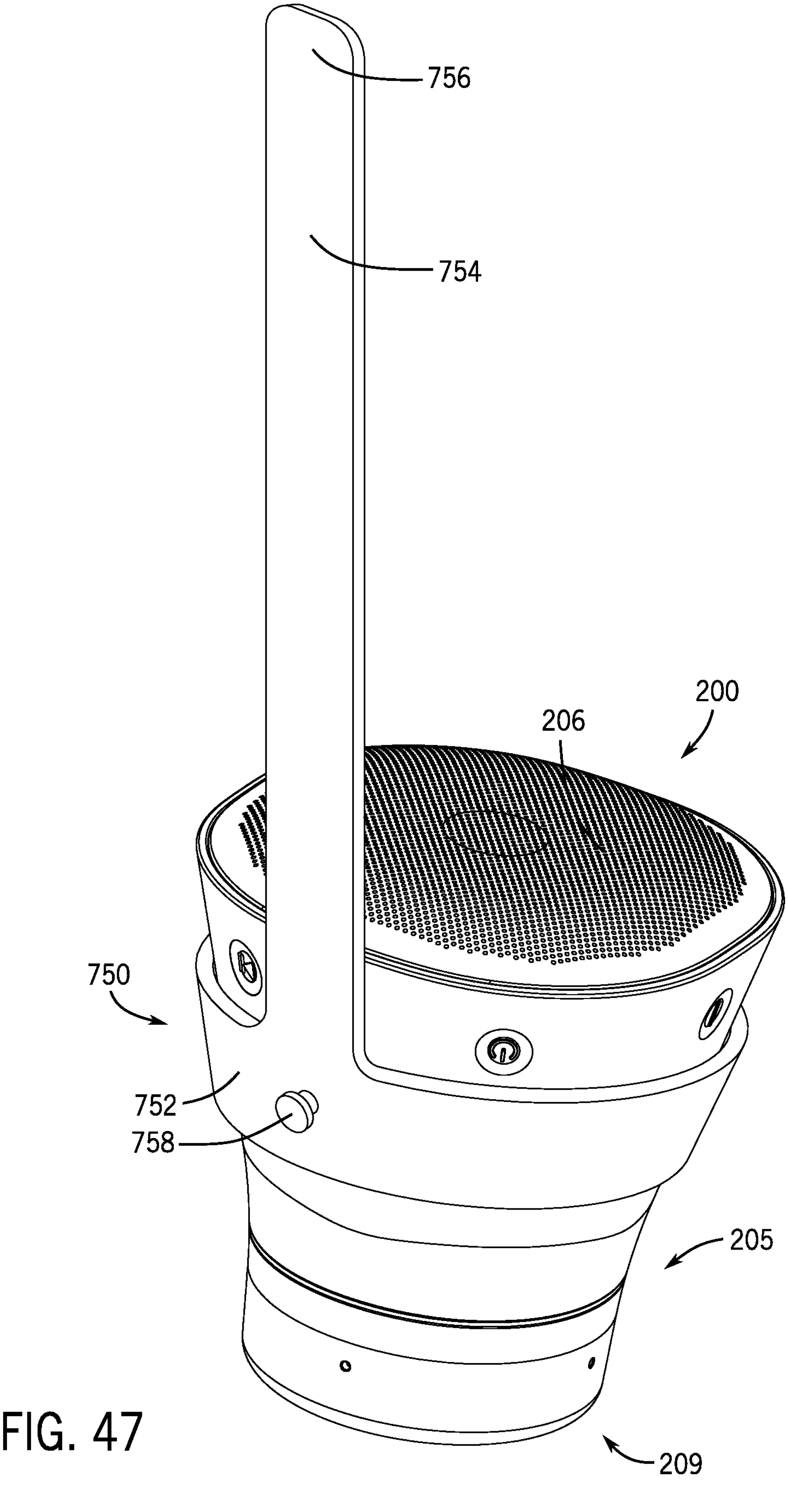
FIG. 47 is another perspective view of the support assembly of FIG. 46.
Figure 48:
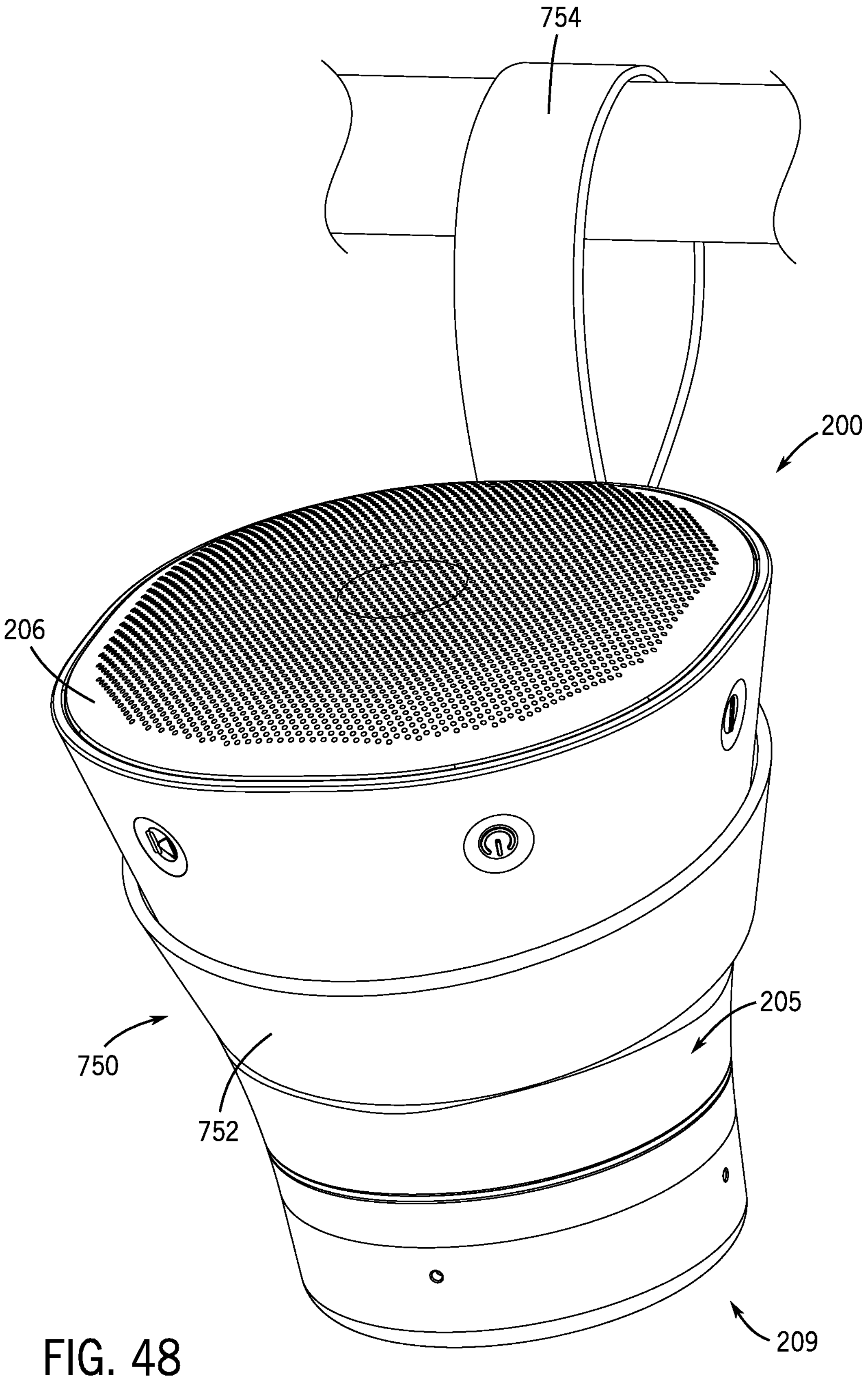
FIG. 48 is another perspective view of the support assembly of FIG. 46.

FIGS. 46-48 show another embodiment of a support assembly 750 for the wireless speaker 200. The support assembly 750 includes a flexible strap configured to removably (e.g., detachably) couple the wireless speaker 200 to almost any location. As shown in FIGS. 46-48, the support assembly 750 includes a first flexible strap 752 that engages the housing 205 of the wireless speaker 200 at an intermediate position between the face 206 and the rear end 209. The first flexible strap 752 fits snugly against the housing

205 and completely surrounds the housing 205. The support assembly 750 additionally includes a second flexible strap 754 coupled to the first flexible strap 752 and configured to removably couple the wireless speaker 200 to a support structure. As shown in FIG. 47, the second flexible strap 754 is integrally formed with the first flexible strap 752 as a single unitary body. In other embodiments, the second flexible strap 754 is mechanically connected to the first flexible strap 752 by a welding operation, or by using a mechanical fastener and/or adhesive product. As shown in FIGS. 46-47, the second flexible strap 754 defines a slit 756 or opening at an end of the second flexible strap 754 opposite from the first flexible strap 752. The slit 756 may be a linear incision through the second flexible strap 754. The slit 756 is sized to receive a connecting member 758 therein. In the embodiment of FIGS. 46-48, the connecting member 758 is a button (e.g., a mushroom shaped extension) that protrudes from the first flexible strap 752 adjacent to a location where the second flexible strap 754 intersects with the first flexible strap 752. In other embodiments, the shape, size, and position of the connecting member 758 may be different.

Shelf Assembly

Figure 49:
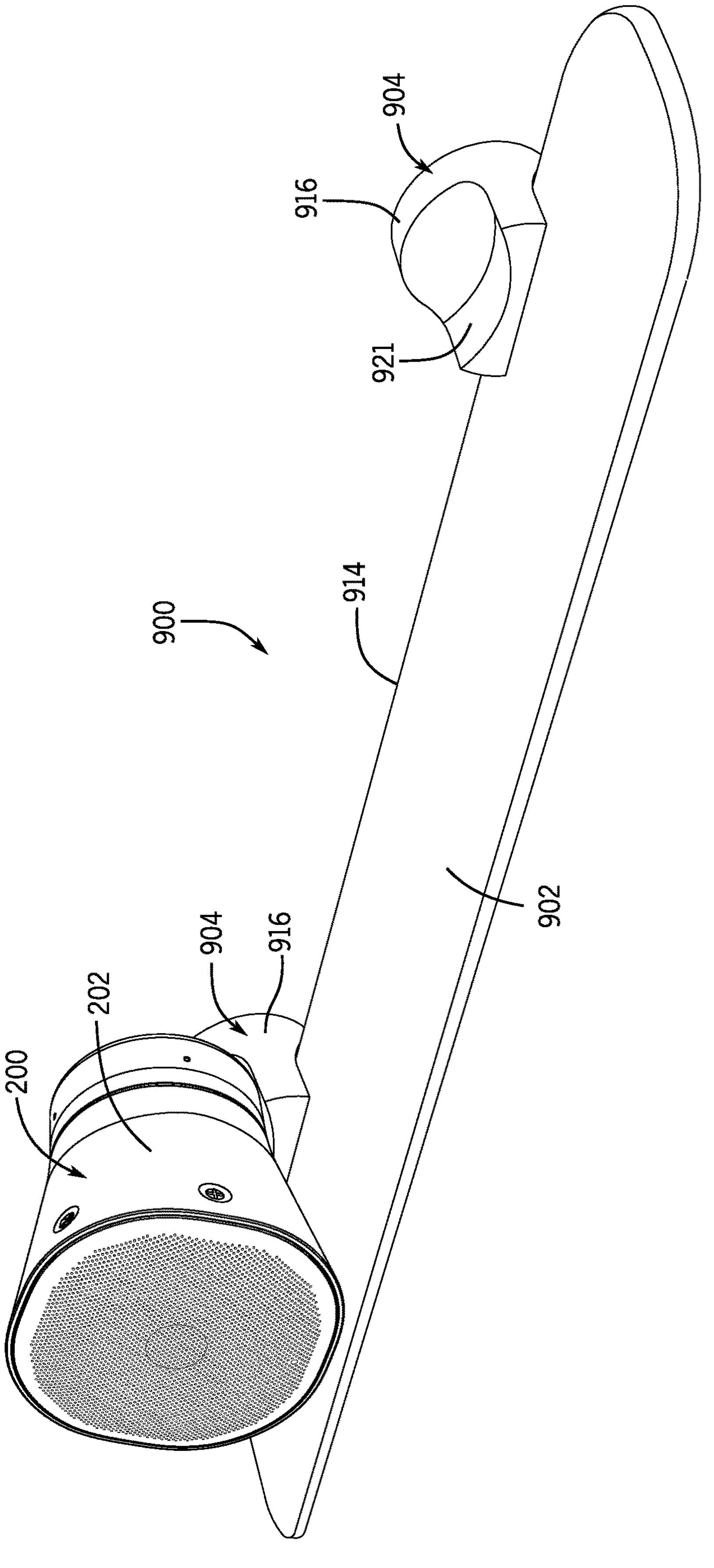
FIG. 49 is a front perspective view of a shelf assembly, according to an exemplary embodiment.
Figure 50:
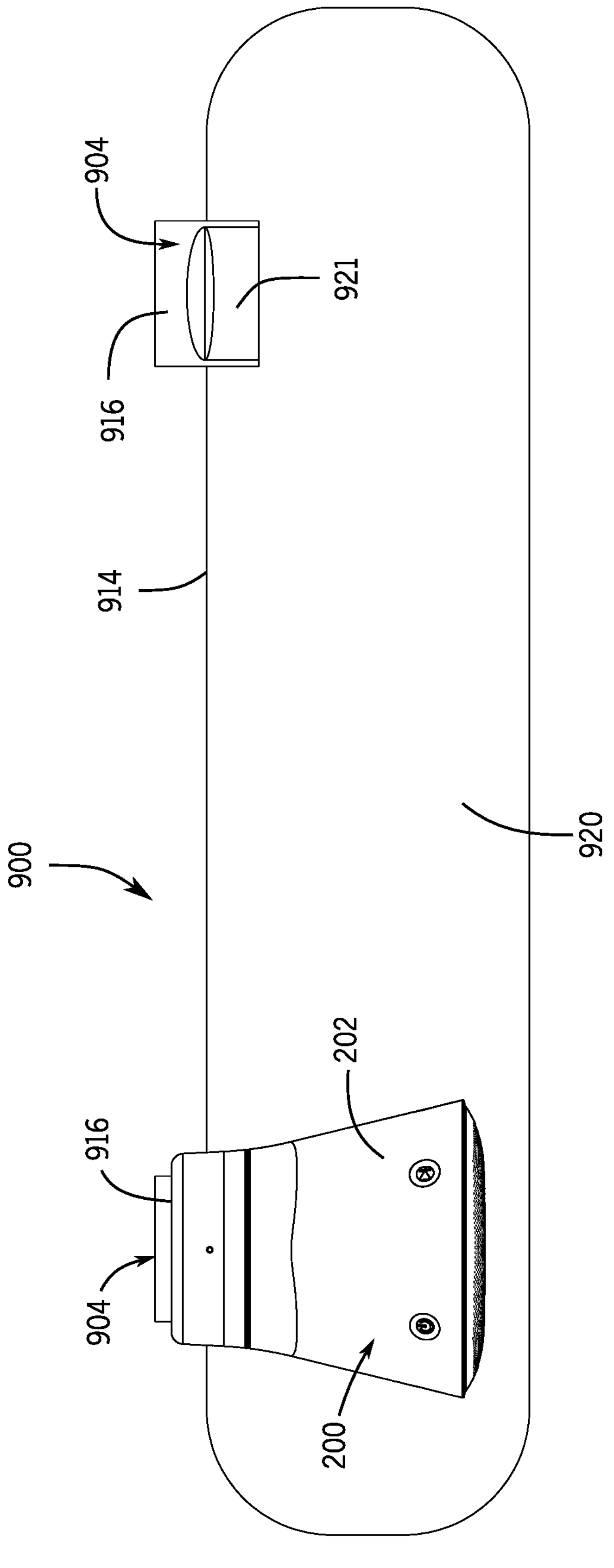
FIG. 50 is a top view of the shelf assembly of FIG. 49.
Figure 51:
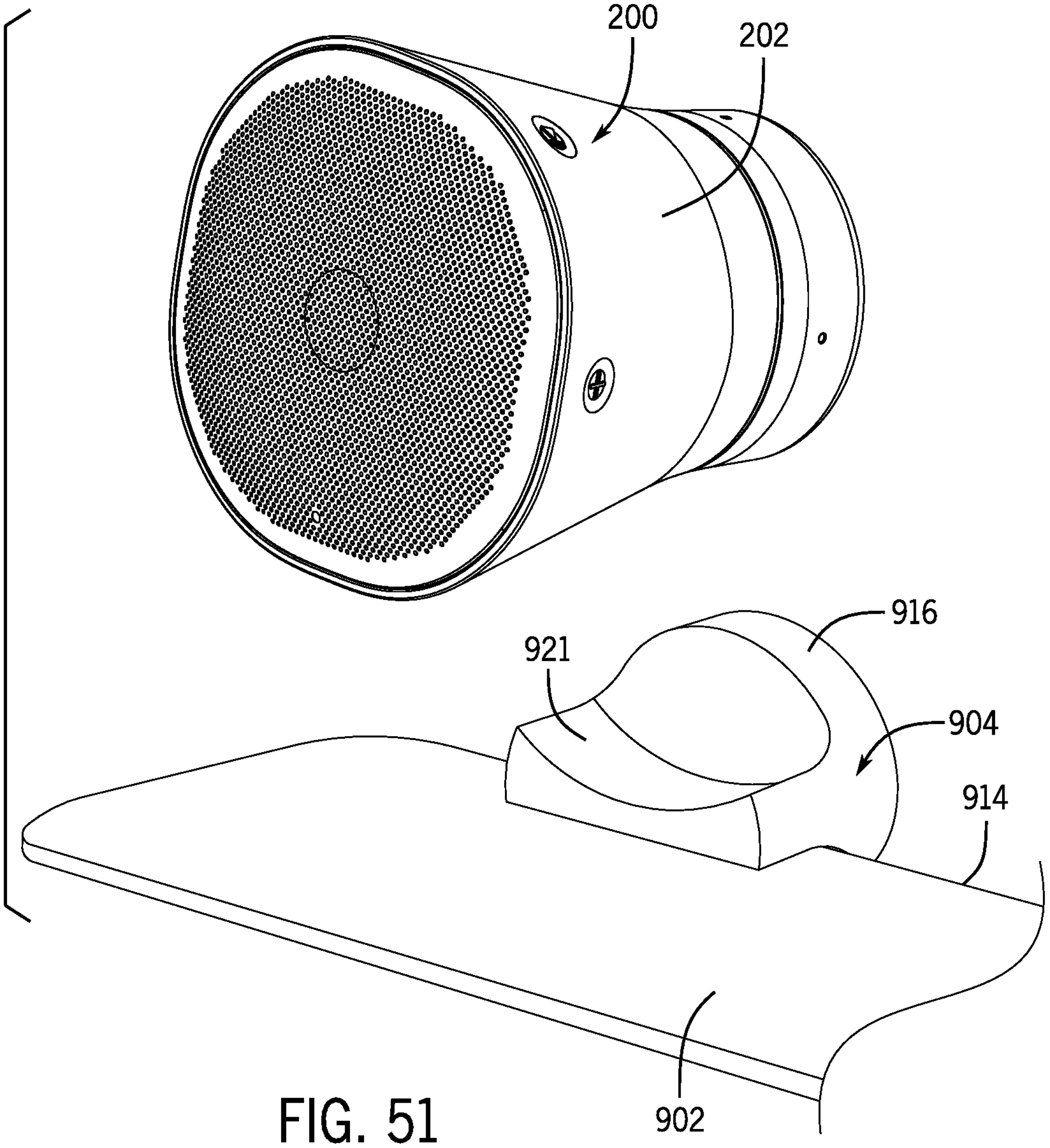
FIG. 51 is a front perspective view of a portion of the shelf assembly of FIG. 49.
Figure 52:
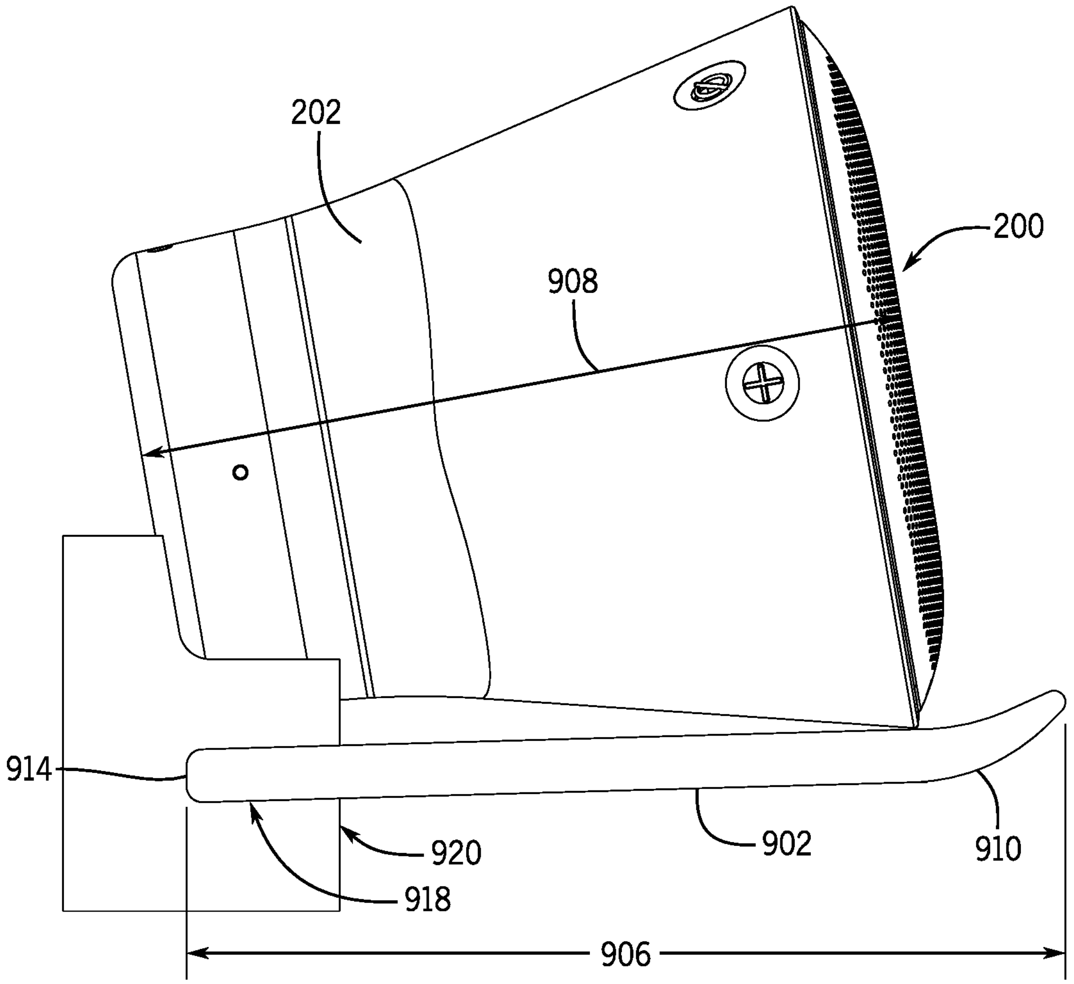
FIG. 52 is a side view of the shelf assembly of FIG. 49.

Referring to FIGS. 49-53, a shelf assembly 900 is shown according to an exemplary embodiment. The shelf assembly 900 includes a shelf 902 and at least one support 904 that is configured to rigidly couple the shelf 902 to a wall (e.g., a wall within a bath or shower enclosure or another location within a building). As shown in FIGS. 49-50, the shelf 902 is a thin rectangular plate with rounded corners. In other embodiments, the shape and/or size of the shelf 902 may be different. As shown in FIG. 52, a depth 906 of the shelf 902, in a direction normal to the wall, is greater than a depth 908 of the wireless speaker 200. Additionally, the shelf 902 includes a lip 910 that extends along a forward edge of the shelf 902 away from the wall. The lip 910 is curved vertically upwardly and is structured to prevent the wireless speaker 200 and/or other accessories placed on the shelf 902 from sliding over the forward edge of the shelf 902. The shape and/or curvature of the lip 910 may differ in various exemplary embodiments.

As shown in FIGS. 49-50, the shelf assembly 900 includes two supports 904, spaced apart from one another along a rear edge 914 of the shelf 902. Each support 904 includes a cylindrically-shaped body 916, although the body 916 may be shaped differently in various exemplary embodiments (e.g., a cube shape, etc.). As shown in FIG. 52, each of the supports 904 includes a slot 918 (e.g., a rectangular slot) disposed in a forward surface 920 of the body 916 and configured to receive the rear edge 914 of the shelf 902 therein to couple the shelf 902 to the body 916. In some embodiments, the slot 918 is tapered (e.g., more narrow toward an outer edge of the slot 918) to prevent the shelf 902 from detaching from the support 904. In other embodiments, the shelf 902 may be secured to the support 904 using an adhesive product or mechanical fastener. The support 904 may be mounted to the wall using screws, nails, an adhesive product, or any other suitable fastener (not shown).

Figure 53:
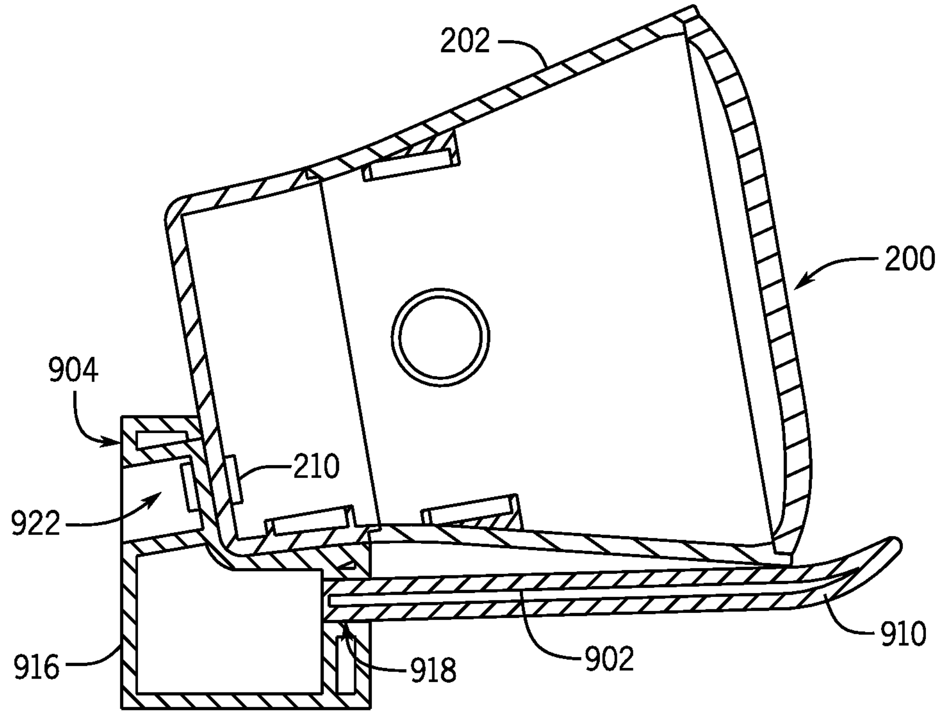
FIG. 53 is a side cross-sectional view of the shelf assembly of FIG. 49.

As shown in FIGS. 49-51, the support 904 includes a receptacle 921 (e.g., a recessed area) formed into the body 916 above the slot 918. The receptacle 921 is U-shaped to match the shape of the outer wall 202 of the wireless speaker 200. The receptacle 921 cradles the wireless speaker 200 and helps to secure the speaker 200 in position along the shelf 902. The support 904 also raises the back end of the wireless speaker 200 so that sound produced by the speaker 200 is directed forward of the shelf 902, rather than upwardly toward a ceiling of the room. As shown in FIG. 53, the support 904 also includes a lateral bore 922 (e.g., a cylindrical recessed area) extending at least partially horizontally into the body 916 from a rear surface of the body 916. The lateral bore 922 is configured to receive a permanent magnet therein, which may interact with the rear magnet 210 to magnetically couple the wireless speaker 200 to the body 916. In other embodiments, the lateral bore 922 may be configured to receive a magnetically permeable material (e.g., a ferritic material, iron, etc.). In yet other embodiments, the support 904 (e.g., the body 916, etc.) may be made from a magnetically permeable material.

As shown in FIGS. 49-50, the shelf assembly 900 is configured to accommodate two wireless speakers 200, one at either support 904. As described with reference to FIG. 17, the wireless speakers 200 may be configured to interact with one another to produce stereo sound (e.g., a first speaker on the left side of the shelf 902 receiving a left audio signal from a control device, and a second speaker on the right side of the shelf 902 receiving a right audio signal from the control device).

Expanded Sound Dock

Figure 54:
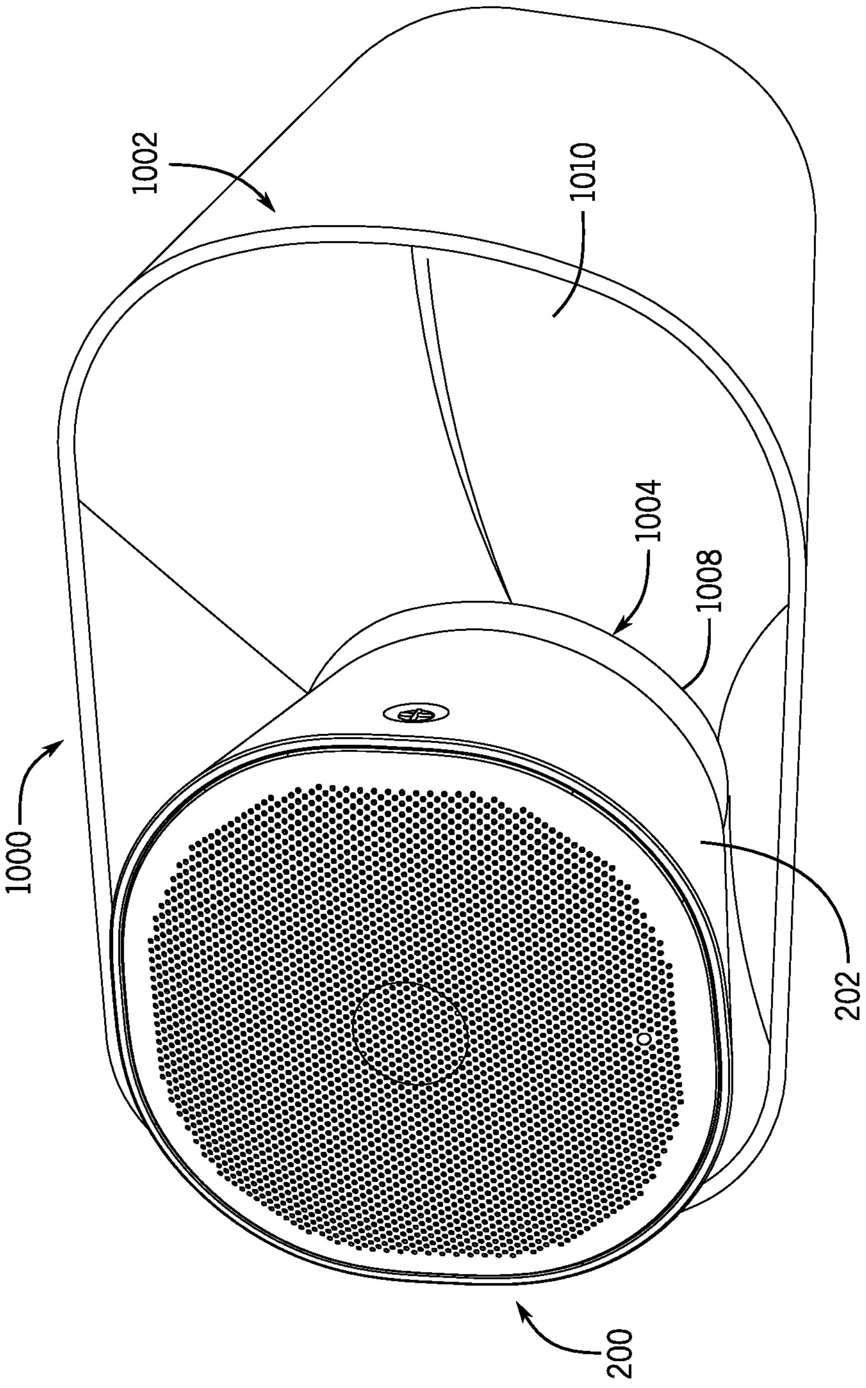
FIG. 54 is a front perspective view of an expanded sound dock for a wireless speaker, according to an exemplary embodiment.
Figure 55:
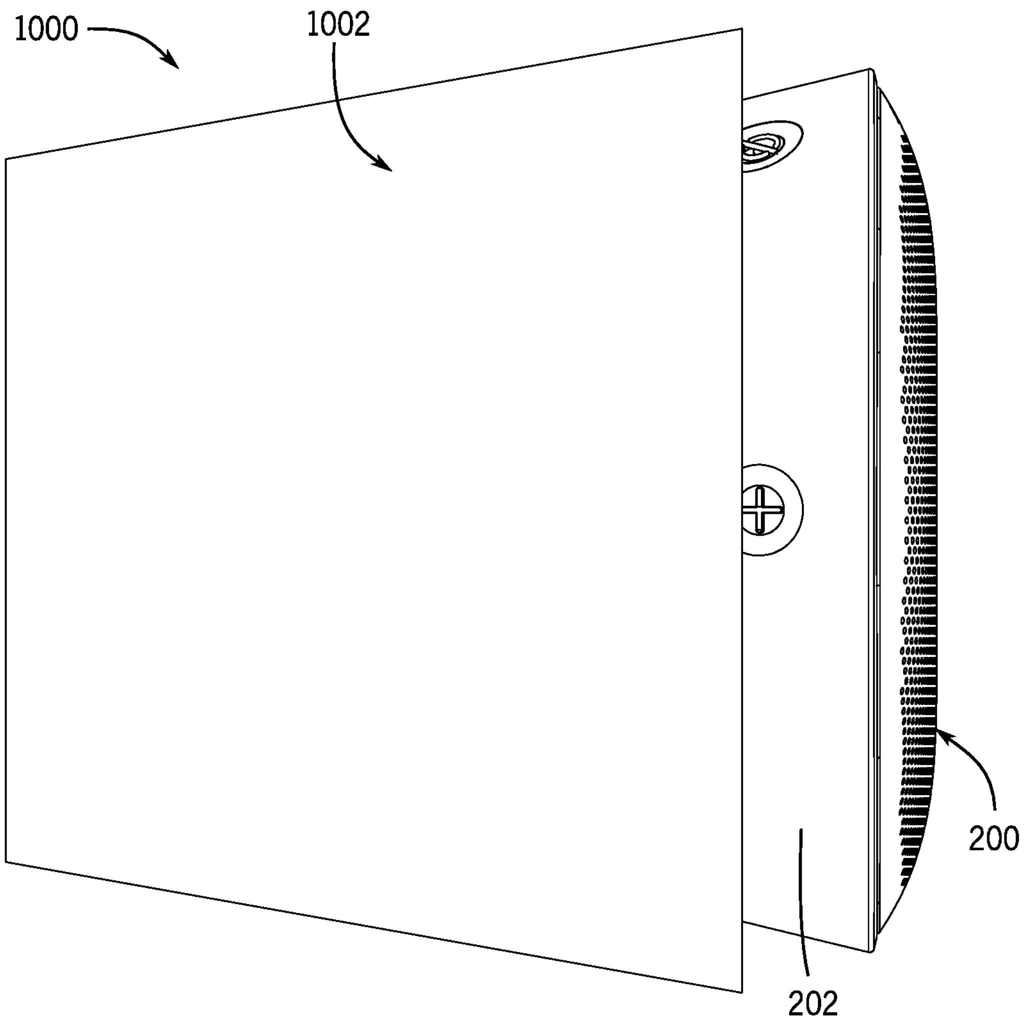
FIG. 55 is a side view of the expanded sound dock of FIG. 54.
Figure 56:
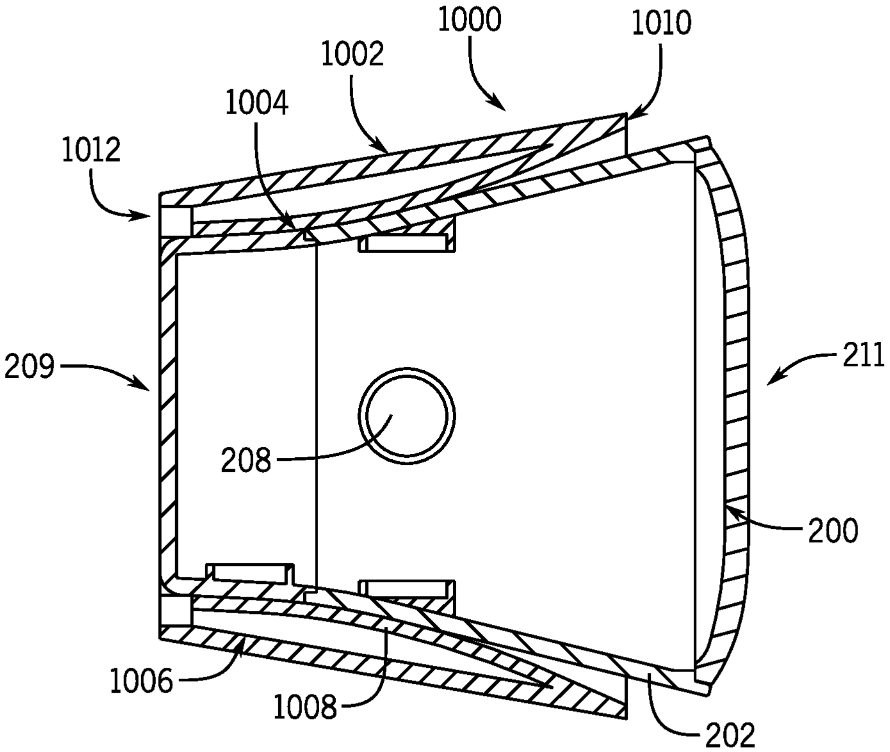
FIG. 56 is a side cross-sectional view of the expanded sound dock of FIG. 54.

Referring to FIGS. 54-56, an expanded sound dock 1000 for a wireless speaker is shown, according to an exemplary embodiment. The wireless speaker may be the same as or similar to the wireless speaker 200 of FIGS. 8-11. The expanded sound dock 1000 is configured to power (e.g., charge) the wireless speaker 200 and to amplify the sound produced by the wireless speaker 200. As shown in FIGS. 54-56, the expanded sound dock 1000 includes a docking enclosure 1002, a controller (not shown), a power source, and a speaker disposed substantially within the docking enclosure 1002 that is separate from the wireless speaker 200.

Similar to the waterway assembly of FIGS. 1-7 and the docking ring 602 of FIGS. 27-32, the docking enclosure 1002 of FIGS. 54-56 defines a through-hole opening 1004 that is sized to receive the wireless speaker 200 therein. The through-hole opening 1004 is tapered to match the shape of the outer wall 202 of the wireless speaker 200 to prevent movement of the wireless speaker 200 when engaged with the docking enclosure 1002. Additionally, the wireless speaker 200 is magnetically coupled to the docking enclosure 1002. As shown in FIG. 56, the docking enclosure 1002 defines an interior cavity 1006 that encompasses (e.g., surrounds) the wireless speaker 200. In some embodiments, the expanded sound dock 1000 includes at least one docking magnet (e.g., a permanent magnet, an element made from a ferromagnetic material, etc.) coupled to an inner surface of the interior cavity 1006 and configured to interact with the second plurality of magnets 208 within the wireless speaker 200 to magnetically couple the wireless speaker 200 to the docking enclosure 1002. In other embodiments, the inner sidewall and/or other parts of the docking enclosure 1002 may be made from a magnetically permeable material such as iron, etc. Additionally, the inner sidewall 1008 of the through-hole opening 1004 may be structured to grip onto the outer wall 202 of the wireless speaker 200 to prevent inadvertent removal.

As shown in FIG. 56, a forward end 211 of the wireless speaker 200 protrudes outwardly from a face 1010 of the docking enclosure 1002 when fully inserted into the through-hole opening 1004. A rear end 209 of the wireless speaker 200 is approximately flush with a rear surface 1012 of the docking enclosure 1002. In other embodiments, the position of the wireless speaker 200 with respect to the docking enclosure 1002 may be different.

The expanded sound dock 1000 includes a speaker (e.g., an electroacoustic transducer, a driver, an amplifier, etc.) that generates sound from an electrical audio signal. The speaker is disposed within the interior cavity 1006 of the docking enclosure 1002 and is oriented to project sound outwardly through the face 1010 of the docking enclosure 1002. In another embodiment, the sound may additionally project from the rear surface 1012 of the docking enclosure 1002 (e.g., from the rear of the expanded sound dock 1000). The speaker amplifies sound produced by the wireless speaker 200 to provide a wider sound range, depth, and quality to a user. In some embodiments, the speaker may interact with the wireless speaker 200 to produce stereo sound (e.g., separate left and right audio signals). The face 1010 of the docking enclosure 1002 may be perforated and/or include a screen configured to allow sound to project therethrough.

The controller (not shown) is configured to facilitate communication between the wireless speaker 200 and the speaker within the docking enclosure 1002. The expanded sound dock 1000 includes electrical terminals disposed within the through-hole opening 1004 and positioned to engage with the terminals of the wireless speaker 200. The wireless speaker 200 may be electrically connected to the expanded sound dock 1000 via the electrical terminals such that the controller may receive and process audio signals and information directly from the wireless speaker 200. The expanded sound dock 1000 may also include a power supply configured to power the wireless speaker through the electrical terminals.

In some embodiments, the expanded sound dock 1000 includes a communication component (e.g., a Bluetooth transceiver, a Bluetooth receiver, a near-field communication (NFC) transceiver, and NFC receiver, a Wi-Fi transceiver, a Wi-Fi receiver or another wireless communications protocol) or other similar device. The communication component may be configured to communicably couple the expanded sound dock 1000 (e.g., the speaker, the controller, etc.) with the wireless speaker 200 without the use of wires/terminals.

In some embodiments, the expanded sound dock 1000 is configured as a standalone speaker/audio playback device that may be wirelessly coupled with a control device (e.g., a smartphone, a tablet, a laptop computer, etc.). Additionally, the expanded sound dock 1000 may include a user interface (e.g., lights, control buttons, etc.) configured to allow a user to adjust various control parameters independently from the wireless speaker 200.

Floating Sound Dock

Figure 58:
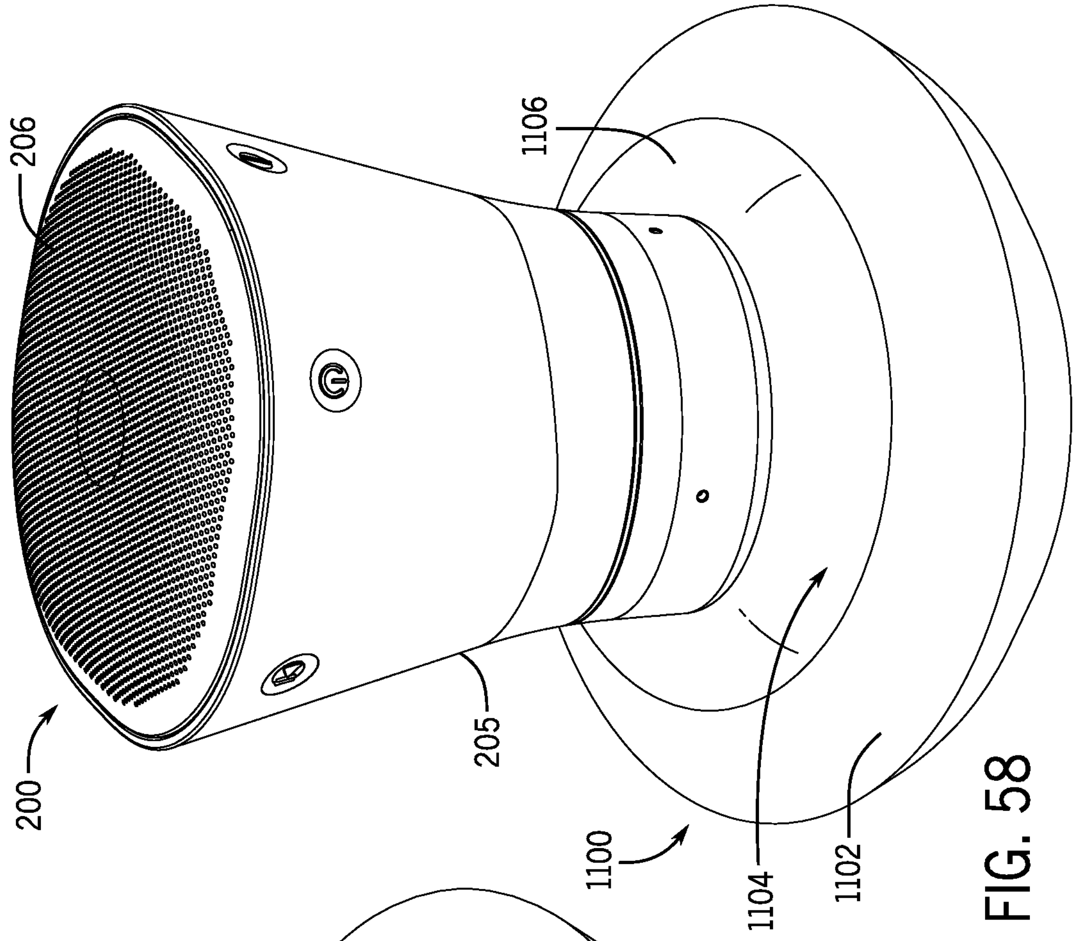
FIG. 58 is another perspective view of the floating sound dock of FIG. 57, shown with the wireless speaker separated from the floating sound dock.
Figure 57:
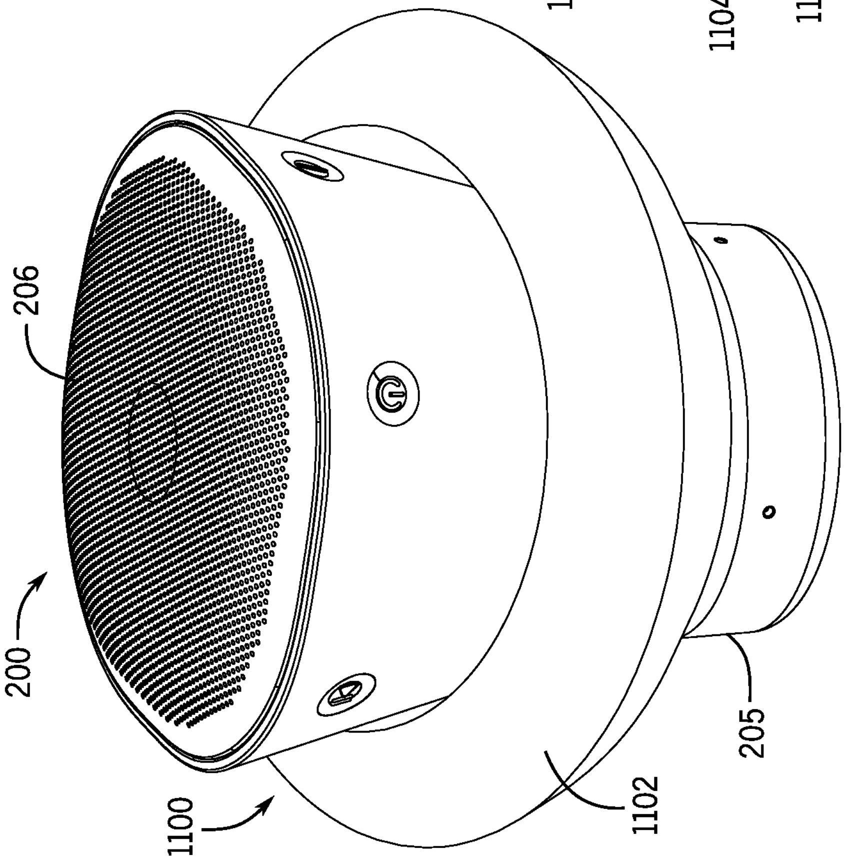
FIG. 57 is a perspective view of a floating sound dock for a wireless speaker, according to an exemplary embodiment.

FIGS. 57-58 show a floating sound dock 1100, according to an exemplary embodiment. The floating sound dock 1100 is a buoy configured to support a wireless speaker (e.g., the wireless speaker 200 of FIGS. 8-11) above a waterline within a bathtub or another freestanding body of liquid. The floating sound dock 1100 includes a body 1102 defining an enclosed hollow cavity (not shown). The hollow cavity is an enclosed annular space that may be filled with air, Styrofoam, or another lightweight material and may be sealed from an environment surrounding the body to increase the buoyancy of the floating sound dock. In other embodiments, the body 1102 does not include a hollow cavity. As shown in FIG. 58, the body 1102 additionally defines an opening 1104 (e.g., a circular through-hole opening) sized to receive the wireless speaker 200 therein. As shown in FIG. 57, the wireless speaker 200 is inserted through the opening 1104 and engages with an inner surface 1106 of the body 1102 at an intermediate position between opposing ends of the wireless speaker 200 (e.g., at an intermediate position along the housing 205). When placed into a body of liquid, the floating sound dock 1100 orients the wireless speaker 200 such that the face 206 of the wireless speaker 200 projects upwardly from the surface of the water above the bathtub (e.g., toward a dry end of the floating sound dock 1100 that is not submerged beneath the liquid). When placed into the body of liquid, at least a portion of the body and the wireless speaker 200 is positioned below the waterline.

In other embodiments, the size, shape, and arrangement of the floating sound dock 1100 may be different. For example, the floating sound dock may include a recessed area configured to receive the wireless speaker 200 therein, instead of the opening 1104. The recessed area may be sized and shaped to match the shape of the outer wall 202 of the wireless speaker 200 to prevent movement of the wireless speaker 200 when fully inserted within the recessed area. The floating sound dock may completely cover (e.g., surround) the rear end of the wireless speaker 200 to prevent any part of the wireless speaker 200 from being placed into direct contact with the water.

The wireless speaker and support assemblies, of which various exemplary embodiments are disclosed herein, provide several advantages over existing speakers and devices. The wireless speaker systems each include a wireless speaker that is designed for use in bath and shower environments. The wireless speaker may be communicably coupled to a control device, or used standalone via the integrated AI assistant. Docking/support assemblies for the wireless speaker (e.g., the showerhead assembly, the handshower assembly, the support assembly, the expanded sound dock, the floating sound dock, etc.) include a through-hole opening configured to receive the wireless speaker and to seamless integrate the wireless speaker into the surrounding structure. The various docking systems also provide an improved aesthetic appearance as compared to other docking devices and systems by reducing visual obstruction between the user and the surrounding bath or shower environment.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A showerhead assembly, comprising:

a waterway assembly comprising:

a back plate;

an inlet connector disposed on the back plate;

a face plate coupled to the back plate and defining a plurality of outlets, the face plate defining a through-hole that extends through the waterway assembly; and a wireless speaker configured to be removably coupled to the waterway assembly and disposed within the through-hole, an inner sidewall of the face plate or the back plate configured to cam radially away from the wireless speaker responsive to rotation of the wireless speaker relative to the waterway assembly.

2. The showerhead assembly of claim 1, wherein the inner sidewall of the face plate defines the through-hole, wherein the waterway assembly further comprises a magnetic material on the inner sidewall, and wherein rotation of the wireless speaker relative to the waterway assembly cams the magnetic material away from the wireless speaker.

3. The showerhead assembly of claim 1, wherein a forward end of the wireless speaker protrudes from the face plate when the wireless speaker is fully inserted into the through-hole.

4. The showerhead assembly of claim 1, the back plate comprising an inlet extension extending away from the face plate substantially parallel to a central axis of the through-hole, the inlet connector coupled to the inlet extension, wherein the inlet connector is radially offset from the central axis of the through-hole.

5. The showerhead assembly of claim 1, wherein the wireless speaker comprises a housing and a plurality of retaining members coupled to the housing, and wherein the plurality of retaining members are made from a magnetic material.

6. The showerhead assembly of claim 1, wherein the wireless speaker protrudes beyond opposing ends of the waterway assembly when the wireless speaker is fully inserted into the through-hole.

7. The showerhead assembly of claim 1, wherein a cross-sectional shape of the wireless speaker is different from a cross-sectional shape of the through-hole where the wireless speaker is engaged with the waterway assembly.

8. The showerhead assembly of claim 1, wherein a cross-sectional shape of the wireless speaker is generally rectangular and a cross-sectional shape of the through-hole is generally circular.

9. The showerhead assembly of claim 1, wherein the through-hole is an unobstructed aperture through the waterway assembly.

10. The waterway assembly of claim 1, further comprising an inlet extension extending away from the back plate substantially parallel to a central axis of the through-hole, wherein the inlet extension is radially offset from the central axis of the through-hole.

11. The waterway assembly of claim 1, further comprising a plurality of retaining members coupled to one of the back plate or the face plate, wherein the plurality of retaining members are adjacent to the through-hole, and wherein the plurality of retaining members are made from a magnetic material.

12. The showerhead assembly of claim 1, wherein the through-hole is a first through-hole, further comprising:

a docking ring defining a second through-hole, wherein the waterway assembly is a hand sprayer that is configured to be removably coupled to the docking ring, so that the second through-hole is substantially aligned with the first through-hole when the hand sprayer is coupled to the docking ring; and a flexible conduit that is configured to fluidly couple the docking ring to the hand sprayer.

13. The showerhead assembly of claim 12, the back plate comprising an inlet extension extending away from the docking ring substantially parallel to a central axis of the second through-hole the inlet connector coupled to the inlet extension, wherein the inlet connector is axially offset from the central axis of the first through-hole.

14. The showerhead assembly of claim 12, wherein the docking ring has an extension that protrudes from a lower surface of the docking ring along a perimeter of the second through-hole, and wherein the extension is at least partially received within the first through-hole of the hand sprayer when the hand sprayer is engaged with the docking ring.

15. The showerhead assembly of claim 12, wherein the docking ring comprises:

a magnetic material on the inner sidewall.

16. The showerhead assembly of claim 1, wherein an axial length of the wireless speaker parallel to a central axis of the through-hole is greater than an axial length of the waterway assembly.

17. The showerhead assembly of claim 1, wherein an outer wall of the wireless speaker has a non-circular cross-sectional shape where the outer wall engages the waterway assembly when the wireless speaker is fully installed into the waterway assembly, and wherein the wireless speaker is rotatable within the through-hole when the wireless speaker is fully installed into the waterway assembly.

18. The showerhead assembly of claim 1, wherein the back plate and the face plate together define a flow distribution cavity that is fluidly coupled to the inlet connector.

19. The showerhead assembly of claim 1, wherein the inlet connector is disposed on the back plate at a location between an inner radial side and an outer radial side of the face plate.

20. The showerhead assembly of claim 1, wherein a central axis of the inlet connector is oriented substantially parallel to a central axis of the through-hole, and the inlet connector is disposed radially outwardly from the through-hole.

* * * * *